US012803292B2

(12) United States Patent
Julien et al.

(10) Patent No.: US 12,803,292 B2
(45) Date of Patent: Nov. 17, 2026

(54) MICROGRID CONTROL SYSTEMS AND ALGORITHMS FOR OPTIMIZING ENERGY PERFORMANCE FOR FACILITIES

(71) Applicant: LINEAGE LOGISTICS, LLC, Irvine, CA (US)

(72) Inventors: Simon Anthony Julien, Denver, CO (US); Jesse Tootell, San Francisco, CA (US); Jash Mihir Vora, Amsterdam (NL); Elliott Gerard Wolf, San Francisco, CA (US); Alexander James Woolf, San Francisco, CA (US); Nathan Joseph Addy, Oxnard, CA (US); Ricardo Esteban Manriquez, Oakland, CA (US); David Veliz, Moreno Valley, CA (US); Jason Michael Propes, Sheridan, OR (US); Ricardo Amaya, Rialto, CA (US); Alessia Kelsey Levante, Lafayette, CA (US)

(73) Assignee: Lineage Logistics, LLC, Irvine, CA (US)

( * ) Notice: Subject to any disclaimer, the term of this patent is extended or adjusted under 35 U.S.C. 154(b) by 332 days.

(21) Appl. No.: 18/602,971

(22) Filed: Mar. 12, 2024

(65) Prior Publication Data

US 2024/0380215 A1 Nov. 14, 2024

Related U.S. Application Data

(60) Provisional application No. 63/564,217, filed on Mar. 12, 2024, provisional application No. 63/501,269, filed on May 10, 2023.

(51) Int. Cl.
*H02J 3/46* (2026.01)
*B60L 53/31* (2019.01)
(Continued)

(52) U.S. Cl.
CPC ................ *H02J 3/46* (2013.01); *B60L 53/31* (2019.02); *H02J 3/322* (2020.01); *H02J 7/50* (2026.01);
(Continued)

(58) Field of Classification Search
CPC ...... H02J 3/46; H02J 3/322; H02J 7/50; H02J 7/82; H02J 2101/24; H02J 2103/30; H02J 7/35; B60L 53/31
See application file for complete search history.

(56) References Cited

U.S. PATENT DOCUMENTS

| | | | | |
|---|---|---|---|---|
| 6,484,794 | B1 * | 11/2002 | Schulak ................ | F25D 23/003 165/53 |
| 7,844,370 | B2 * | 11/2010 | Pollack ..................... | H02J 3/38 315/80 |

(Continued)

FOREIGN PATENT DOCUMENTS

| | | |
|---|---|---|
| CN | 110014973 | 7/2019 |
| CN | 110862008 | 3/2020 |

(Continued)

OTHER PUBLICATIONS

Lee, Jaehwa, et al. "Optimal operation of an energy management system using model predictive control and Gaussian process time-series modeling." IEEE Journal of Emerging and Selected Topics in Power Electronics 6.4 (2018): 1783-1795. (Year: 2018).*

(Continued)

*Primary Examiner* — Carlos R Ortiz Rodriguez
(74) *Attorney, Agent, or Firm* — Barnes & Thornburg LLP

(57) ABSTRACT

A disclosed system for dynamically controlling energy performance operations in a facility includes: energy sources, energy sources controllers, and a centralized controller. The centralized controller can: receive signals indicating perfor-
(Continued)

mance of the energy sources in real-time, retrieve at least one model that is iteratively trained using machine learning techniques and training data including (i) at least a portion of the received signals and (ii) decisions made by the centralized controller, provide at least a portion of the received signals as input to the model, and receive, as output from the model, control operations for one or more of the energy sources for a predetermined period of time, and return the control operations to respective controllers of the one or more energy sources for execution during the predetermined period of time.

20 Claims, 18 Drawing Sheets

(51) Int. Cl.

| | |
|---|---|
| ***H02J 3/32*** | (2006.01) |
| ***H02J 7/50*** | (2026.01) |
| ***H02J 7/82*** | (2026.01) |
| *H02J 101/24* | (2026.01) |
| *H02J 103/30* | (2026.01) |

(52) U.S. Cl.

CPC ............ *H02J 7/82* (2026.01); *H02J 2101/24* (2026.01); *H02J 2103/30* (2026.01)

(56) References Cited

U.S. PATENT DOCUMENTS

| | | | | |
|---|---|---|---|---|
| 9,026,347 | B2 * | 5/2015 | Gadh | B60L 53/67 320/132 |
| 11,399,065 | B1 | 7/2022 | Thirumurthy et al. | |
| 2010/0181957 | A1 * | 7/2010 | Goeltner | H01M 10/465 320/101 |
| 2011/0114398 | A1 | 5/2011 | Bianco | |
| 2018/0196456 | A1 | 7/2018 | ElBsat | |
| 2018/0197253 | A1 | 7/2018 | ElBsat et al. | |
| 2018/0224814 | A1 | 8/2018 | ElBsat et al. | |
| 2018/0254632 | A1 | 9/2018 | ElBsat et al. | |
| 2018/0357577 | A1 | 12/2018 | ElBsat et al. | |
| 2019/0206000 | A1 | 7/2019 | ElBsat et al. | |
| 2019/0217739 | A1 | 7/2019 | Sinha et al. | |
| 2020/0073342 | A1 | 3/2020 | Lee et al. | |
| 2020/0160461 | A1 | 5/2020 | Kaniki | |
| 2021/0326972 | A1 | 10/2021 | Lee et al. | |

FOREIGN PATENT DOCUMENTS

| | | |
|---|---|---|
| WO | WO2019243524 | 12/2019 |
| WO | WO2020052422 | 3/2020 |

OTHER PUBLICATIONS

Cao, Yue, et al. "Mobile edge computing for big-data-enabled electric vehicle charging." IEEE Communications Magazine 56.3 (2018): 150-156. (Year: 2018).*

Long, Teng, Xiao-Teng Ma, and Qing-Shan Jia. "Bi-level proximal policy optimization for stochastic coordination of EV charging load with uncertain wind power." 2019 IEEE Conference on Control Technology and Applications (CCTA). IEEE, 2019. (Year: 2019).*

Rodríguez Solano, Marco Andrés. "Implementation of second-life batteries as energy storage systems enhancing the interoperability and flexibility of the energy infrastructure in tertiary buildings." (2020). (Year: 2020).*

Arfeen, Zeeshan Ahmad, et al. "Novel supervisory management scheme of hybrid sun empowered grid-assisted microgrid for rapid electric vehicles charging area." Applied Sciences 11.19 (2021): 9118. (Year: 2021).*

Li, Junlong, et al. "Edge-cloud computing systems for smart grid: state-of-the-art, architecture, and applications." Journal of Modern Power Systems and Clean Energy 10.4 (2022): 805-817. (Year: 2022).*

Palmer et al., "A Pallet Costing System for Wood Pallet Manufacturers: Version 1.0 for Windows®", USDA Forest Service General Technical Report NE-293, Apr. 2022, 19 pages.

Fishbowl, "Automate Your Warehouse Inventory", webpage accessed at https://try.fishbowlinventory.com/warehouse-management-system/?utm_source=google&utm_term=inventory%20and%20warehouse%20management%20software&utm_campaign=G-Search-Warehouse&utm_adgroup=&utm_medium=cpc&gad_source=1&gclid=Cj0KCQjw3ZayBhDRARIsAPWzx8qEp16IZDe1EeUGS-_tRWFL2HZyHFI_K6m3q6RrS28pev2DB9RIgUcaAsmNEALw_wcB on May 17, 2024, 5 pages.

"Prologis Announces Major EV Truck Installations in Souther California," PRNewswire, Nov. 15, 2022, accessed at https://www.prologis.com/sites/corporate/files/documents/2022/11/2022-11-15-Prologis-Announces-Major-EV-Truck-Installations-in-Southern-California.pdf on Nov. 21, 2023, 3 pages.

"WattEV opens electric commercial truck charging depot at Port of Long Beach—largest of its kind in the nation," PRN Top Stories Newsletters, Jul. 25, 2023, accessed at https://www.prnewswire.com/news-releases/wattev-opens-electric-commercial-truck-charging-depot-at-port-of-long-beach--largest-of-its-kind-in-the-nation-301885708.html on Nov. 21, 2023, 5 pages.

Liz Young, "Warehouse Developers See Spark of Demand for Electric-Vehicle Chargers," Wall Street Journal, Jul. 21, 2022, accessed at https://www.wsj.com/articles/warehouse-developers-see-spark-of-demand-for-electric-vehicle-chargers-11658430367 on Nov. 21, 2023, 3 pages.

International Search Report and Written Opinion in PCT/US2024/028088, dated Sep. 11, 2024, 16 pages.

* cited by examiner

1100

MICROGRID CONTROL SYSTEMS AND ALGORITHMS FOR OPTIMIZING ENERGY PERFORMANCE FOR FACILITIES

CROSS-REFERENCE TO RELATED APPLICATIONS

This application claims the priority benefit of U.S. Provisional Application No. 63/564,217, filed Mar. 12, 2024, and U.S. Provisional Application No. 63/501,269, filed May 10, 2023, the entire contents of which applications are incorporated herein by reference.

TECHNICAL FIELD

This document generally describes devices, systems, methods, and algorithms related to computer-automated analysis of signals from a plurality of components on a facility-level to automatically coordinate energy consumption and production of the plurality of components, and to optimize performance of the facility across a plurality of factors.

BACKGROUND

Facilities, such as buildings, warehouses, factories, and others can consume significant amounts of energy as part of their operation. For example, storage facilities, such as warehouses, distribution centers, or other type of facilities that manage, maintain, and/or move various types of items, cases of items, and/or pallets of cases or items, may use energy to regulate temperature and to operate machinery (e.g., automated and robotic systems, forklifts) within the storage facility. The items stored in the storage facility can be temperature-sensitive, and can include goods and/or products including but not limited to fresh produce, meats, vegetables, other food items, perishable and/or non-perishable food items, and/or other types of non-food items (e.g., furniture, clothes, home products). The storage facility can have an automated implementation (e.g., operations within the facility are performed by robots and other autonomous vehicles), a manual implementation (e.g., operations are performed by human workers), and/or a semi-automated implementation (e.g., operations are performed by both autonomous vehicles and human workers). The storage facility can include various components that allow for operations to be performed therein. For example, the components can include energy sources, including but not limited to solar arrays, generators, batteries, and/or electrical power from one or more grids. The storage facility can include components that consume energy, including but not limited to compressors, cooling systems, other refrigeration systems, and/or vehicles and/or human workers that perform operations in the facility more generally. The storage facility can produce and consume energy in order to perform operations over one or more periods of time, such as short, medium, and long-term timeframes.

SUMMARY

The document generally describes technology for microgrid control devices, systems, assets, and techniques that leverage computer-automated analysis of signals from various components (e.g., assets) in an environment (e.g., on a facility-level, at a facility, across one or more energy markets) to automatically coordinate energy consumption and production of the components, and to optimize performance of the facility across one or more factors. More specifically, a centralized controller associated with a facility can be configured to monitor and assess conditions for the facility (e.g., energy consumption, facility operations, blast freezing operations, energy market conditions, electric vehicle charging operations) to determine control operations (e.g., controls, control set points) for the various components (e.g., batteries, solar arrays, charging units, mainspring generator, flywheeling technology, blast cells) in the facility. The control operations can be determined using machine learning, such as reinforcement learning models. The control operations can be determined at predetermined time intervals and then transmitted to component controllers for execution. Over time, the model(s) used by the centralized controller can learn accurate and optimal control operations that, when executed, can minimize costs for the facility/achieve one or more optimization functions.

Microgrids can provide for significant load generation and consumption flexibility. A microgrid of a facility can leverage the assets/components of the facility that generate and consume loads in order to reduce reliance on utilities and further to reduce waste. The disclosed technology can be used to leverage operations of the assets of the facility before looking to alternative power sources to reduce waste in the facility. The disclosed technology can also be used to determine optimal ways in which to shift loads at the facility to achieve low energy costs and high energy efficiency in the facility.

Facilities may be equipped to use energy from multiple different energy sources, such as power provided from an electric grid, solar power provided by solar panels, energy provided by batteries, and energy provided via generators, such as linear generators using natural gas. Facilities may include components such as solar panels, batteries, mainspring generators, and charging stations/units that can be programmed to use processes that permit for energy to be stored within the facility for later use, and/or processes that permit for thermal energy to be stored within the components of the facility (e.g., store thermal energy by supercooling items in a storage facility). Additionally, other components and processes can be used to time shift consumption of energy within the facility so long as it is within sufficient operational parameters of the facility, such as delaying various operations (e.g., blast freezing goods entering a warehouse). Given a wide variation in each of these components, a number of possibilities can evaluate information to achieve efficient operation of the facility (e.g., maximizing energy efficiency, lowest energy cost for operating facility, lowest carbon footprint for facility), but can also present computational complexity that may be difficult and an impediment to real-time computation, evaluation, and execution. Accordingly, the disclosed technology provides for microgrid controllers, systems, and processes that can be configured to evaluate, coordinate, and determine efficient operation for facilities across a variety of disparate energy production, storage, and consumption components, particularly with regard to ever-changing conditions for these components and the facilities.

The disclosed technology can balance energy efficiency of facilities across multiple different time windows, which can aid in blending short-term actions that may provide maximum efficiency presently but which may decrease the energy efficiency of the facility across a longer time window. A plurality of factors can be considered, including short, medium, and long-term considerations and/or performance optimizations. A computing system can operate as a centralized controller that receives signals and other information from facility-level controllers that manage the plurality of components in the facility. The plurality of components may include, but are not limited to, solar arrays, mainspring generators, battery systems, electrical power from grids, other energy sources, compressors, blast cells, refrigeration and/or cooling systems, and/or other facility vehicles and components that are used in operation of the facility (e.g., forklifts, automated vehicles). The facility-level controllers can be configured to coordinate and control operations of any one or more of the abovementioned plurality of components. The computing system can be a higher-level controller configured to receive the signals from the facility-level controllers, make determinations for improving and optimizing performance of the facility as a whole in short, medium, and/or long-term timeframes, and push control signals back out to the facility-level controllers to achieve short, medium, and/or long-term performance optimizations at the facility.

For example, the computing system can apply machine learning models and other rules and/or algorithms to the received signals to coordinate the energy consumption and production across the plurality of components in a manner that balances short, medium, and long-term performance optimization considerations of the facility. Using the disclosed technology, the computing system can blend the received signals and predict performance (e.g., energy consumption, energy production, carbon emissions, energy costs) of the facility over one or more timeframes to adaptively determine and execute performance optimizations at the facility. Thus, using the disclosed technology, the facility's performance may be optimized across one or more factors in the short, medium and long-term timeframes.

The disclosed technology can further provide electric vehicle (EV) charging capabilities and vehicle to load operations. EV charging can be performed with charging stations deployed in a dock area of the facility. Assets, such as EV trucks, truck refrigeration units (TRUs) of delivery trucks, and/or other mobile EV units (e.g., EV drive assist units that can be coupled to gas-powered trucks) can arrive at variable times at the facility and require charging. The disclosed technology can be used to determine optimal operations for servicing these truck loads in light of other energy consumption and operations in the facility. With charging stations in the dock area, batteries of the EVs and/or the TRUs can be plugged in and charged while items are being unloaded or loaded from the EVs in the dock area. In some implementations, the disclosed technology may also perform vehicle to load operations, in which the disclosed technology in the facility can pull loads from batteries of the EVs and/or TRUs and feed those loads back into the facility. A centralized controller of the facility may receive information about such charging and/or vehicle to load operations, which may be used by the controller to generate control operations, such as set points, for one or more assets of the facility, as described herein.

One or more embodiments described herein can include a system for dynamically controlling energy performance operations in a facility, the system including: a group of energy sources that can be configured to produce, consume, and store energy used by components in the facility to perform facility operations, a group of controllers, each of the group of controllers being configured to control an energy source of the plurality of energy sources, each of the group of controllers including: a component controller that can be configured to execute instructions to control operations of the energy source and generate signals indicating performance of the energy source in real-time, and a software interface that can be configured to provide communication amongst the group of controllers and a centralized controller for the facility. The system can also include a centralized controller for the facility that can be configured to interface with at least the group of controllers, the centralized controller including: a software interface that can be configured to provide communication amongst the group of controllers and the centralized controller, the software interface being configured to receive, from the group of controllers, the generated signals, and at least one decision engine that can be configured to: receive, via the software interface of the centralized controller, the generated signals, retrieve, from a data store, at least one model, the model having been iteratively trained using reinforcement learning techniques and training data that includes (i) at least a portion of the received signals and (ii) decisions made by the at least one decision engine, the model having been trained, based on the training data, to generate control operations for one or more of the group of energy sources that achieves an optimized cost function for the facility, provide at least a portion of the received signals as input to the model, receive, as output from the model, control operations for one or more of the group of energy sources in the facility for a predetermined period of time, and return the control operations to respective controllers amongst the group of controllers for the one or more of the group of energy sources for execution during the predetermined period of time.

The system can optionally include one or more of the following features. For example, the model can be a Proximal Policy Optimization (PPO) model. The group of energy sources can include a vehicle charging system, the vehicle charging system being configured to charge batteries of electric vehicles that arrive at the facility. The electric vehicles can include truck refrigeration units (TRUs). The vehicle charging system can include at least one charging unit that can be positioned at a dock door in the facility, the at least one charging unit being configured to receive an inbound electric vehicle and charge a power source of the inbound electric vehicle. The at least one charging unit can further be configured to perform vehicle to load operations, where performing the vehicle to load operations may include executing instructions, generated by the vehicle charging system, to draw a predetermined load from the inbound electric vehicle and store the drawn load for use by one or more of the group of energy sources of the facility.

The group of energy sources can include: a group of batteries, solar arrays, at least one mainspring generator, a refrigeration system, and a group of blast cells. The generated signals can include at least one of battery signals, solar array signals, mainspring generator signals, energy grid signals, energy market information, or facility operations information. The battery signals can include a current state of battery charge, a current state of battery rate of charge, a current state of battery rate of discharge, and reserved battery capacity. The solar array signals can include current solar production levels, cloud tracking information, image sensor-based cloud tracking and estimation information, macro-level facility information, solar market information, and weather condition information. The mainspring generator signals can include current energy production levels. The predetermined period of time can be a next 15 minutes. The predetermined period of time can be a next 3 hours.

The model could have been trained to generate the control operations for a solar array of the facility based on the generated signals satisfying one or more solar optimization criteria that may correspond to the predetermined period of time. Generating the control operations for the solar array can include generating instructions to use a predetermined quantity of solar power that may be generated over the predetermined period of time instead of power that can be generated by other energy sources amongst the group of energy sources. Generating the control operations for the solar array can include generating instructions to divert energy storage operations from the solar array to one or more of the group of energy sources over the predetermined period of time based on determining that the generated signals satisfy one or more energy diversion criteria.

In some implementations, the model could have been trained to generate the control operations for batteries of the facility based on the generated signals satisfying one or more battery optimization criteria that can correspond to the predetermined period of time. Generating the control operations for the batteries can include generating instructions to charge a subset of the batteries over the predetermined period of time based on determining that the generated signals satisfy one or more battery charge criteria. Generating the control operations for the batteries can include generating instructions to charge a subset of the batteries during a short-term timeframe based on predicting that other energy production levels during the short-term timeframe satisfy threshold energy levels that may be required to perform the facility operations during the short-term timeframe. Generating the control operations for the batteries can also include generating instructions to discharge power from a subset of the batteries over the predetermined period of time based on determining that the generated signals satisfy one or more discharge criteria over the predetermined period of time.

One or more embodiments described herein can include a system for dynamically controlling energy performance operations in a facility, the system including: a group of energy sources that can be configured to produce, consume, and store energy used by components in the facility to perform facility operations, a group of controllers, each of the group of controllers being configured to control an energy source of the group of energy sources, where each of the group of controllers may include: a component controller that can be configured to automatically control operations of the energy source in real-time and generate signals indicating performance of the energy source in real-time, and a software interface that can be configured to provide communication amongst the plurality of controllers and a centralized controller for the facility, and a centralized controller for the facility that can be configured to interface with at least the group of controllers. The centralized controller can include: a software interface that can be configured to provide communication amongst the group of controllers and the centralized controller, where the software interface can be configured to receive, from the group of controllers, the generated signals, and at least one decision engine that can be configured to: receive, via the software interface of the centralized controller, the generated signals, retrieve, from a data store, at least one model, the model having been iteratively trained using machine learning techniques and training data that may include (i) at least a portion of the received signals and (ii) decisions made by the at least one decision engine, provide at least a portion of the received signals as input to the model, receive, as output from the model, energy performance information for the facility for a current period of time, determine, based at least in part on the model output, energy performance optimization instructions over a future period of time, where determining the energy performance optimization instructions can include determining instructions for one or more of the group of energy sources that, in combination, may satisfy energy performance optimization objectives of the facility over the future period of time, and return the energy performance optimization instructions to respective controllers amongst the group of controllers for execution during the future period of time.

In some implementations, the embodiments described herein can optionally include one or more of the following features. For example, the group of energy sources can include: a group of batteries, solar arrays, at least one mainspring generator, an energy grid, a refrigeration system, a plurality of blast cells, and compressors. The at least one decision engine can include a short-term optimization engine, a medium-term optimization engine, and a long-term optimization engine. The short-term optimization engine can be configured to determine energy performance optimization instructions over a short-term timeframe, the medium-term optimization engine can be configured to determine energy performance optimization instructions over a medium-term timeframe, and the long-term optimization engine can be configured to determine energy performance optimization instructions over a long-term timeframe. In some implementations, the centralized controller can also: process, using a second machine learning-trained model, (i) the energy performance optimization instructions over the short-term timeframe, (ii) the energy performance optimization instructions over the medium-term timeframe, and (iii) the energy performance optimization instructions over the long-term timeframe, and generate, based on the processing, updated (i) energy performance optimization instructions over the short-term timeframe, (ii) energy performance optimization instructions over the medium-term timeframe, and (iii) energy performance optimization instructions over the long-term timeframe that satisfy energy performance objectives over at least one of the short-term timeframe, the medium-term timeframe, or the long-term timeframe.

As another example, the generated signals may include at least one of battery signals, solar array signals, mainspring generator signals, energy grid signals, energy market information, or facility operations information. The battery signals may include a current state of battery charge, a current state of battery rate of charge, a current state of battery rate of discharge, and reserved battery capacity. The solar array signals may include current solar production levels, cloud tracking information, image sensor-based cloud tracking and estimation information, macro-level facility information, solar market information, and weather condition information. The mainspring generator signals may include current energy production levels.

In some implementations, the future period of time can be at least one of a short-term timeframe, a medium-term timeframe, or a long-term timeframe. The short-term timeframe can be a next 15 minutes. The medium-term timeframe can be a next 3 hours. The long-term timeframe can be a next 2 days. The short-term timeframe can be a predetermined number of hours. The medium-term timeframe can be a predetermined number of days. The long-term timeframe can be a predetermined number of weeks. The short-term timeframe can extend a predetermined amount of minutes from the current period of time. The medium-term timeframe can extend a predetermined amount of hours from at least one of the short-term timeframe and the current period of time. The long-term timeframe can extend a predetermined amount of days from at least one of the short-term timeframe, the medium-term timeframe, and the current period of time. The medium-term timeframe can be between 10 to 20 times a duration of the short-term timeframe and the long-term timeframe can be between 10 to 20 times a duration of the medium-term timeframe.

As another example, determining, based at least in part on the model output, energy performance optimization instructions over a future period of time can include: generating solar array control instructions based on the model output satisfying one or more solar optimization criteria that corresponds to the future period of time. Generating solar array control instructions can include determining to use solar power as generated over the future period of time based on determining that the model output satisfies one or more solar power generation criteria over the future period of time. As another example, generating solar array control instructions can include determining to divert energy storage from a solar array to one or more of the group of energy sources over the future period of time based on determining that the model output satisfies one or more energy diversion criteria over the future period of time.

In some implementations, determining, based at least in part on the model output, energy performance optimization instructions over a future period of time may include: generating battery control instructions based on the model output satisfying one or more battery optimization criteria that corresponds to the future period of time. Generating battery control instructions can include determining to charge a subset of batteries in the facility over the future period of time based on determining that the model output satisfies one or more battery charge criteria over the future period of time. Generating battery control instructions can include determining to charge a subset of batteries in the facility during a short-term timeframe based on predicting from the model output that other energy production levels during the short-term timeframe satisfy threshold energy levels required to perform the facility operations during the short-term timeframe. Generating battery control instructions can include determining to discharge a subset of batteries in the facility over the future period of time based on determining that the model output satisfies one or more discharge criteria over the future period of time. Generating battery control instructions can include determining to maintain a predetermined battery storage level based on determining that the model output satisfies one or more energy storage criteria of the future period of time.

In some implementations, determining, based at least in part on the model output, energy performance optimization instructions over a future period of time can include: generating energy grid usage instructions based on the model output satisfying one or more energy grid criteria that corresponds to the future period of time. Determining, based at least in part on the model output, energy performance optimization instructions over a future period of time can include: generating cooling instructions for the facility based on the model output satisfying one or more refrigeration criteria that corresponds to the future period of time. Determining, based at least in part on the model output, energy performance optimization instructions over a future period of time can also include: generating mainspring generator control instructions for the facility based on the model output satisfying one or more mainspring generator criteria that corresponds to the future period of time. Generating mainspring generator control instructions can include determining to activate a mainspring generator over the future period of time based on the model output satisfying one or more energy consumption criteria of the future period of time.

Determining, based at least in part on the model output, energy performance optimization instructions over a future period of time can also include: generating facility operations instructions based on the model output satisfying one or more operations criteria that corresponds to the future period of time. In some implementations, the model can also be configured to process the received signals to determine cloud tracking information over the current period of time based on at least one of (i) detecting shadows as clouds pass over a grid of solar panels and (ii) determining a change in production levels as the clouds pass over the grid of solar panels. The model can also determine, based on the cloud tracking information and for one or more future periods of time, at least one of a cloud size, a cloud movement speed, and a projected cloud coverage.

In some implementations, the at least one decision engine can further be configured to generate a charging schedule for at least one electric vehicle that can be configured to arrive at the facility. Generating the charging schedule can include: receiving data about the at least one electric vehicle, providing at least a portion of the received signals and the data about the at least one electric vehicle as input to the model, receiving, as output from the model, conditions for charging one or more components of the at least one electric vehicle upon arrival at the facility, generating the charging schedule based at least in part on the conditions for charging, and returning the charging schedule for execution by at least one charging unit in the facility, the charging unit being configured to charge components of electric vehicles at the facility. The at least one decision engine can also be configured to: modify at least one of a schedule of operations for the facility and the energy performance optimization instructions based on the charging schedule, and return the modified at least one of the schedule of operations for the facility and the energy performance optimization instructions to the respective controllers amongst the plurality of controllers for execution. The system further can include at least one charging unit that can be configured to be positioned in a dock area of the facility and further can be configured to charge components of electric vehicles at the facility.

One or more embodiments described herein can include a method for dynamically controlling energy performance operations in a facility, the method including: receiving, by a centralized controller, signals generated by a component controller amongst a group of controllers that can be configured to control a group of energy sources, the component controller being configured to automatically control operations of an energy source amongst the group of energy sources in real-time and generate signals indicating performance of the energy source in real-time, retrieving, from a data store by the centralized controller, at least one model, the model having been iteratively trained using machine learning techniques and training data that may include (i) at least a portion of the received signals and (ii) decisions made by at least one decision engine of the centralized controller, providing, by the centralized controller, at least a portion of the received signals as input to the model, receiving, by the centralized controller as output from the model, energy performance information for the facility for a current period of time, determining, by the centralized controller and based at least in part on the model output, energy performance optimization instructions over a future period of time, where determining the energy performance optimization instructions can include determining instructions for one or more of the group of energy sources that, in combination, satisfy energy performance optimization objectives of the facility over the future period of time, and returning, by the centralized controller, the energy performance optimization instructions to respective controllers amongst the group of controllers for execution during the future period of time.

The method can optionally include one or more of the abovementioned features.

The devices, system, and techniques described herein may provide one or more of the following advantages. For example, the disclosed technology enables the facility to maximize its operational resiliency. Intelligent, automated control of energy assets in the facility can help the facility proactively plan for potential energy grid blackouts and/or brownouts. Moreover, the disclosed technology allows for coordination of component operations in the facility to achieve performance (e.g., energy consumption, energy production, energy cost, carbon emission) efficiencies in the facility over short, medium, and/or long-term timeframes. The facility-level controllers can control respective components in the facility in real-time. Signals associated with these control schemes can be transmitted to the centralized controller, which can process the signals using machine learning techniques in order to determine operations for optimizing the control schemes of the various facility components relative to each other and in light of balancing short, medium, and/or long-term optimization goals of the facility as a whole. The centralized controller can instruct any of the facility-level controllers to adjust their control schemes accordingly, whereas previously, the facility-level controllers may not have access to signals from other controllers about performance and/or operations of the other components in the facility. Furthermore, the centralized controller can generate controls that leverage the facility itself as an active energy asset, thereby treating the facility and its components as thermal batteries to charge and discharge within safe operating temperatures and other operating conditions. The centralized controller can communicate with the components in the facility, such as the refrigeration system, to transform each room, location, or other portion of the facility into an energy prosumer (an entity that both consumes and produces power). With the disclosed technology, control operations of the components in the facility can be streamlined and balanced to achieve short, medium, and/or long-term optimization goals of the facility as a whole.

Similarly, the disclosed technology provides for the processing and analysis of various different signals to be outsourced to the centralized controller, thereby permitting the facility-level controllers to continue performing lightweight processing and real-time control scheme/operation determinations (e.g., turning on a refrigeration system when a particular location in the facility reaches a threshold temperature value, charging a battery array when the battery array reaches a charge that is less than a threshold charge value). As a result, the facility-level controllers can maintain the components in the facility at predetermined or expected performance levels in real-time. The centralized controller can perform heavyweight processing as signals are received in real-time and/or near real-time from the facility-level controllers. The centralized controller can adaptively determine control scheme/operations updates for any of the components in the facility that balance both performance optimization of the individual components and performance optimization of the facility as a whole over the short, medium, and/or long-term timeframes. Moreover, latency can be minimized by employing an hierarchical architecture of multiple centralized controllers, where each centralized controller can be responsible for some quadrant of a control scheme at the facility. As a result, tasks can be bifurcated and processing power can be offloaded to the various centralized controllers to improve proficiency, efficiency, accuracy in determining operations to optimize performance in the facility.

Similarly, the disclosed technology provides contingency ride-through to add to the centralized controller and the facility's overall resiliency. For example, the centralized controller can receive signals and send updated set point values to one or more of the individual components in the facility at any point in time. However, in the event of a loss of power, WIFI, or other network communication/connectivity between components and the centralized controller, the individual components can actively and safely manage their respective assets (e.g., according to standard settings, settings that were previously determined by the centralized controller before the loss of communication, etc.). Additionally, if one or more of the individual components fail (e.g., a mainspring generator goes offline), then the centralized controller can auto-compensate for this failure until the individual component is fixed (or otherwise comes back online). The hierarchy of control described herein can allow the centralized controller to auto-adapt control of the other components in the facility in real-time. Therefore, the facility as a whole can continuously operate efficiently and optimize performance regardless of communication interruptions or potential component failures. As another example, if the central controller makes a request that may be unrealistic or unsafe for an individual asset/component, that recommendation can be rejected or partially fulfilled by the affected asset/component. The centralized controller may then take note of this and readjust other asset/components in the facility accordingly to ensure continued performance optimization in the facility.

The disclosed technology also provides for iterative model generation and training using machine learning techniques to improve accuracy of the centralized controller's performance optimization determinations in the short, medium, and long-term timeframes. The centralized controller can automatically determine control operations to be executed by one or more of the facility-level controllers based on blending and analysis of real-time facility signals, near real-time facility signals, historic data associated with the facility, and/or model predictions of facility operations from a variety of data sources. The centralized controller can iteratively improve the models and/or algorithms that are used to make the control operations as signals are received and/or processed by the centralized controller. Over time, the centralized controller can more accurately make predictions and determinations about control operations, performance of various components in the facility, and performance of the facility as a whole, which can further improve the facility's ability to achieve short, medium, and/or long-term performance optimization goals.

As another example, the architecture of the disclosed technology allows for the technology to be easily adapted or retrofitted to wide variations of facilities without requiring additional customization of the architecture. For example, the centralized controller can be easily fitted into existing control systems architecture at the facilities. The centralized controller simply communicates with other facility-level controllers to receive control signals and manage operations in the facility as a whole in order to achieve short, medium, and/or long-term performance optimization goals. The disclosed technology can be easily and quickly plugged into existing facilities for realization of immediate performance optimization goals. As a result, the disclosed technology is modular and can communicate with third party control systems that may operate in various different facilities.

The architecture of the disclosed technology also can allow for collaboration of multiple software stacks that can be hosted independently at various levels of control. For example, through API communications, tools such as energy cost and demand prediction models and other forecasting models/software tools can be seamlessly integrated to control and optimize operations in the facility.

The hierarchical nature of the disclosed control scheme can also provide opportunities for inter-optimization between multiple different facilities. For example, at a campus having 3 facilities on site, all 3 facilities can be integrated with the disclosed microgrid technology. An additional centralized controller can then be integrated on the campus to control exchange of energy between the 3 facilities (e.g., if 1 facility on campus has extra battery storage energy, this extra energy can be dispatched to the other facilities to compensate for a lack of energy at those facilities). Such an inter-facility control system can allow for making informed decisions based on real-time performance measurements of various facilities. These decisions can be used to predict, for example, rooftop solar performance and various types and levels of energy grid stability issues.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to technology for computer-automated assessment of control operations in a facility to optimize performance of the facility across one or more factors, such as energy cost and carbon emissions. The disclosed technology can provide for coordinating energy consumption and production across multiple different components in the facility in such a way that balances across short, medium, and long-term timeframe performance optimization goals of the facility. As described herein, a centralized controller can communicate with various facility-level controllers that control real-time operation of the components in the facility. The centralized controller can receive signals from the other controllers, including but not limited to solar production signals, mainspring generator production signals, battery signals, grid signals, energy market information, and/or other facility signals. The centralized controller can apply machine learning-trained models and/or algorithms to the received signals to solve for short, medium, and/or long-term performance optimization goals/objectives of the facility. By balancing objectives, such as lower energy costs and/or lower carbon emissions, across different timeframes, the centralized controller can generate control operations for the components of the facility that ensure that at least minimum energy capacity is provided to the facility as needed in the short term while also coordinating energy capacity, production, and consumption over broader timeframes to achieve energy-related performance optimization goals/objectives at the facility. The facility can be any variety of warehouses, distribution centers, storage facilities, or other types of buildings/structures that can utilize energy from a variety of energy sources to power operations, machines, vehicles, and other processes in the facility. As a non-limiting example, the present disclosure may be described from the perspective of a storage facility.

Figure 1A:
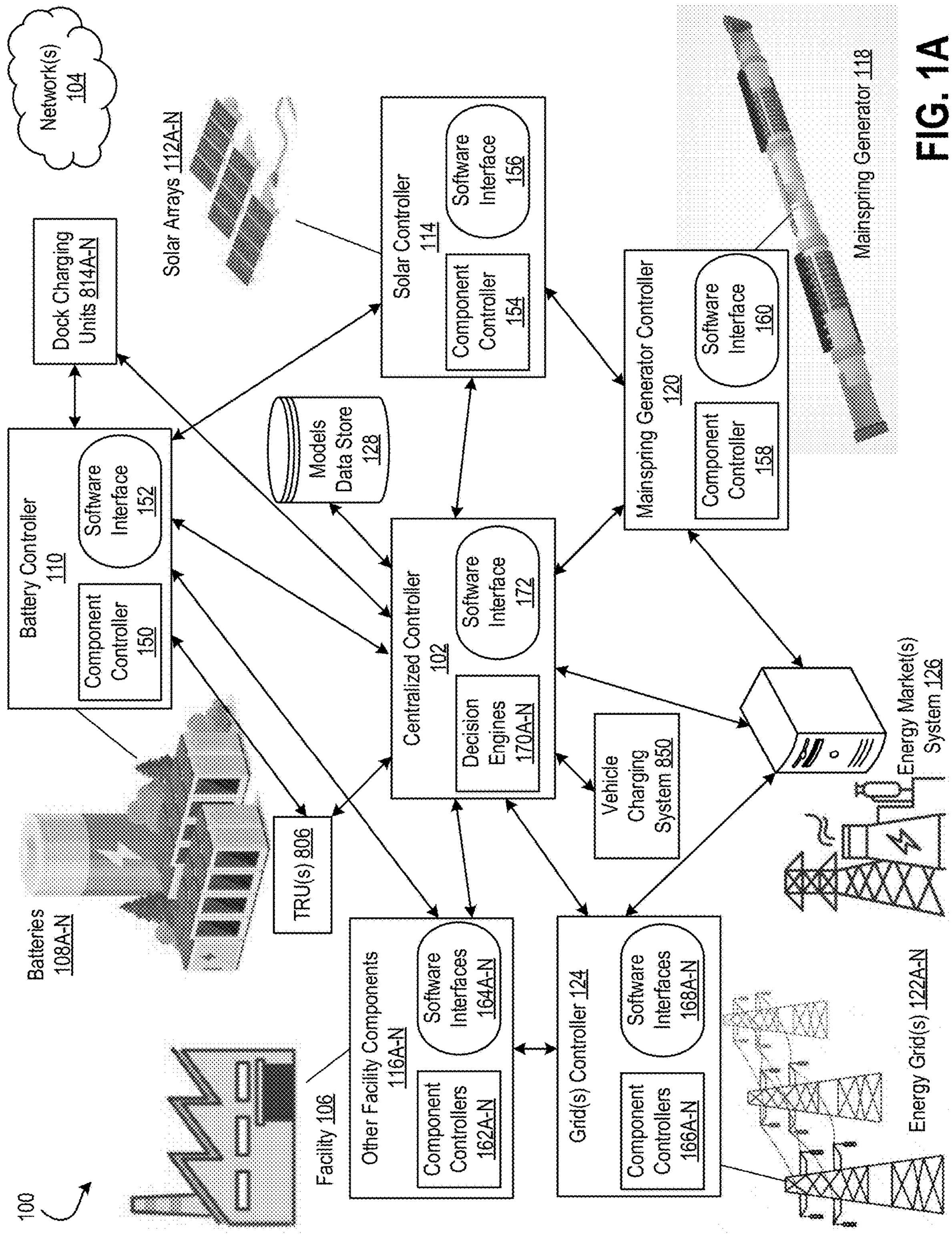
FIGS. 1A-B are conceptual diagrams of a system for automated control and assessment of operations in a facility to achieve performance optimization objectives of the facility.
Figure 1B:
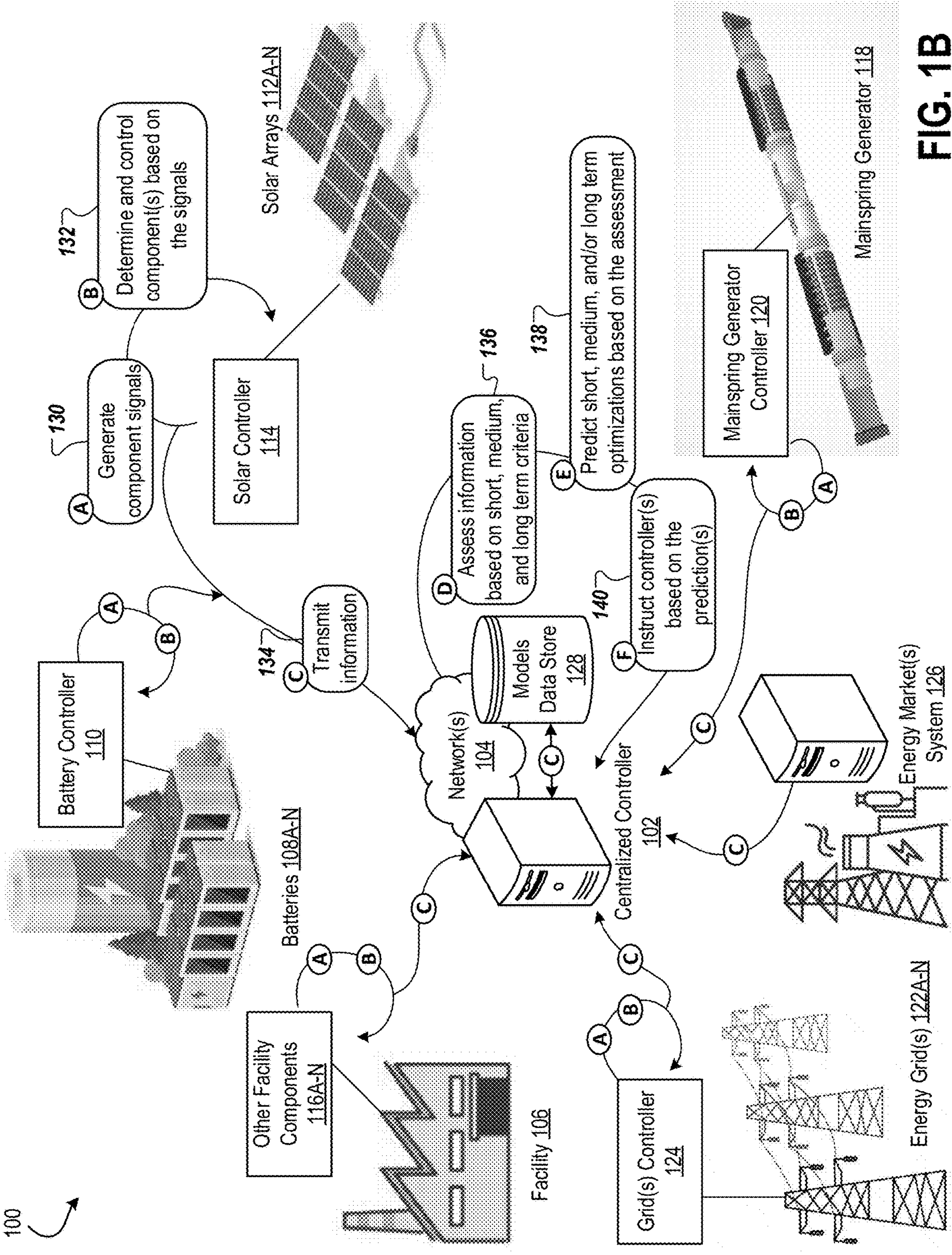
Figure 6A:
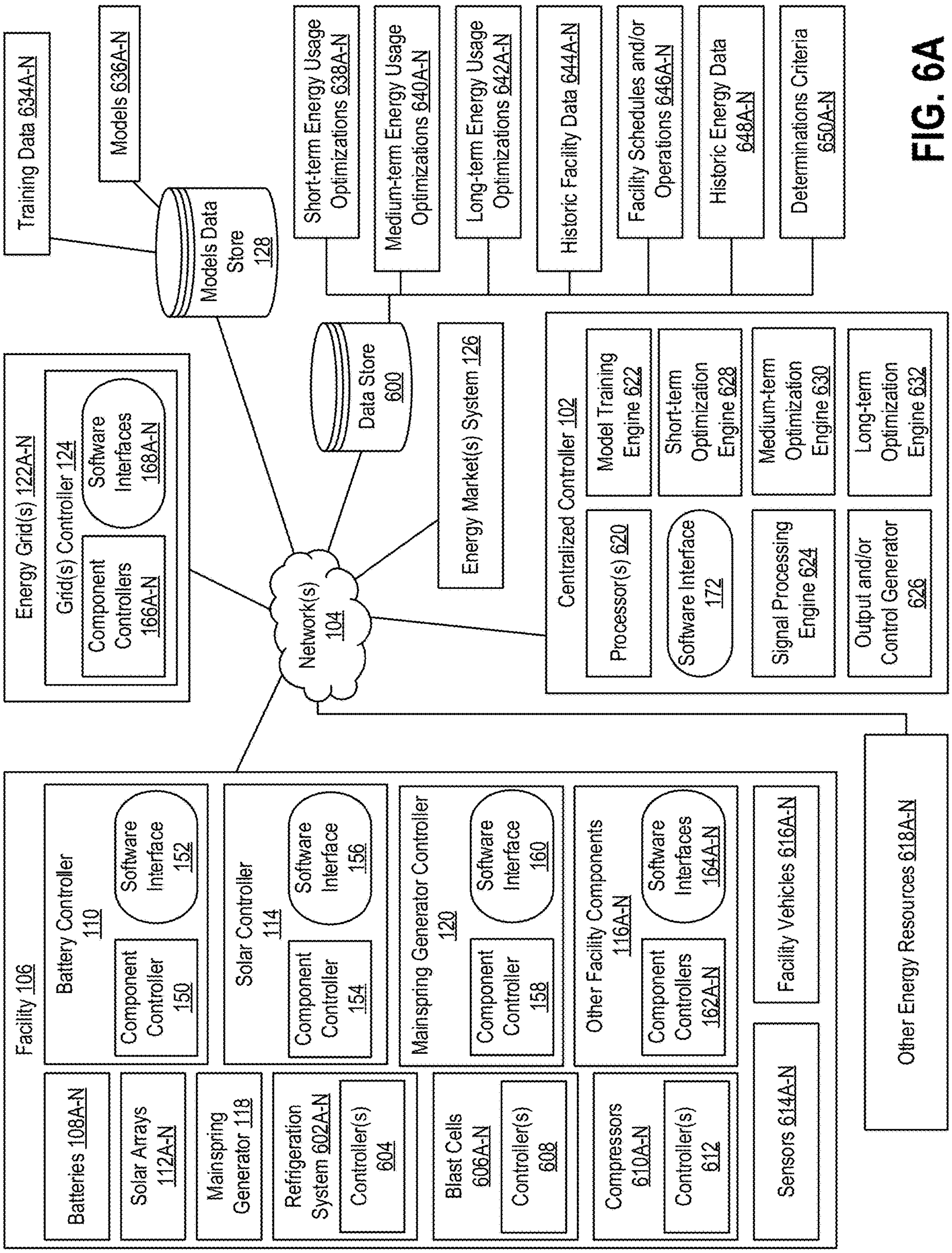
FIGS. 6A and 6B are system diagrams of components that can be used to perform the disclosed techniques.

Referring to the figures, FIGS. 1A-B are conceptual diagrams of a system 100 for automated control and assessment of operations in a facility 106 to achieve performance optimization objectives of the facility 106. The facility 106 can be a storage facility, as described herein. Referring to both FIGS. 1A-B, various components within the facility 106 can communicate (e.g., wired, wirelessly) with each other and a centralized controller 102 via network(s) 104. The facility 106 can be any type of storage facility, warehouse, distribution center, or other facility, structure, or building having various components that consume, produce, and/or store energy. The components can include but are not limited to batteries 108A-N, solar arrays 112A-N, mainspring generator(s) 118, and other facility components 116A-N (e.g., blast cells, compressors, refrigeration systems, cooling systems). The components of the facility 106 can also communicate or otherwise interact with components external the facility 106, including but not limited to energy grid(s) 122A-N. Refer to FIG. 6A for further discussion about the components of the facility 106.

As shown in FIG. 1A, each of the components may include respective controllers configured to independently and selectively control the component as well as interface with the other controllers and/or centralized controller 102. For example, the batteries 108A-N can be controlled by a battery controller 110. The solar arrays 112A-N can be controlled by a solar controller 114. The mainspring generator 118 can be controlled by a mainspring generator controller 120. The other facility components 116A-N can each of their respective component controllers 162A-N and their respective software interfaces 164A-N (e.g., for interfacing with other controllers described herein). The energy grid(s) 122A-N can be controlled by grid(s) controller 124.

In brief, the battery controller 110 can include at least a component controller 150 and a software interface 152. The component controller 150 can be hardware, such as a native controller, that operates to control operations of the batteries 108A-N in real-time, near real-time, and/or over one or more other periods of time. The software interface 152 can be a separate software component of the battery controller 110 configured to communicate with the centralized controller 102 and/or one or more other controllers described herein.

Similarly, the solar controller 114 can include a component controller 154 and a software interface 156. The mainspring generator controller 120 can include a component controller 158 and a software interface 160. The grid(s) controller 124 can include component controllers 166A-N and software interfaces 168A-N. As mentioned above, each of the other facility components 116A-N can also include respective component controllers 162A-N and software interfaces 164A-N.

The centralized controller 102 can be a computing system, cloud-based system, network of computing devices and/or systems, edge computing device, and/or other controller or computer associated with the facility 106. The centralized controller 102 can be physically located at the facility 106. The centralized controller 102 can be physically remote from a location of the facility 106. The centralized controller 102 can be a higher-level controller that is configured to read and interpret states of the various components in the facility 106 in real-time and/or near real-time. Reading the states of the components can include receiving signals and other information from the controllers of the components described above and throughout this disclosure.

Figure 11:
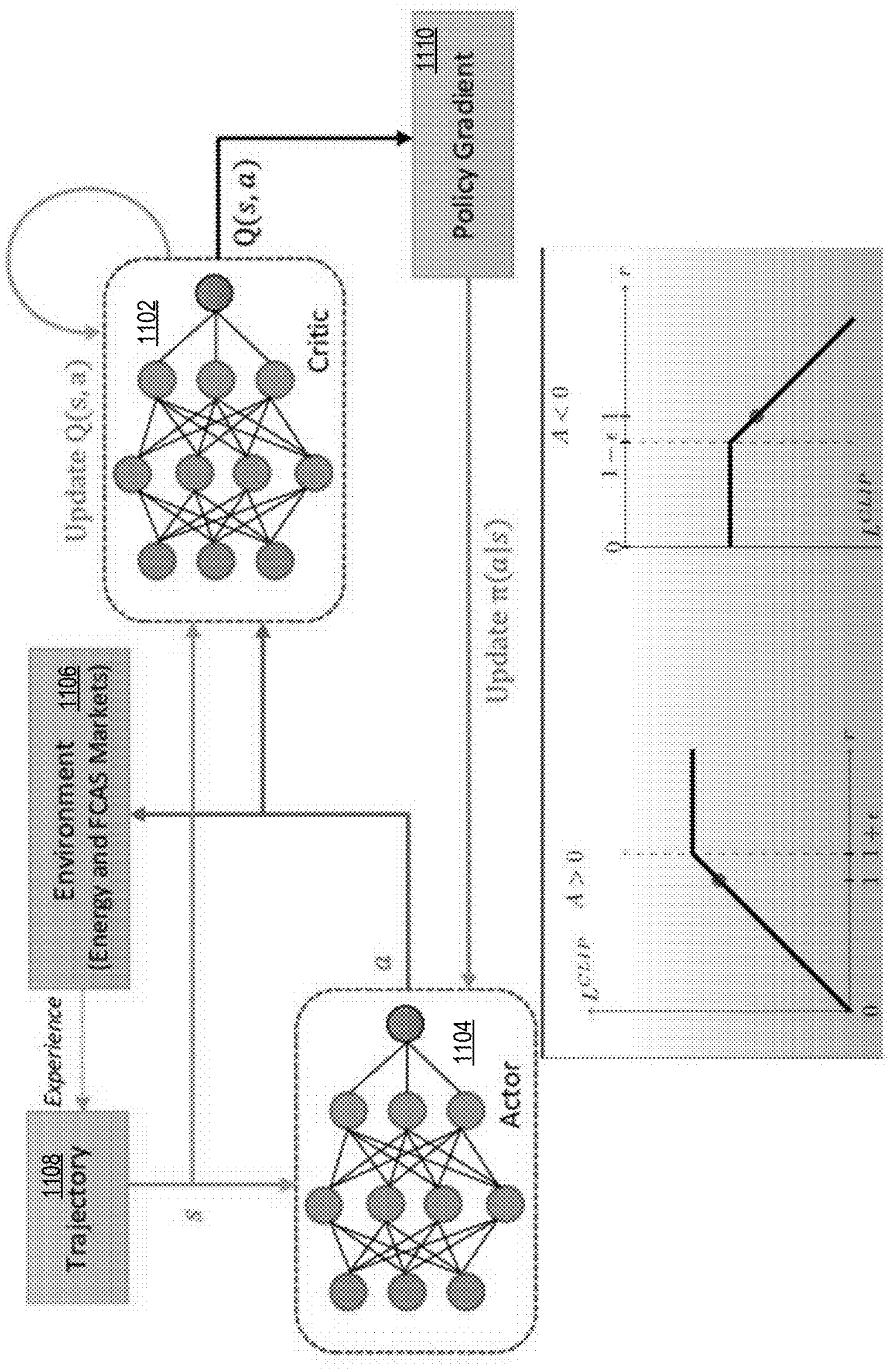
FIG. 11 is a conceptual diagram of a Proximal Policy Optimization (PPO) model for reinforcement learning, which can be used to determine automated control and assessment of operations in a facility.

The centralized controller 102 can implement one or more algorithms and/or machine learning models to interpret states of components in the facility 106 or an environment more generally to generate control operations, such as set points, for one or more of the components (e.g., assets that may be controllable). Refer to FIG. 11 for an example model that can be used by the centralized controller 102 to determine controls for the facility 106. The centralized controller 102 can generate operations at predetermined time intervals. For example, the control operations (e.g., set points) can be generated and/or transmitted to respective components every 5 minutes. The control operations can be generated and/or transmitted to respective components every 1 minute, 3 minutes, 8 minutes, 10 minutes, etc. Computations performed by the controller 102, such as by using the model disclosed in FIG. 11, can be lightweight and efficient.

The environment can include operations of the facility 106, grid pricing and conditions, states of the components such as the batteries 108A-N, the solar arrays 112A-N, and/or the mainspring generator 118. The centralized controller 102 can also receive data from transport refrigeration units (TRU(s)) 806, dock charging units 814A-N, and/or a vehicle charging system 850, which can be used as inputs to generate control operations for one or more of the facility 106 components. Refer to at least FIGS. 6B, 8, 9, 10A, and 10B for further discussion about charging and vehicle to load operations.

The same algorithm and/or model(s) can be applied to any facility, including but not limited to a network of facilities that includes the facility 106. The same model(s) can be a reinforcement learning model that can relearn each facility that it is deployed at, thereby providing a scalable solution. For example, the model can be trained on historic data associated with one or more facilities, then deployed in a first facility, such as the facility 106. Once the model learns in the first facility, it can be deployed in other facilities and can automatically relearn each of the other facilities. In some implementations, the model may not be trained with the historic data before being deployed in the first facility. Instead, the model can be deployed at the first facility, and it may reject all control operations/set points for a predetermined period of time, such as a first week of deployment. Over time, the model can then learn to accurately accept and/or modify or generate the control operations/set points for the first facility, thereby requiring little to no effort of relevant users to train or modify the model as it is deployed at each of the other facilities.

Generating the control operations can include generating set points for different types of actions of the components, such as the batteries 108A-N and/or the mainspring generator 118. The actions can include starting or stopping use/operation of the component(s). As another example, the actions can include determining an amount of battery power to charge and/or discharge throughout the day or another predetermined time period for the facility 106. One or more seasonal factors can also impact the centralize controller 102's generating of control operations for one or more of the components. A reinforcement learning model that is used by the controller 102 (refer to FIG. 11 for further discussion about the reinforcement learning model) to generate the control operations can be trained to learn one or more of the seasonal factors and other factors that may impact control operations. The seasonal factors can include, for example, variability from solar during winter seasons, higher grid prices during summer seasons, etc. Over time, the model knows a current season and how to adjust the control operations based on known and learned factors associated with the current season.

More particularly, any of controllers and/or components of the facility 106 described herein can transmit energy usage information/data to the centralized controller 102, which can then use the received information to determine optimized controls of one or more of the components of the facility 106 over one or more timeframes in order to achieve one or more energy optimization objectives (e.g., reduced carbon footprint, reduced carbon emissions, reduced energy costs, reduced energy consumption). The centralized controller 102 can interface or communicate with a models data store 128, which can be configured to store a plurality of machine learning-trained models for use by the centralized controller 102 in processing the information/data received from the controllers and/or components of the facility 106. The models can be generated and trained by the centralized controller 102. In some implementations, the models can be trained by another or different remote computing system, stored in the models data store 128, then accessible by the centralized controller 102 for runtime use. The models data store 128 can be any type of data repository, database, cloud-based data storage system, or other data storage system.

The centralized controller 102 may also communicate with energy market(s) computing system(s) 126 and/or the energy grid(s) controller(s) 124 for the energy grids 122A-N to receive energy grid state information/signals and/or pricing market information/signals. Information/signals received from the energy market system 126 and/or the grid controller 124 can be processed, assessed, and/or interpreted by the centralized controller 102 as described herein to determine one or more control actions that can be implemented at the facility 106 in order to achieve performance optimization objectives over one or more periods of time (e.g., short, medium, and/or long-term timeframes). The information received from the energy market system 126 and/or the grid controller 124 can be processed in combination with the information/signals receives from the controllers described herein.

Whereas controllers of the components in the facility 106 handle real-time and/or near real-time control of the respective components, the centralized controller 102 can determine higher-level facility-wide decisions to optimize how energy is produced, consumed, and/or made available to components in the facility 106 over short, medium, and/or long-term timeframes. Thus, the centralized controller 102 can include decision engines 170A-N and a software interface 172. The decision engines 170A-N can be configured to process any of the signals received from the components described herein and determine operations and energy usage optimizations for the facility over the short, medium, and/or long-term timeframes. The software interface 172 can be configured to provide for communication between the centralized controller 102 and the other controllers described herein.

As an illustrative example, the centralized controller 102 can process and assess the above-described signals and/or information to determine how much energy to store in the batteries 108A-N over one or more timeframes. The centralized controller 102 can determine, based on processing the received signals with one or more models retrieved from the models data store 128, that an extra 10% of energy should be stored in the batteries 108A-N because the centralized controller 102 predicts that solar energy production will be low (e.g., less than some threshold level, less than historic solar energy production levels) over a next predetermined timeframe (e.g., next 5 hours, 10 hours, 15 hours, 20 hours, 24 hours, or other short, medium, and/or long-term timeframes) and/or that energy costs are going to increase at the energy grids 122A-N (e.g., by more than a threshold amount, by more than historic price increases) over a next predetermined timeframe (e.g., next 5 hours, 10 hours, 15 hours, 20 hours, 24 hours, or other short, medium, and/or long-term timeframes). As a result, the centralized controller 102 can determine that leveraging battery energy production and retention over the next predetermined timeframe can help the facility 106 achieve its short, medium, and/or long-term energy and performance optimization objectives. The centralized controller 102 can make this determination at one of the decision engines 170A-N can transmit instructions to the battery controller 110 via the software interface 172 of the centralized controller 102. The battery controller 110 can receive the instructions via the respective software interface 152 and transmit the instructions to the component controller 150 of the battery controller 110 for automated execution. The centralized controller 102 can continue to receive signals from the battery controller 110 after execution of the instructions and signals from other controllers as well to iteratively and continuously determine how to improve energy usage, consumption, and/or retention operations in the facility 106 over the short, medium, and/or long-term timeframes. Furthermore, the centralized controller 102 can generate controls that leverage various different components in the facility 106 itself as an active energy asset, thereby treating the facility 106 and its components as thermal batteries to charge and discharge within safe operating temperatures and other operating conditions. The centralized controller 102 can therefore communicate with the components in the facility 106 as described herein to transform each room, location, or other portion or component of the facility 106 into an energy prosumer (an entity that both consumes and produces power).

Accordingly, as shown as an illustrative example in FIG. 1B, the solar controller 114 of the solar arrays 112A-N can generate component signals (block A, 130). The component signals can indicate operations, energy information, and other information about the respective component in real-time or near real-time.

The solar controller 114 can also determine and control the solar arrays 112A-N based on the signals (block B, 132). Block B (132) can be performed at any time, before, during, or after any of the other blocks described in reference to FIG. 1B.

In block C (134), the solar controller 114 can transmit information to the centralized controller 102. The information can include one or more of the component signals of block A (130) and/or the controls that are performed in block B (132).

Any one or more of the other components described herein can also perform one or more of blocks A (130), B (132), and/or C (134). For example, the battery controller 110 can perform blocks A (130), B (132), and/or C (134) before, during, or after performance of one or more other blocks described herein. The other facility components 116A-N can perform blocks A (130), B (132), and/or C (134) before, during, or after performance of one or more other blocks described herein. The grid(s) controller 124 can perform blocks A (130), B (132), and/or C (134) before, during, or after performance of one or more other blocks described herein. The mainspring generator controller 120 can perform blocks A (130), B (132), and/or C (134) before, during, or after performance of one or more other blocks described herein.

The centralized controller 102 can also receive information (block C, 134) from the models data store 128 and/or the energy market(s) system 126. For example, the centralized controller 102 can retrieve one or more models to be used for processing the information received from one or more of the other components described herein. As another example, the centralized controller 102 can retrieve or receive energy market information, such as energy pricing information, from the energy market(s) system 126.

The centralized controller 102 can assess the information received in block C (134) from any one or more of the components in the system 100 based on short, medium, and/or long-term criteria in block D (136). As described further below, the centralized controller 102 can provide the information as input to one or more retrieved models and receive output from the model(s). The output can indicate energy usage/performance of the respective components. The short, medium, and/or long-term criteria can each indicate factors in energy usage and/or performance that are associated with the facility 106 or otherwise objectives of the facility 106 to achieve in short, medium, and/or long-term timeframes.

Accordingly, the centralized controller 102 can predict short, medium, and/or long-term optimizations for one or more components of the facility 106 based on the assessment in block D, 136 (block E, 138).

The centralized controller 102 can instruct one or more of the controller(s) based on the predictions in block F (140). In other words, the centralized controller 102 can generate instructions and transmit the instructions to the battery controller 110, the solar controller 114, the mainspring generate controller 120, the grid(s) controller 124, and/or the other facility components 116A-N that, once executed by the controller(s), causes the controller(s) to control operations of the respective component(s) in the short, medium, and/or long-term timeframes.

The blocks A-F (130-140) can be continuously and/or iteratively performed in the system 100 so that the centralized controller 102 can continue to manage energy usage and performance of the facility 106 as a whole to achieve short, medium, and/or long-term energy usage optimization objectives.

Figure 2A:
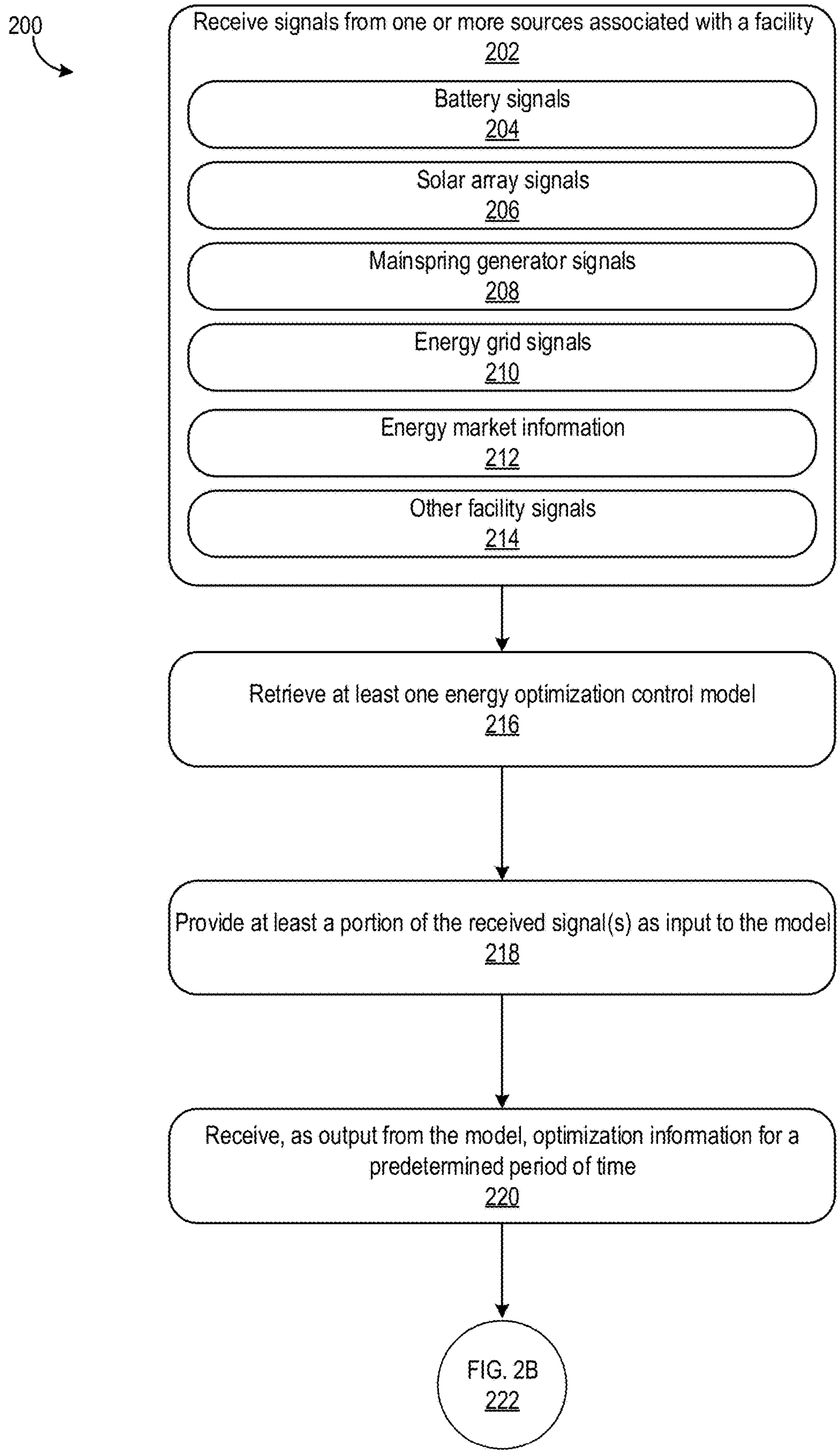
FIGS. 2A-B is a flowchart of a process for determining short, medium, and/or long-term performance optimizations for a facility based on a variety of signals received from components operating in the facility.
Figure 2B:
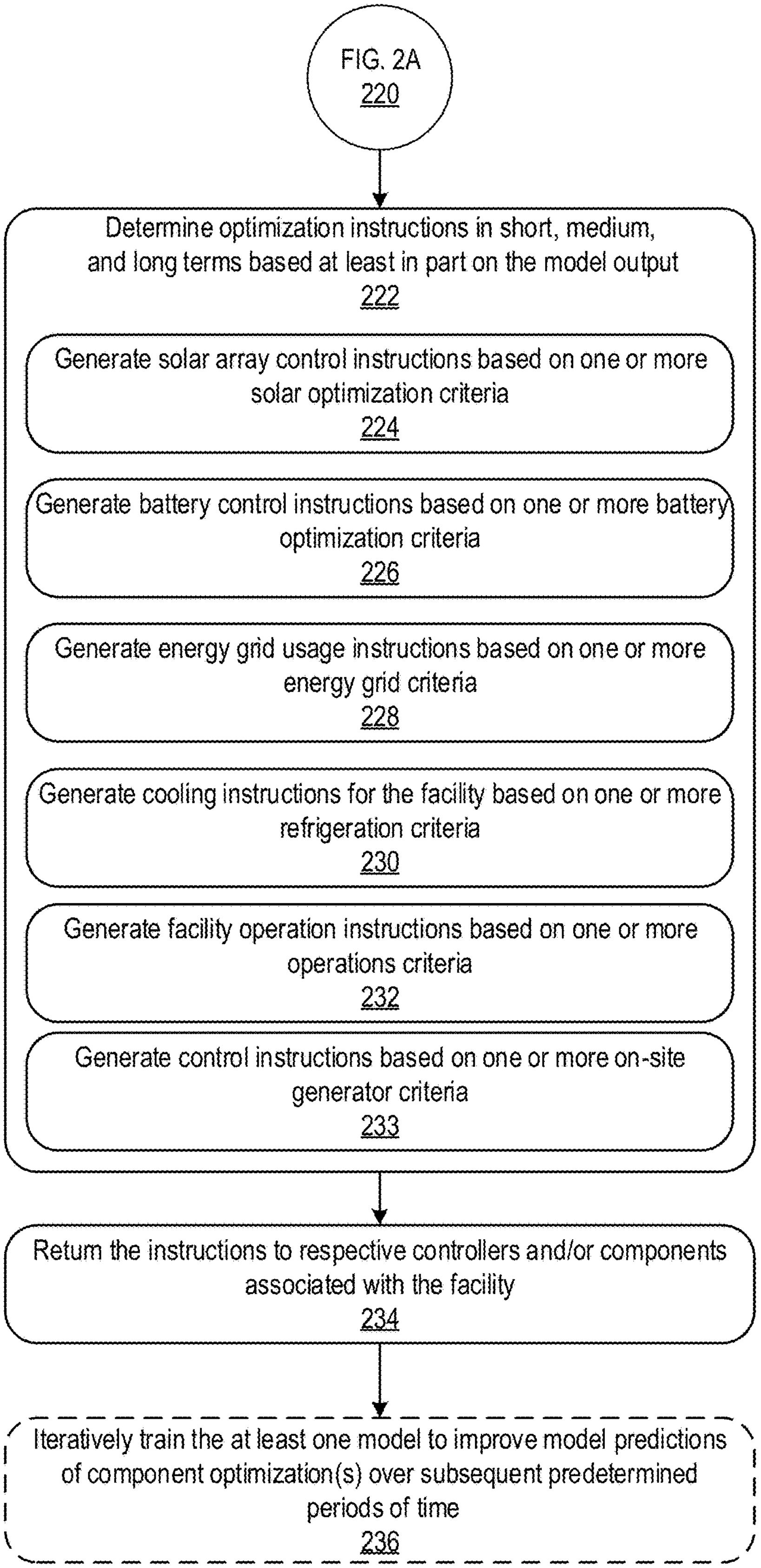

FIGS. 2A-B is a flowchart of a process 200 for determining short, medium, and/or long-term performance optimizations for a storage facility based on a variety of signals received from components operating in the facility. The process 200 can be performed by the centralized controller 102. The process 200 can also be performed by one or more other computing systems, devices, computers, networks, cloud-based systems, and/or cloud-based services. For illustrative purposes, the process 200 is described from the perspective of a centralized controller.

Referring to the process 200 in both FIGS. 2A-B, the centralized controller receives signals from one or more sources associated with a facility in block 202. The sources can include one or more controllers that are configured to control operations of components in the facility. The components can consume, produce, and/or store energy for the facility and the energy can be used for performance of operations in the facility. The components can include but are not limited to batteries, solar arrays, mainspring generators, energy grids, other energy sources, etc. Refer to FIGS. 1A-B for further discussion about block 202.

Figure 3A:
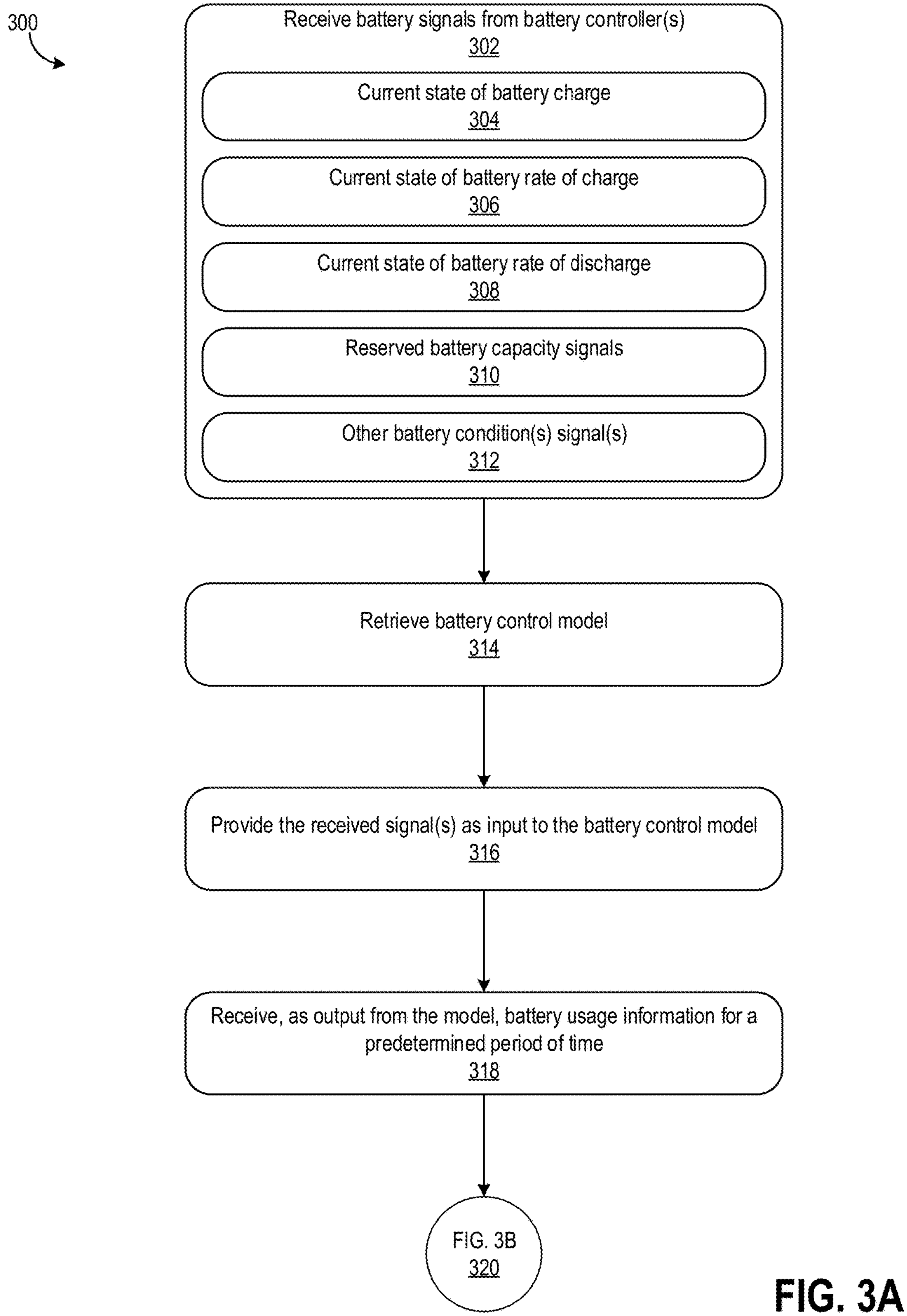
FIGS. 3A-B is a flowchart of a process for determining performance optimizations for batteries that are operating in a facility.
Figure 3B:
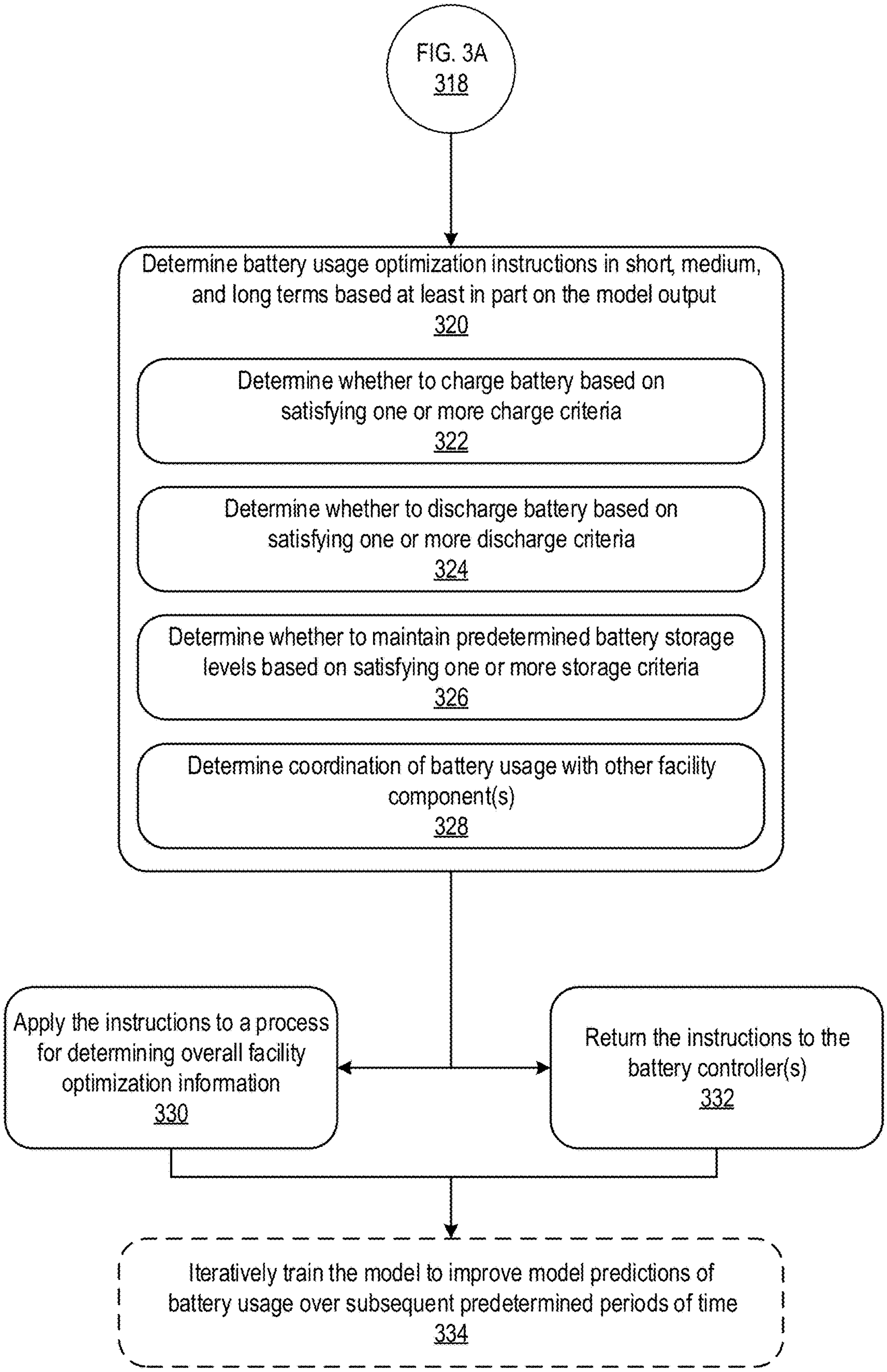

The signals received by the centralized controller can include but are not limited to battery signals (block 204), solar array signals (block 206), mainspring generator signals (block 208), energy grid signals (block 210), energy market information (block 212), and/or other facility signals (block 214). Any of the signals can be continuously received, received at different times, and/or received from the sources in response to the centralized controller sending a request for the signals. The centralized controller may receive additional or fewer signals. Refer to FIGS. 3A-B for further discussion about the battery signals (block 204), FIGS. 4A-B for further discussion about the solar array signals (block 206), and FIG. 5 for further discussion about the mainspring generator signals (block 208).

The energy grid signals (block 210) can include current and/or scheduled energy grid pricing and/or state information. The energy grid signals may include current demand and/or capacity of the grid (e.g., current capacity, projected future capacities). In some implementations, the energy grid signals may include notifications and/or alerts about potential upcoming brown-outs and/or blackouts.

The energy market information (block 212) can include current and/or scheduled energy grid pricing information. The energy market information can include current, scheduled, and/or projected energy grid production levels.

The other facility signals (block 214) can include information about operations being performed in/at the facility, such as current, scheduled, and/or projected operations in the facility. Such information can include but is not limited to quantity of human workers and automated vehicles operating in the facility, quantity of tasks being performed, types of tasks being performed, etc. Such information can additionally or alternatively include truck or other delivery vehicle arrivals and departures, scheduled defrost cycles, changes of foods or other items that are being refrigerated and stored in the facility, and/or blast cell cycles (e.g., times at which one or more blast cells are scheduled to turn on and/or off). The other facility signals may also include temperature information and other climate information for various locations in the facility, such as cooling, refrigeration system, and/or blast cell operational information, temperature data, humidity data, etc. More particularly, the other facility signals can include real-time temperature readings in one or more locations (e.g., storage rooms) in the facility. The other facility signals can include real-time rate of warming in one or more rooms in the facility or other real-time states in the facility. Other components in the facility, such as refrigeration systems can use this temperature information to activate or deactivate fans, compressors, and/or cooling systems so that the facility maintains predetermined, expected, or desired ambient conditions.

The centralized controller can retrieve at least one energy optimization control model in block 216. The model can be trained using machine learning techniques to process any combination of the received signals to determine how one or more components are performing in the facility (e.g., how they are consuming, producing, and/or storing energy), determine one or more ways in which performance can be optimized for one or more of the components and/or the facility as a whole, and/or predict performance of the components and/or facility as a whole over one or more periods of time (e.g., a current time, a future time, a short-term timeframe, a medium-term timeframe, a long-term timeframe).

As an illustrative example, the model can be a decision-making model, such as a reinforcement deep-Q learning network. Such a model can determine correct action(s) (e.g., adjustment of all or some energy usage levels) based on a state of all (or some portion of) energy assets or components. Using 1 minute (or another predetermined quantity of time, including but not limited to 30 seconds, 3 minutes, 5 minutes, 10 minutes, 15 minutes, 30 minutes, 1 hour, 2 hours, etc.) historical data of solar production, warehouse energy consumption, and grid pricing, the model can be pre-trained to learn what determinations the model should make at every state. For example, the model can be trained to determine what action(s) to take in an illustrative scenario where solar is at 100% capacity, the facility is consuming at approximately 50% and energy grid pricing is at approximately $1. The model can be trained to determine one or more potential actions to take in consideration of these factors, including but not limited to charging one or more batteries, discharging one or more of the batteries, and/or buying energy from the grid.

The model can be pre-trained and continuously trained with at least a lookup table having various combinations of possible states and REWARD values to indicate how good of a decision taking each action may be for the facility. An objective function of this optimization then can be configured to maximize the reward by choosing a combination of actions with the highest rewards given a particular scenario of conditions in the facility. Each iteration of training, the lookup table having all the rewards can be updated, given immediate and long-term performance of actions that the decision-making model determined and returned during runtime implementation. These techniques can provide for reinforcement learning of the model, which improves the models decision-making over time.

In some implementations, the model can be a proximal policy optimization (PPO) model for reinforcement learning. Refer to FIG. 11 for further discussion about training and runtime use of the PPO.

In block 218, the centralized controller provides at least a portion of the received signal(s) as input to the model. The portion can include any combination of the received signals. As an illustrative example, the centralized controller can provide a subset of the battery signals (block 204) and a subset of the solar array signals (block 206) to the model such that the model can determine performance efficiencies, inefficiencies, and/or optimizations of the batteries and solar arrays of the facility relative each other. As another example, the centralized controller can provide a subset of the battery signals (block 204), the energy grid signals (block 210), the energy market information (block 212), and the other facility signals (block 214) (e.g., quantity of tasks to be performed, quantity of vehicles operating in the facility) to the model to predict how energy prices may change over a future period of time and whether the batteries at the facility have the capacity to produce and store enough energy to perform operations in the facility should he energy prices increase beyond a threshold cost value. One or more other inputs to the model are also possible.

The centralized controller receives, as output from the model, optimization information for a predetermined period of time (block 220). The optimization information can indicate how one or more components in the facility (e.g., batteries, solar array(s), mainspring generator(s), cooling systems, blast cells, refrigeration systems, or other components such as energy grid(s), energy market) have performed (e.g., energy consumption, production, and/or storage) in real-time, during a current time, in near real-time, and/or historically. The optimization information can indicate how the components are likely to perform over the predetermined period of time, which may be based on how they performed in real-time. The optimization information can indicate one or more performance inefficiencies of one or more of the components. As an illustrative example, the optimization information can indicate that energy from the batteries is being utilized too frequently/too much on days when it is very sunny and the solar arrays are able to produce above a threshold amount of energy but not necessarily store the produced energy. Based on this information, the centralized controller may determine that on such sunny days, the solar arrays should be leveraged to produce and provide more energy to the components in the facility while the batteries should be used to store energy to be used on days when it is cloudy and/or energy grid/market prices are high. In some implementations, the optimization information can include numeric set point values that one or more of the components in the facility should be set to operate at during one or more periods of time (e.g., a current time, a future period of time). The numeric set point values can be provided as output from the model. In yet some implementations, the model can output a range or recommendation of numeric set point values to set one or more components to and the centralized controller can generate instructions for the one or more components indicating the respective numeric set point values to set to. In some illustrative implementations, the output in block 220 can include warning messages or other notifications indicating that one or more components are offline, experiencing some failure(s), or otherwise not operating as expected.

The predetermined period of time can be a current time and/or some future period of time. For example, the predetermined period of time can be a short-term timeframe, such as a next 5-30 minutes at the facility. The predetermined period of time can be a medium-term timeframe, such as a next 1-5 hours at the facility. The predetermined period of time can be a long-term timeframe, such as a next 1-2 days at the facility. One or more other periods of time can be predetermined and used in the process 200.

Based at least in part on the model output, the centralized controller can determine optimization instructions in short, medium, and/or long-terms (block 222). The instructions can be determined in order to ensure the facility maintains steady state operations. The instructions can also be determined to schedule operations at the facility in the event of a projected, expected, and/or possible brown-out or black-out. Therefore, operations can continue in the facility regardless of conditions that may arise in the short, medium, and/or long-terms. In the event of an outage, the centralized controller can determine operational instructions that would support critical operations (e.g., 20% of operations in the facility) for some threshold period of time (e.g., 8 hours, a couple of days).

Determining the instructions can include determining what amount of energy to consume by one or more components in the facility, how much energy to consume, and/or when to consume the energy. Determining the instructions can include generating instructions to be executed by controllers of one or more components in the facility, as described at least in reference to FIGS. 1A-B. As other illustrative examples, the centralized controller can determine energy grid power usage information, such as (in the short, medium, and/or long-term timeframes) whether to use energy from a grid, how much energy to use from the grid, when to use energy from the grid, whether to supply/sell energy to the grid, how much energy to supply to the grid, when to supply energy to the grid, whether to interface with the grid at a current time period and/or during one or more future periods of time, etc. Determining the instructions may also include scheduling operations in coordination with one or more component control schemes in the facility, which may pertain to solar arrays, batteries, mainspring generators, and/or other facility operations. Determining the instructions can include, for example, determining schedules for cooling operations, including but not limited to determining set points for refrigeration systems and/or blast cells, and/or charging schedules for compressors. Determining the instructions can include scheduling various facility operations, such as scheduling blast cell cycles, according to projected energy production and consumption in the facility over one or more periods of time.

In some implementations, the optimization instructions can be determined by the model and provided to the centralized controller as part of the model output. The centralized controller can determine the instructions for only one of the short, medium, and long-term timeframes. In some implementations, the centralized controller can determine instructions for any combination of these timeframes. The centralized controller can determine instructions for the short, medium, and/or long-term timeframes at different times and/or as different operations. In some implementations, the short-term instructions can be determined first and executed first. At some time after execution of the short-term instructions, the centralized controller can then determine the medium-term instructions, which can be based at least in part on the short-term instructions and/or outcome(s) of executing such instructions. At some time after execution of the medium-term instructions, the centralized controller can determine the long-term instructions, which can be based at least in part on the short-term instructions, the medium-term instructions, and/or outcomes of executing one or more of those instructions. As a result, instruction generation can be an iterative process performed by the centralized controller in order to accurately and efficiently identify ways in which energy usage, production, and storage can be optimized in the facility to achieve short-term, medium-term, and/or long-term optimization objectives.

As described herein, a forward-looking timeframe to determine estimates and/or predictions about most efficient energy usage, production, and/or storage can include the short, medium, and/or long-terms. One or more different metrics may also be used to determine estimates and predictions for each of the timeframes. For example, the long-term timeframe can be 2 days. Projecting more than a day ahead allows the facility to determine and/or maintain energy cycles per day. Projecting more than a day ahead allows for solving a current day's energy performance with all available data, which can then be leveraged to solve for a next day's energy performance. In the long-term timeframe, the centralized controller can project energy consumption for the facility in light of total available solar energy (e.g., a first metric) and/or energy grid and/or market prices (e.g., a second metric) throughout the current day and/or the next day.

As another example, the medium-term timeframe can be a next 3 hours for the facility. For the medium-term timeframe, the centralized controller can determine a minimum amount of energy needed for consumption by the components of the facility (e.g., a first metric), projected costs of energy from the grid for the medium-term (e.g., a second metric), and/or projected energy production from the solar arrays and/or the mainspring generator (e.g., third and/or fourth metrics) to further determine whether the facility should consume, store, and/or sell energy during the medium-term timeframe. One or more instructions determined for the medium-term timeframe can include projected amounts of times that refrigeration cycles may be turned on, how much sunlight is expected, etc.

As another example, the short-term timeframe can be a next 15 minutes for the facility. For the short-term timeframe, the centralized controller can perform cloud-tracking (or receive cloud-tracking information from other computing systems) (e.g., a first metric) and/or projection of real-time energy grid pricing (e.g., a second metric) to determine whether to consume and/or produce energy by one or more components in the facility in the short-term.

As part of determining the optimization instructions in block 222, the centralized controller can generate solar array control instructions based on one or more solar optimization criteria for one or more of the short, medium, and/or long-terms (block 224). As an illustrative example, the centralized controller can generate instructions that cause the solar array to generate energy during the short-term while sunlight is at its maximum and then provide that energy for usage by components in the facility during the medium-term when cloud coverage will increase.

Additionally or alternatively, the centralized controller can generate battery control instructions based on one or more battery optimization criteria for one or more of the short, medium, and/or long-terms (block 226). As an illustrative example, the centralized controller can generate instructions that cause the battery to charge during the short-term, store during the medium-term, and then provide the stored energy to components in the facility during the long-term, when cloud coverage is projected to increase and energy grid prices are expected to increase.

Additionally or alternatively, the centralized controller can generate energy grid usage instructions based on one or more energy grid criteria for one or more of the short, medium, and/or long-terms (block 228). As an illustrative example, the centralized controller can generate instructions that cause the solar arrays to generate energy during the short and medium-terms, then sell the generated energy to the energy grid in the long-term when energy prices are expected to be high, energy demand is high, and/or energy production is low (e.g., due to adverse weather conditions in the long-term). As part of block 228, the centralized controller can determine whether and when to sell energy to the grid and/or store the energy for later usage at the facility. The centralized controller may consider energy generation type for such a determination. More particularly, the centralized controller can consider marginal pricing of generating an extra kilowatt-hour (kWh) for one or more components of the facility, pricing relative the grid pricing versus generating energy by the facility itself, etc.

Additionally or alternatively, the centralized controller can generate cooling instructions for the facility based on one or more refrigeration criteria for one or more of the short, medium, and/or long-terms (block 230). As an illustrative example, the centralized controller can generate instructions that cause a refrigeration system in the facility to activate in the short-term using energy produced by the solar array, when it is sunny and hot, and then deactivate in the medium-term when there is increased cloud coverage (and thus cooler ambient temperature and/or less energy production by the solar arrays).

Additionally or alternatively, the centralized controller can generate facility operation instructions based on one or more operations criteria for one or more of the short, medium, and/or long-terms (block 232). As a merely illustrative example, the centralized controller can generate instructions for forklifts and autonomous vehicles to perform picking and packing tasks in the facility during the medium-term (e.g., at night) when energy grid prices are low and/or ambient temperatures are low (so less energy is consumed to cool the facility) rather than in the short-term (e.g., during the day), when energy grid prices are higher and/or ambient temperatures are higher (so more energy is being produced and consumed to cool the facility). Such instructions can be generated once the centralized controller determines that the instructions may also satisfy operational requirements in the facility (e.g., executing the instructions would not cause delay to preparing one or more other orders or otherwise satisfying one or more other operations to be performed in the facility). As another illustrative example, the centralized controller can generate instructions during the short, medium, and/or long-terms indicating how many blast cell cycles to begin during each of the timeframes so that energy can be appropriately produced, stored, and/or consumed for blasting processes and other operations in the facility.

Additionally or alternatively, the centralized controller can generate control instructions based on one or more on-site generator criteria for one or more of the short, medium, and/or long-terms (block 233). On-site generators can include one or more mainspring generators described herein. The generated instructions can indicate when to use or turn off the on-site generator(s) during one or more of the timeframes. One or more criteria and factors described herein with regard to the mainspring generators can be used in determining/generating the control instructions in block 233.

The centralized controller can then return the instructions to respective controllers and/or components associated with the facility in block 234. The respective controllers and/or components can execute the instructions in response to receiving them from the centralized controller. Executing the instructions can result in achieving optimization objectives of the facility, such as lowering/minimizing energy costs and/or lowering emissions. The centralized controller can return the instructions at the respective timeframe. The instructions can be returned in real-time (e.g., as they are generated) but then may not be executed until the respective timeframe. In some implementations, returning the instructions includes storing the instructions in a data store described herein.

Optionally, the centralized controller may iteratively train the at least one model (block 236), as described above in reference to block 216. The model can be iteratively trained to improve model predictions of component optimization(s) over subsequent predetermined periods of time. Therefore, real-time training can be performed. Such iterative training can be performed with or without historic data associated with the facility (or other facilities). One or more of the training data can include determinations and/or instructions that are made by the centralized controller and/or the model itself as described throughout the process 200. In some implementations, the training can self-improve and iterate at predetermined periods of time (e.g., every 1 minute, every 5 minutes, every 10 minutes, every 1 hour, every 2 hours, etc.) for the existing assets or components. Furthermore, as new assets or components are added and integrated into the facility, such assets and components can be defined as additions to the overall system and the at least one model (such as a reinforcement Q-learning model) can consider the new assets or components as the model iterates and self-trains. As a result, the at least one model can seamlessly improve and make accurate determinations regardless of changes that may be made to the overall system.

As described herein, the centralized controller can iterate through the process 200 and/or continuously perform one or more blocks in the process 200. As an illustrative example, the centralized controller can perform the process 200 a first time to determine ways in which energy performance can be optimized at the facility in the short-term. The centralized controller can perform the process 200 a second time to determine ways in which energy performance can be optimized in the medium-term. The centralized controller can perform the process 200 a third time to determine ways in which energy performance can be optimized in the long-term. In some implementations, the centralized controller can forecast energy performance over the short, medium, and long-terms, then blend the forecasts together to determine and ensure that preferred energy performance optimizations occur in the short-term (e.g., a next 15 minutes). Then, the centralized controller can continue to blend the forecasts with additional signals received over time to optimize the energy performance in the medium-term (e.g., next 3 hours) and/or the long-term (e.g., next 2 days). The short-term energy performance optimizations can be prioritized in the process 200, followed by the medium-term and then the long-term. Moreover, certain energy performance factors may be determined and optimized for some timeframes but not others. As an example, energy grid pricing may be determined and optimized in real-time for the short-term timeframe (e.g., a next 15 minutes) rather than the long-term timeframe (e.g., a next 2 days) since energy grid pricing may be a highly volatile factor impacted by various known and unknown conditions throughout an energy market. Accurately predicting energy pricing in the short-term timeframe can be advantageous to achieve energy performance optimizations in the short-term.

FIGS. 3A-B is a flowchart of a process 300 for determining performance optimizations for batteries that are operating in a storage facility. The process 300 can be performed by the centralized controller 102. The process 300 can also be performed by one or more other computing systems, devices, computers, networks, cloud-based systems, and/or cloud-based services. For illustrative purposes, the process 300 is described from the perspective of a centralized controller.

Referring to the process 300 in FIGS. 3A-B, the centralized controller receives battery signals from one or more battery controllers in block 302. The battery signals can include a current state of battery charges (block 304), a current state of battery rate of charge (block 306), a current state of battery rate of discharge (block 308), reserved battery capacity signals (block 310), which can indicate one or more levels of battery charge that are either scheduled for future consumption, reserved in the event of an emergency (e.g., possible brown-out or blackout, which the facility may be notified about by a utilities company, the notice being a couple hours and/or days in advance, such as 6 hours advance, 1 day advance, etc.), and/or reserved for grid or other third party use, and/or other battery condition(s) signal(s) (e.g., cycle count, which can be used to ensure that a battery is not being used too often so that the battery's operational life can be prolonged or otherwise maximized) (block 312). In some implementations, the battery controller(s) can be part of a battery management system.

The centralized controller can retrieve a battery control model in block 314. The model can be similarly trained as the at least one energy optimization control model described in the block 216 of the process 200 in FIGS. 2A-B. Refer to FIGS. 2A-B for further discussion about training the model. The battery control model can determine battery control optimization using a quadratic objective function finding a minimum cost at a predetermined battery charge (e.g., 50% battery charge, 45% charge, 55% charge, etc.). If a battery level distances either above or below the predetermined battery charge, then larger costs may be associated with operating that battery. The parameters of the quadratic objective function can be tuned through a pre-training process as described above, using historical data associated with batteries and/or the facility, in order to ensure that a fair cost value can be determined and achieved at various different battery charge states. In some implementations, the cost values can be set to USD values, which can allow for central decision-makers to quantify cost of using energy from the battery versus any other assets, including but not limited to grid power. In other implementations, different currencies and/or values can be used that correspond to criteria associated with the facility (e.g., if the facility is located in a foreign country, a currency of that foreign country can be used as the cost value by the model). Furthermore, determinations made by the battery control model can be used to establish contingency ride-through scenarios: if communication and/or set point commands are lost between the centralized controller and the controller of the battery, then the battery's controller can automatically cause the battery to charge to the predetermined battery charge (e.g., 50% charge), thereby putting the battery in a best, optimal, or otherwise preferred state for when the battery is able to reconnect with the centralized controller.

The centralized controller provides the received signal(s) (or any portion or combination thereof) as input to the battery control model in block 316. In block 318, the centralized controller receives, as output from the model, battery usage information for a predetermined period of time. The centralized controller can then determine battery usage optimization instructions in short, medium, and/or long-terms based at least in part on the model output (block 320). The centralized controller can predict consumption of power of the batteries in the facility during various periods of time. The centralized controller can determine when to set and optimize battery storage capabilities. The centralized controller can determine how much time may be required and when to charge and/or discharge the batteries over the various periods of time. In some implementations, the centralized controller can determine flywheeling optimizations as part of the battery usage optimization instructions. Refer to blocks 218-222 in the process 200 of FIGS. 2A-B for further discussion.

As part of determining the battery usage optimization instructions, the centralized controller can determine whether to charge the battery (e.g., one battery, multiple batteries, a panel or array of batteries) based on satisfying one or more charge criteria (block 322). The charge criteria can be specific to short, medium, and/or long-term timeframes. As an illustrative example, the centralized controller can generate instructions to recharge the batteries in the short-term so that in the medium-term, when there is increased cloud coverage and less solar energy production, the charged batteries can be used for performing one or more operations in the facility.

Additionally or alternatively, the centralized controller can determine whether to discharge the battery based on satisfying one or more discharge criteria (block 324). The centralized controller can determine whether to discharge the battery to one or more energy grids and/or discharge the battery to perform one or more operations in the facility. The discharge criteria can be specific to the short, medium, and/or long-term timeframes. As an illustrative example, the centralized controller can determine to discharge the battery (or a portion of the battery) to the energy grid in the short-term because energy prices in the short-term exceed threshold, expected, or historic energy prices (e.g., energy can be in demand and the facility can sell back their battery energy at a higher price than at other times).

Additionally or alternatively, the centralized controller can determine whether to maintain predetermined battery storage levels based on satisfying one or more storage criteria (block 326). The criteria can vary for the short, medium, and/or long-term timeframes. As an illustrative example, the centralized controller can determine that battery storage levels should be maintained in the short and medium-terms (rather than using the stored battery during the short and medium-terms) since solar energy or other renewable energy can be generated and consumed in the short and medium-terms to accomplish operations in the facility.

Additionally or alternatively, the centralized controller can determine coordination of battery usage (e.g., production, consumption, storage) with other facility component(s) (e.g., solar arrays, mainspring generator, energy from a grid) (block 328). As described above, the determination in block 328 can be based on performance and optimization of the other components relative each other.

After blocks 320-328, the centralized controller can perform block 330, block 332, or both blocks 330 and 332. Blocks 330 and 332 can be performed simultaneously and/or within some threshold amount of time of each other. In some implementations, block 330 can be performed first and block 332 can be performed second. Block 332 can be performed before block 330 in some other implementations.

In block 330, the centralized controller applies the instructions generated in blocks 320-328 to a process for determining overall facility optimization instructions. For example, the centralized controller can determine the battery usage optimization instructions then use those instructions in determining optimization instructions in the short, medium, and/or long-terms for the facility as a whole. The battery usage optimization instructions can be used by the centralized controller to determine optimization instructions for other components in the facility, including but not limited to solar arrays, mainspring generators, energy grid, cooling and/or refrigeration systems, blast cell cycles, or other facility operations. Refer to block 222 in the process 200 of FIGS. 2A-B for further discussion.

In block 332, the centralized controller can return the instructions generated in blocks 320-328 to the battery controller(s) for execution in one or more of the short, medium, and/or long-terms. Refer to block 234 in the process 200 of FIGS. 2A-B for further discussion.

After performing blocks 330 and/or 332, the centralized controller can optionally iteratively train the model to improve model predictions of battery usage over subsequent predetermined periods of time (block 334). Refer to block 236 in the process 200 of FIGS. 2A-B for further discussion.

Figure 4:
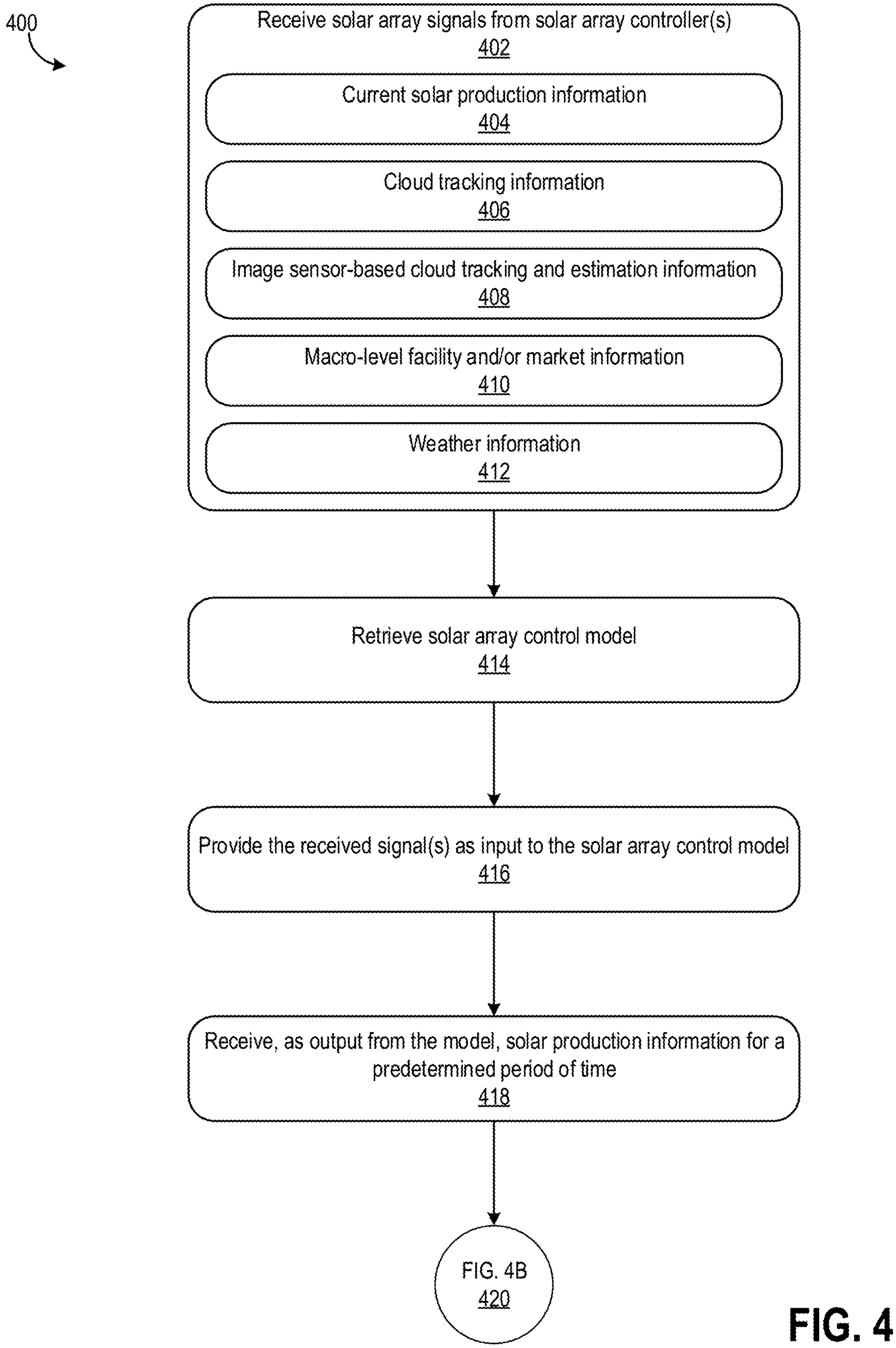
FIGS. 4A-B is a flowchart of a process for determining performance optimizations for solar arrays that are operating in a facility.
Figure 4B:
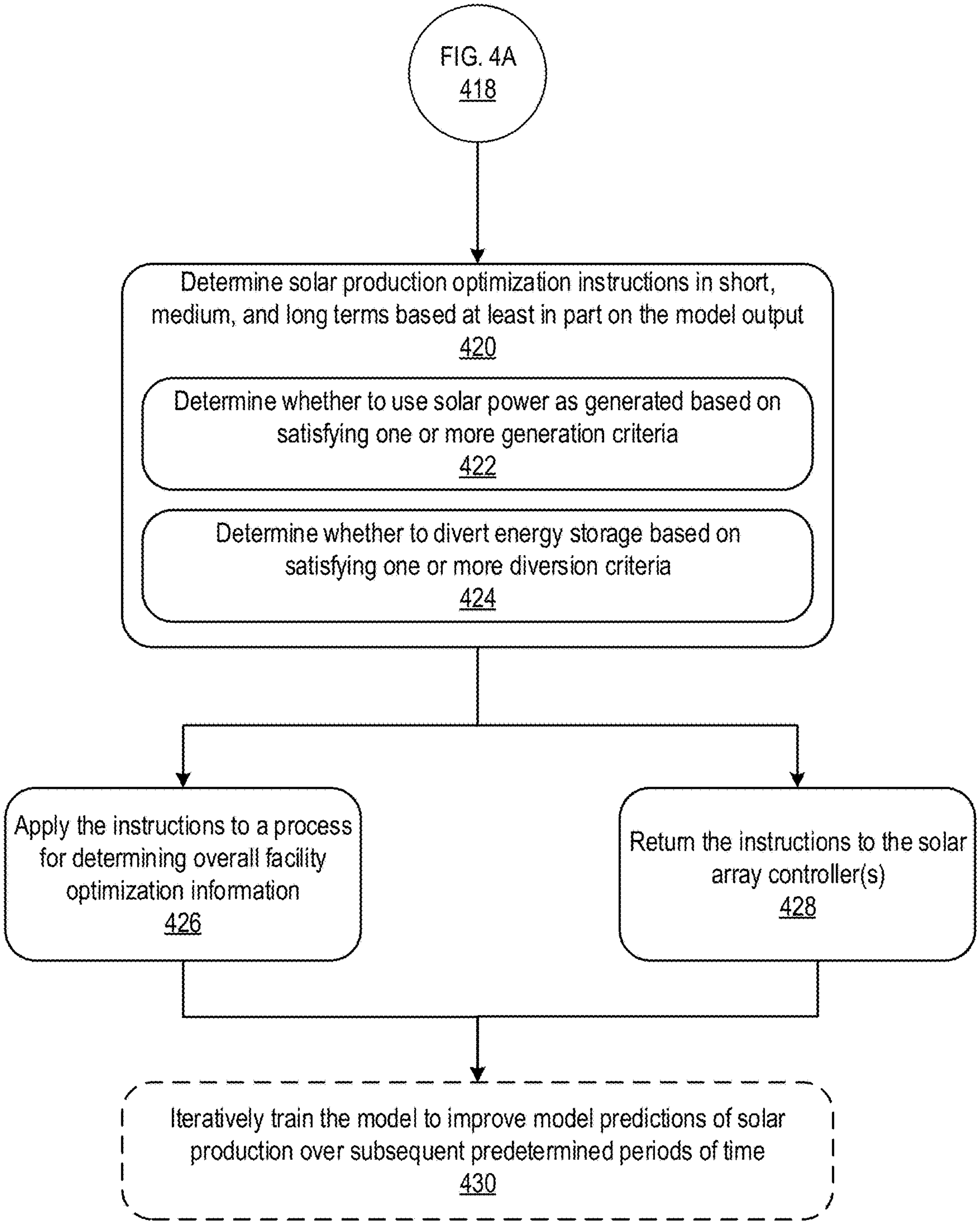

FIGS. 4A-B is a flowchart of a process 400 for determining performance optimizations for solar arrays that are operating in a storage facility. The process 400 can be performed by the centralized controller 102. The process 400 can also be performed by one or more other computing systems, devices, computers, networks, cloud-based systems, and/or cloud-based services. For illustrative purposes, the process 400 is described from the perspective of a centralized controller.

Referring to the process 400 in both FIGS. 4A-B, the centralized controller receives solar array signals from one or more solar array controllers (block 402). The solar array signals can include current solar production information (block 404), such as current or real-time solar production levels/measurements. The solar array signals can include cloud tracking information (block 406). The cloud tracking information can be determined based on shadows that are detected as they pass over a grid of solar panels. The shadows can, in some implementations, be measured or otherwise indicated by production levels changing across the grid of solar panels. For example, multiple solar panels can be associated with a solar inverter. Some facilities can have 20 or more inverters. Such resolution of measurement can be advantageously used to determine cloud movement and other weather conditions. The cloud-tracking information can, for example, indicate shading and movement of clouds across the grid of solar panels during a current time and/or over one or more future periods of time (e.g., a next 10 minutes, 15 minutes, 30 minutes, 1 hour, 2 hours). In some implementations, the centralized controller and/or a controller of the solar array can further determine information such as cloud size, cloud speed, and/or projected cloud coverage over one or more periods of time.

The solar array signals can include image sensor-based cloud tracking and estimation information (block 408). The image sensor can include one or more cameras that are configured to capture image data of the clouds and/or the grid of solar panels. The image data can be processed by the centralized controller and/or the controller of the solar array using machine learning and/or image processing to determine cloud coverage information as described herein. Machine learning algorithms and/or models can also be used to predict or forecast cloud coverage and/or solar energy production over one or more future periods of time. In some implementations, the image sensor can be trained to recognize states of clouds in the sky and their respective impacts on solar energy production.

The solar array signals can include macro-level facility and/or market information (block 410), which may include receiving solar production information from one or more solar arrays at one or more other facilities (e.g., in a same geographic region, in a different geographic region). The macro-level information may additionally or alternatively include signals from one or more energy grids indicating impacts of current levels of solar production (e.g., current pricing levels relative to historical pricing levels, grid conditions). The macro-level facility and/or market information can be used by the centralized controller to track solar production across one or more geographic regions, across one or more facilities in a particular geographic region, and/or at exact longitudes and/or latitudes.

The solar array signals can include weather information (block 412). The weather information can include external or open source information about cloud coverage in a geographic region of the facility or across multiple different geographic regions. The weather information can include other weather data, including but not limited to wind conditions over one or more periods of time (e.g., debris in the air, for example, can cause reduced production of solar energy), fog over one or more periods of time, rain, snow, etc.

In block 414, the centralized controller can retrieve a solar array control model. Refer to block 216 in the process 200 of FIGS. 2A-B for further discussion about training the solar array control model. Using the model, the centralized controller can determine and report solar power generation as well as perform electrical controls to preserve over-voltage or other electrically damaging events from occurring with the solar arrays. The centralized controller can then react to power produced from the solar array with other assets or components described herein. In some implementations, the solar array control model can be trained similarly to the battery control model described above. The solar array control model can use an objective function that can be minimized at a predetermined percent of power production (e.g., 100%, 95%, 90%, 85%, 80%, etc.). As a result, the more the solar energy is curtailed away from the predetermined percent of power production, the higher costs associated with that action.

The centralized controller provides the received signal(s) as input to the solar array control model in block 416. In block 418, the centralized controller receives, as output from the model solar production information for a predetermined period of time. The centralized controller then can determine solar production optimization instructions in short, medium, and/or long-terms based at least in part on the model output in block 420. The centralized controller can make real-time predictions about solar energy production, usage, and storage based at least in part on the model output. The centralized controller can forecast how solar operations may behave over the short, medium, and/or long-term timeframes, and then determine one or more ways in which to optimize solar operations during the short, medium, and/or long-term timeframes. For example, the centralized controller can determine or predict a margin indicating how far off from expectations solar operations will be over one or more periods of time/timeframes. The margin can then be used to iteratively train and improve predictions made by the model in determining how solar would perform during future periods of time/timeframes. Refer to blocks 218-222 in the process 200 of FIGS. 2A-B for further discussion.

As part of determining the solar production optimization instructions, the centralized controller can determine whether to use solar power as generated based on satisfying one or more generation criteria (block 422). The criteria can vary based on the short, medium, and/or long-term timeframes. As an illustrative example, the centralized controller can determine that the solar arrays should generate and store energy in the short and medium-terms, then use the solar power in the long-term when one or more batteries in the facility are recharging and/or there is less sunlight (e.g., during the night, during cloudy or storm days in the long-term timeframe).

Additionally or alternatively, the centralized controller can determine whether to divert energy storage based on satisfying one or more diversion criteria (block 424). The criteria can vary for the short, medium, and/or long-term timeframes. The centralized controller can also determine which component(s) to divert the energy storage to. For example, the energy storage can be diverted to batteries, flywheeling technology, etc. As an illustrative example, the centralized controller can determine that in the short-term, the solar arrays will be generated solar energy in excess of some threshold level of solar energy production and thus must divert at least a threshold quantity of the generated solar energy to one or more other components in the facility. The diversion can be performed during the short and/or medium-term timeframes in this example so that the solar arrays can continue to generate the solar energy during such timeframe(s).

After performing blocks 420-424, the centralized controller can perform block 426, block 428, or both blocks 426 and 428. The blocks 426 and 428 can be performed simultaneously or at different times. Block 426 can be performed before block 428. Block 428 can be performed before block 426, in some implementations.

In block 426, the centralized controller applies the instructions generated in blocks 420-424 to a process for determining overall facility optimization information. Refer to block 330 in the process 300 of FIGS. 3A-B for further discussion.

In block 428, the centralized controller returns the instructions to the solar array controller(s) for execution in the short, medium, and/or long-terms. Refer to block 332 in the process 300 of FIGS. 3A-B for further discussion.

After blocks 426 and/or 428, the centralized controller can optionally iteratively train the model to improve model predictions of solar production over subsequent predetermined periods of time (block 430). Refer to block 236 in the process 200 of FIGS. 2A-B for further discussion.

Figure 5:
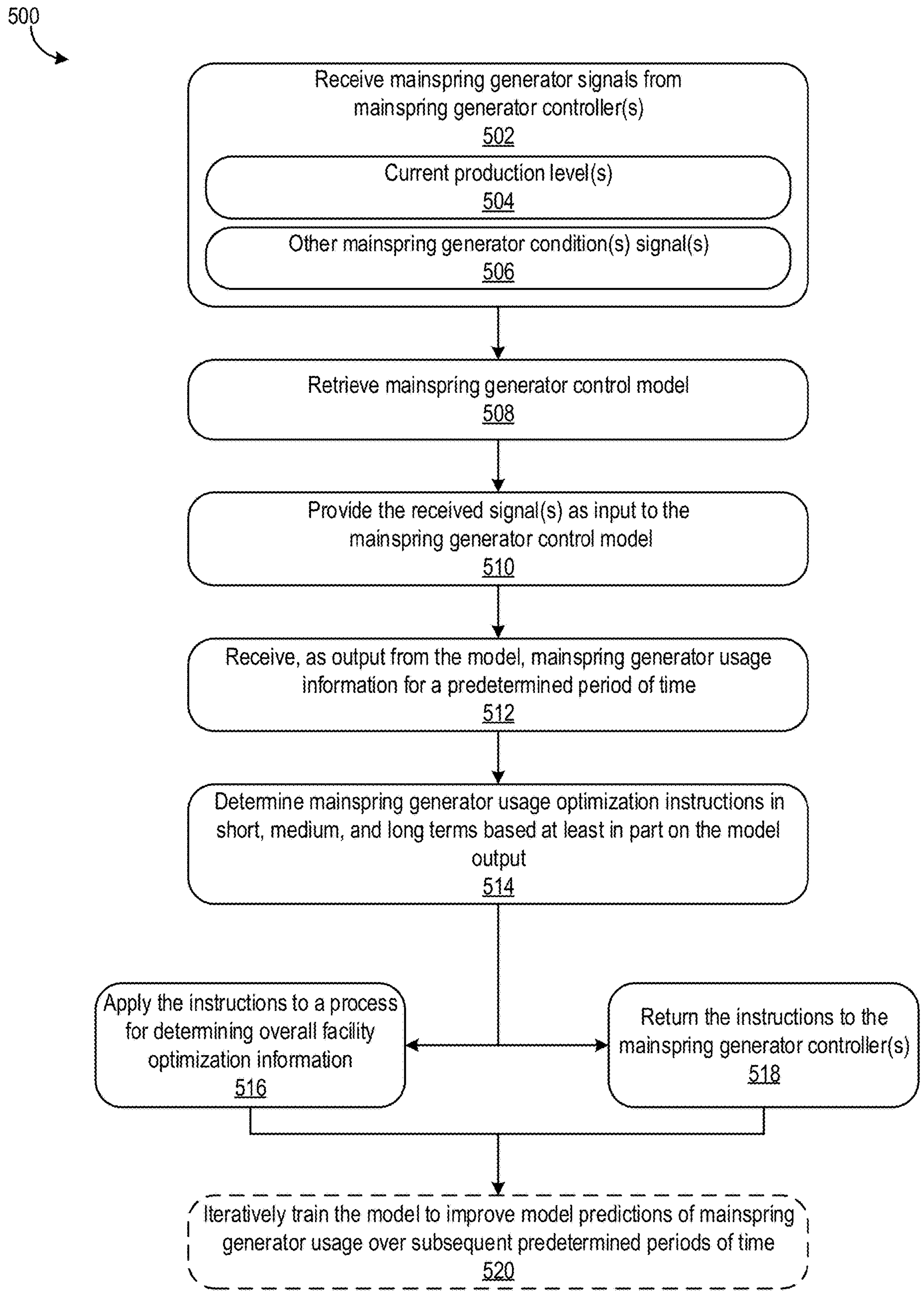
FIG. 5 is a flowchart of a process for determining performance optimizations for mainspring generators that are operating in a facility.

FIG. 5 is a flowchart of a process 500 for determining performance optimizations for mainspring generators that are operating in a storage facility. The process 500 can be performed by the centralized controller 102. The process 500 can also be performed by one or more other computing systems, devices, computers, networks, cloud-based systems, and/or cloud-based services. For illustrative purposes, the process 500 is described from the perspective of a centralized controller.

Referring to the process 500 in FIG. 5, the centralized controller receives mainspring generator signals from one or more mainspring generator controllers for a mainspring generator (block 502). The signals received in block 502 can include current production levels (block 504), which may be more reactionary to shortfalls in energy supplied to facility components in comparison to batteries, solar arrays, and other energy consumption and/or production components in the storage facility. The signals can include other mainspring generator condition(s) signal(s) (block 506). For example, the mainspring generator controller can perform load tracking techniques, in which is assess energy loads, solar generation, battery charging, etc. to determine whether, when, and for how long to activate the mainspring generator. The mainspring generator controller may determine that the mainspring generator should be activated a threshold amount of time before sunset so that once solar energy production starts to taper at the facility, operations can continue seamlessly by leveraging energy from the mainspring generator. The mainspring generator controller can also perform other load tracking techniques in order to activate the mainspring generator on the fly, in real-time, whenever there is a need. Therefore, the mainspring generator can be used to compensate for low energy production of solar panels/arrays or other components in the facility, such as batteries, without the facility having to rely on taking energy from the grid.

In block 508, the centralized controller retrieves a mainspring generator control model. Refer to block 216 in the process 200 of FIGS. 2A-B for further discussion about training/generating the model. Similar to the battery control model, the mainspring generator control model can use an objective function to minimize a cost of resources used (e.g., NG). This objective function can be linear. The objective function can be quantified using a cost currency value that corresponds to criteria of the facility. For example, the cost currency value can be the USD rate that the facility purchases NG at during a predetermined period of time (e.g., a current month, a past month, a past 1 week, a past 2 weeks, a past day, etc.). As an illustrative example, the objective function can be defined with the following formula: cost=($/kwh)*kwh. In some implementations, because this model is simple, the model may advantageously not require pre-training or continuous learning. The centralized controller, however, can use the model to continuously learn how a cost of using the mainspring generator can affect a cost of operating the system as a whole in the facility.

The centralized controller provides the received signal(s) as input to the mainspring generator control model in block 510. The centralized controller can receive, as output from the model, mainspring generator usage information for a predetermined period of time (block 512). The centralized controller can then determine mainspring generator usage optimization instructions in short, medium, and/or long-terms based at least in part on the model output (block 514). The centralized controller can determine how and when the mainspring generator is activated or deactivated in the short, medium, and/or long-terms. As an illustrative example, the centralized controller can determine to turn off the mainspring generator in favor of solar energy production in real-time or otherwise in the short-term based on current levels of sunlight and/or cloud coverage. The centralized controller can determine to activate the mainspring generator in the long-term, when solar production may be predicted as below some threshold level and the batteries are recharging. One or more other control operations and instructions are also possible. Refer to blocks 218-222 in the process 200 of FIGS. 2A-B for further discussion.

The centralized controller can then perform block 516, block 518 or both blocks 516-518. The blocks 516 and 518 can be performed simultaneously or at different times. Block 516 can be performed before block 518. Block 518 can be performed before block 516 in some implementations.

In block 516, the centralized controller applies the instructions generated in block 514 to a process for determining overall facility optimization information. Refer to block 330 in the process 300 of FIGS. 3A-B for further discussion.

In block 518, the centralized controller can return the instructions to the mainspring generator controller(s) for execution in one or more of the short, medium, and/or long-terms. Refer to block 332 in the process 300 of FIGS. 3A-B for further discussion.

After performing blocks 516 and/or 518, the centralized controller can optionally iteratively train the model to improve the model predictions of mainspring generator usage over subsequent predetermined periods of time (block 520). Refer to block 236 in the process 200 of FIGS. 2A-B for further discussion.

Figure 6B:
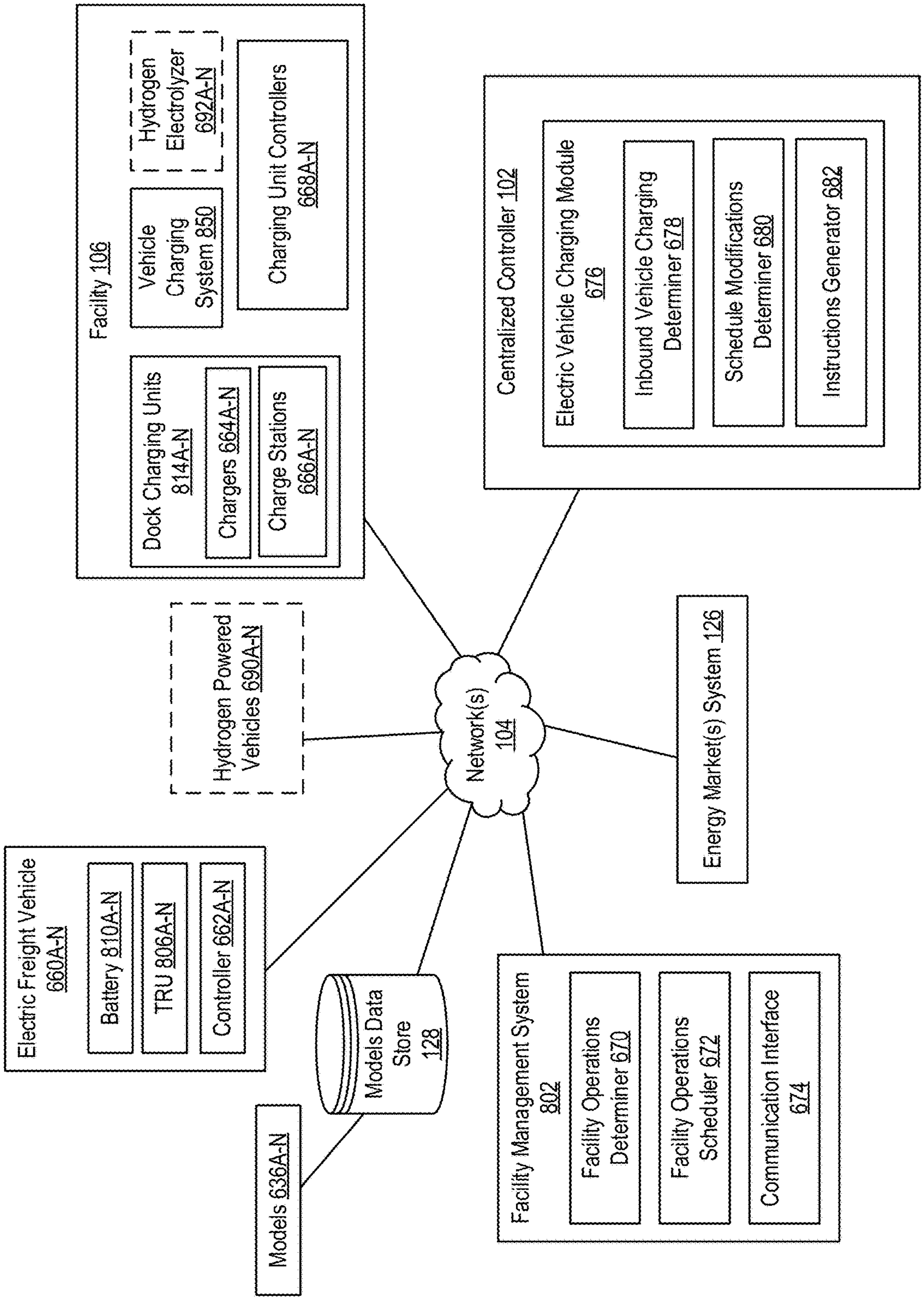

FIGS. 6A and 6B are system diagrams of components that can be used to perform the disclosed techniques. Referring to FIG. 6A, and as described herein, components of the facility 106 can communicate with the centralized controller 102, the energy market(s) system 126, components of the energy grid(s) 122A-N, and the models data store 128 via the network(s) 104. These components can also communicate with a data store 600 and/or other energy resources 618A-N.

The facility 106 can include the batteries 108A-N, the battery controller 110, the solar arrays 112A-N, the solar controller 114, the mainspring generator 118, the mainspring generator controller 120, the other facility components 116A-N, refrigeration systems 602A-N and their respective controller(s) 604, blast cells 606A-N and their respective controller(s) 608, compressors 610A-N and their respective controller(s) 612, sensors 614A-N, and/or facility vehicles 616A-N. The facility 106 can include one or more additional, fewer, or other components.

The batteries 108A-N can be any type of battery, batteries, arrays and/or grids of batteries that may be used by the facility 106 to provide and store energy for performance of facility operations. For example, the batteries 108A-N can include lithium-ion phosphate batteries.

The battery controller 110 can be configured to control operations of the batteries 108A-N as described herein. Accordingly, the battery controller 110 can include the component controller 150 and the software interface 152 described in reference to FIGS. 1A-B.

The solar arrays 112A-N can include any quantity and/or type of solar panels and/or arrays that may be used by the facility 106 to generate, use, and/or store energy for operations at the facility 106. The solar arrays 112A-N can be part of the facility 106, such as on a roof of the facility 106. The solar arrays 112A-N can also be external or remote from the facility 106 and in electrical communication with the facility 106, components of the facility 106, and/or storage units (e.g., batteries 108A-N).

The solar controller 114 can be configured to control operations of the solar arrays 112A-N as described herein. Accordingly, the solar controller 114 can include the component controller 154 and the software interface 156 described in reference to FIGS. 1A-B.

The mainspring generator 118 can be a linear generator, in which 2 pistons are aligned against each other in linear alignment. When the pistons come together, they can ignite gas in a chamber without sparking a gas, thereby resulting in less emissions. Natural gas can be used for the mainspring generator, although the mainspring generator can be fuel agnostic, and may use biofuels, hydrogen, or other types of fuels. The mainspring generator 118 can be used to provide energy to components in the facility 106 in real-time. The mainspring generator 118 can also be used in scenarios when the batteries 108A-N and/or the solar arrays 112A-N may not be producing and/or providing sufficient levels of energy to components that perform operations in the facility 106 (e.g., at a present or current time, at one or more future periods of time).

The mainspring generator controller 120 can be configured to control operation (e.g., activation, deactivation, load tracking across components in the facility 106) of the mainspring generator 118. Accordingly, the mainspring generator 118 can include the component controller 158 and the software interface 160 described in reference to FIGS. 1A-B.

The other facility components 116A-N can include other types of machines, devices, energy sources, energy storage units, energy production units, etc. that may be part of or associated with the facility 106. The other facility components 116A-N can include the respective component controllers 162A-N and software interfaces 164A-N, as described in reference to FIGS. 1A-B. In some implementations, the other facility components 116A-N may include the refrigeration system 602A-N, blast cells 606A-N, compressors 610A-N, sensors 614A-N, and/or facility vehicles 616A-N.

The refrigeration systems 602A-N can include fans, heating, ventilation, and air conditioning (HVAC) units, or other types of cooling or freezing systems in the facility 106. The refrigeration systems 602A-N can be configured to adjust ambient conditions (e.g., temperature, humidity, barometric pressure) in one or more locations in the facility 106. For example, a first refrigeration system 602A can be configured to adjust and maintain temperature in a first set of storage locations/rooms in the facility 106 at a first predetermined temperature range while an nth refrigeration system 602N can be configured to adjust and maintain temperature in an nth set of storage locations/rooms in the facility 106 at an nth predetermined temperature range. Sometimes, one refrigeration system 602 can be used to control ambient conditions in the entire facility 106. In some implementations, the facility 106 can utilize a refrigeration system for each storage location, room, and/or zone in the facility 106. The refrigeration systems 602A-N can draw energy from one or more components described herein, such as the batteries 108A-N, the solar arrays 112A-N, the mainspring generator 118, the other facility components 116A-N, and/or the energy grid(s) 122A-N to perform operations in maintaining the ambient conditions in the facility 106. The refrigeration systems 602A-N can each be controlled by their respective controller(s) 604, which can be similar to the controllers 110, 114, 120, and/or 162A-N described herein.

The blast cells 606A-N can include rooms and/or structures that are configured for freezing large quantities of items in the facility 106. For example, the blast cells 606A-N can be used to freeze pallets of food items once they enter the facility 106. The frozen pallets can then be routed to storage locations in the facility 106 until they are ready to be shipped to customers, consumers, or other relevant parties in a supply chain. The blast cells 606A-N can include any variety of components for freezing the items therein, including but not limited to storage racks or other frame structures for receiving the items to be frozen, fans, cooling or refrigeration units, evaporator units, vanes, air passages/channels, and/or other assemblies for guiding airflow to the items stacked/positioned inside the blast cells 606A-N. Each of the blast cells 606A-N can be controlled by their respective controller(s) 608. In some implementations, multiple blast cells 606A-N can be controlled by a single controller 608. The controller(s) 608 can be similar to the controllers 110, 114, 120, and/or 162A-N described herein.

The compressors 610A-N can be air compressors that are configured to cool and dehumidify air in the facility 106, and/or in specific locations, rooms, zones, or other portions of the facility 106. The compressors 610A-N can include various components used for cooling and dehumidifying air in the facility 106, including but not limited to air ducts and filters throughout the facility 106. Operations of the compressors 610A-N can be controlled by the respective controller(s) 612. In some implementations, each of the compressors 610A-N can be controlled by an individual controller 612. Sometimes, at least a plurality or set of the compressors 610A-N can be controlled by a single controller 612. The controller(s) 612 can be similar to the controllers 110, 114, 120, and/or 162A-N described herein.

The sensors 614A-N can be positioned throughout the facility 106. The sensors 614A-N can include temperature, humidity, motion, and/or image sensors. One or more other types of sensors can also be used in the facility 106. In some implementations, one or more of the sensors 614A-N can be configured to or otherwise part of components in the facility 106, such as the batteries 108A-N, the solar arrays 112A-N, the mainspring generator 118, the refrigeration systems 620A-N, the blast cells 606A-N, the compressors 610A-N, and/or the facility vehicles 616A-N.

As an illustrative example, the batteries 108A-N can include one or more types of sensors that are configured to measure current battery capacity, charge, discharge, production, storage, etc. The solar arrays 112A-N can include solar radiation sensors (e.g., pyranometers). Such sensors can be configured to measure broadband solar irradiance and/or solar radiation flux density. In other words, such sensors can measure power of light and/or heat from the sun, which can provide signals about how much solar energy is produced by the solar arrays 112A-N. The mainspring generator 118 can include one or more sensors for measuring current production. The refrigeration systems 620A-N can include temperature, humidity, and/or pressure sensors configured to measure ambient conditions and/or performance of the refrigeration systems 620A-N's components. The blast cells 606A-N can include temperature sensors, for example, configured to measure temperature values inside the blast cells 606A-N for use in determining whether blast cell operations and/or cycles should be performed or modified. Similarly, the compressors 610A-N may include inline ambient condition sensing devices to capture signals indicating temperature, pressure, and/or humidity levels throughout the facility 106. As another illustrative example, the facility vehicles 616A-N, such as forklifts, can include motion sensors, temperature sensors, and/or image sensors, all of which can capture and record various signals that can be used by the centralized controller 102 to determine energy performance optimizations and control decisions for the facility 106.

The facility vehicles 616A-N can include forklifts, robots, autonomous vehicles, cranes, and/or other types of vehicles or machinery that may be used in the facility 106 to perform operations therein. The facility vehicles 616A-N can be semi-automated and/or fully-automated vehicles and devices. The facility vehicles 616A-N can, in some implementations, be controlled or manually operated by human workers in the facility 106.

The other energy resources 618A-N can include other types of renewable energy resources that may be used by the facility 106, such as wind turbines, windmills, hydroelectric energy sources, nuclear energy sources, etc. Any of these energy resources 618A-N can be part of the facility 106 and/or remote from the facility 106. If remote, the energy resources 618A-N can be in electrical communication with the facility 106 to provide power/energy to components therein. In some implementations, the other energy resources 618A-N may also be controlled by controllers similar to the controllers described herein.

The centralized controller 102 can include processor(s) 620, the software interface 172, a model training engine 622, a signal processing engine 624, an output and/or control generator 626, a short-term optimization engine 628, a medium-term optimization engine 630, and/or a long-term optimization engine 632. The processor(s) 620 can be configured to perform operations at the centralized controller 102 as described herein. The software interface 172 can provide communication between the centralized controller 102 and other components and controllers described throughout this disclosure.

The model training engine 622 can be configured to generate, train, and iteratively improve one or more of the models described herein. For example, the model training engine 622 can retrieve training data 634A-N from the models data store 128 to generate and train each of the models described herein. The model training engine 622 can also receive signals generated by one or more of the controllers described herein and/or determinations made by engines of the centralized controller 102 to be used in generating and training the models. The models generated by the model training engine 622 can be stored in the models data store 128 as models 636A-N. One or more of the models 636A-N can then be retrieved by the centralized controller 102 during runtime and used in determining performance optimizations and control operations over one or more timeframes (e.g., short, medium, and long-term timeframes).

The signal processing engine 624 can be configured to process any one or more of the signals received from the controllers 110, 114, 120, 162A-N. For example, the signal processing engine 624 can retrieve one or more of the models 636A-N from the models data store 128 and provide the signals as input to the retrieved models 636A-N. The retrieved models 636A-N can generate output indicating energy performance information (e.g., consumption, production, storage) of one or more components in the facility 106 over some period of time (e.g., a current time, real-time, near real-time, a projected future amount of time). In some implementations, the signal processing engine 624 can retrieve data from the data store 600, such as historic facility data 644A-N, facility schedules and/or operations 646A-N, and/or historic energy data 648A-N to further process the signals and determine the energy performance information over some period of time.

The short-term optimization engine 628 can be configured to determine one or more control operations that can be performed in a short-term timeframe in order to achieve energy performance optimization objectives of the facility 106 in the short-term. The engine 628 can receive the energy performance information generated by the signal processing engine 624. The engine 628 can also retrieve one or more of the models 636A-N from the models data store 128. The engine 628 can also retrieve data from the data store 600, such as the historic facility data 644A-N, facility schedules and/or operations 646A-N, historic energy data 648A-N, medium-term energy usage optimizations 640A-N, and/or long-term energy usage optimizations 644A-N. The engine 628 can provide one or more of the received/retrieved data to the retrieved models 636A-N in order to determine and generate component control instructions for execution in the short-term timeframe. In some implementations, the engine 628 can also retrieve one or more determinations criteria 650A-N from the data store 600, which can include criteria for determining how to achieve short-term energy performance optimization objectives for the particular facility 106 (e.g., expected and/or desired emission levels during the short-term timeframe, expected and/or desired energy production and/or energy storage levels during the short-term timeframe). The retrieved determinations criteria 650A-N can then be used by the engine 628 to determine and/or generate the component control instructions for execution in the short-term timeframe. Determinations made by the engine 628 can be stored in the data store 600 as short-term energy usage optimizations 638A-N.

The medium-term optimization engine 630 can be configured to determine one or more control operations that can be performed in a medium-term timeframe in order to achieve energy performance optimization objectives of the facility 106 in the medium-term. Determinations made by the engine 630 can be stored in the data store 600 as medium-term energy usage optimizations 640A-N. Refer to the short-term optimization engine 628 for further discussion.

The long-term optimization engine 632 can be configured to determine one or more control operations that can be performed in a long-term timeframe in order to achieve energy performance optimization objectives of the facility 106 in the long-term. Determinations made by the engine 632 can be stored in the data store 600 as long-term energy usage optimizations 642A-N. Refer to the short-term optimization engine 628 for further discussion.

In some implementations, the engines 628, 630, and 632 can collaborate and share determinations to iteratively improve their determinations made during runtime. For example, determinations made by the long-term optimization engine 632 can be fed back to the short-term optimization engine 628. The short-term optimization engine 628 can then determine updated short-term component control operations that may better achieve short-term energy performance optimization objectives of the facility 106, medium-term objectives, and/or long-term objectives.

The output and/or control generator 626 can be configured to generate instructions or other types of output based on determinations made at the centralized controller 102. For example, the generator 626 can receive determinations made by the engines 628, 630, and/or 632 and then generate component control instructions based on those determinations. The generator 626 can transmit the component control instructions to the respective controllers in the facility 106 for execution during the short, medium, and/or long-term timeframes. In some implementations, the generator 626 can retrieve the short-term energy usage optimizations 638A-N, the medium-term energy usage optimizations 640A-N, and/or the long-term energy usage optimizations 642A-N from the data store 600 to be used in generating the instructions and/or other output.

In some implementations, the generator 626 can generate output to be presented at a computing device of a relevant user in the facility 106. For example, the generator 626 can generate reports or other information about energy performance in the facility 106 per component and/or over one or more periods of time (e.g., current period of time, short-term, medium-term, long-term). The generator 626 can also generate information indicating recommended actions and/or controls to take in the facility 106 to achieve one or more short, medium, and/or long-term objectives in the facility. The relevant user can provide user input at the computing device indicating selection of one or more recommended actions/controls to be executed in the facility 106. The relevant user can also provide other user input at the computing device, including but not limited to user-generated actions or controls to be performed by one or more components in the facility 106 (e.g., which may override current control operations for the one or more components).

As mentioned above, the models data store 128 can be configured to store information such as the training data 634A-N and/or the models 636A-N. The training data 634A-N can include any variety of data that may be used for generating and training the models 636A-N. For example, the training data 634A-N can include determinations made by one or more of the controllers 110, 114, 120, and/or 162A-N. The training data 634A-N can include one or more signals from the sensors 614A-N. The training data 634A-N can include one or more other signals and/or information generated by the components 108A-N, 112A-N, 118, 602A-N, 606A-N, 610A-N, 616A-N, 618A-N, 122A-N, and/or 126 described herein. The training data 634A-N may also include historic data, such as the historic facility data 644A-N, prior control determinations and/or performance indicators for the facility 106, and/or the historic energy criteria 648A-N.

The data store 600 can be similar to the models data store 128 described above. In some implementations, the data store 600 and the models data store 128 can be part of a same data repository and/or data storage service. The data store 600 can also be separate from the models data store 128. The data store 600 can be configured to store information such as the short-term energy usage optimizations 638A-N, the medium-term energy usage optimizations 640A-N, the long-term energy usage optimizations 642A-N, the historic facility data 644A-N, the facility schedules and/or operations 646A-N, the historic energy data 648A-N, and/or the determinations criteria 650A-N, as described above.

FIG. 6B illustrates similar components in FIG. 6A and additional components for performing techniques such as scheduling charging of electric vehicles and battery units in the facility 106. These scheduling and charging techniques are described in further detail in reference to FIGS. 8, 9, 10A, and 10B. As shown in FIG. 6B, components of the facility 106, the centralized controller 102, the energy market(s) system 126, the models data store 128, electronic freight vehicles 660A-N, and a facility management system 802 can communicate (e.g., wired wirelessly), via the network(s) 104.

In addition to or instead of one or more components described in reference to FIG. 6A, the facility 106 can include dock charging units 814A-N, a vehicle charging system 850, and charging unit controllers 668A-N. The dock charging units 814A-N can include chargers 664A-N and/or charge stations 666A-N. The chargers 664A-N and/or the charge stations 666A-N can be controlled automatically by the charging unit controllers 668A-N. The controllers 668A-N can be configured to receive instructions from the centralized controller 102 to actuate one or more of the chargers 664A-N and/or the charge stations 666A-N according to a charging schedule. The controllers 668A-N can be configured to automatically execute the charging instructions.

Figure 8:
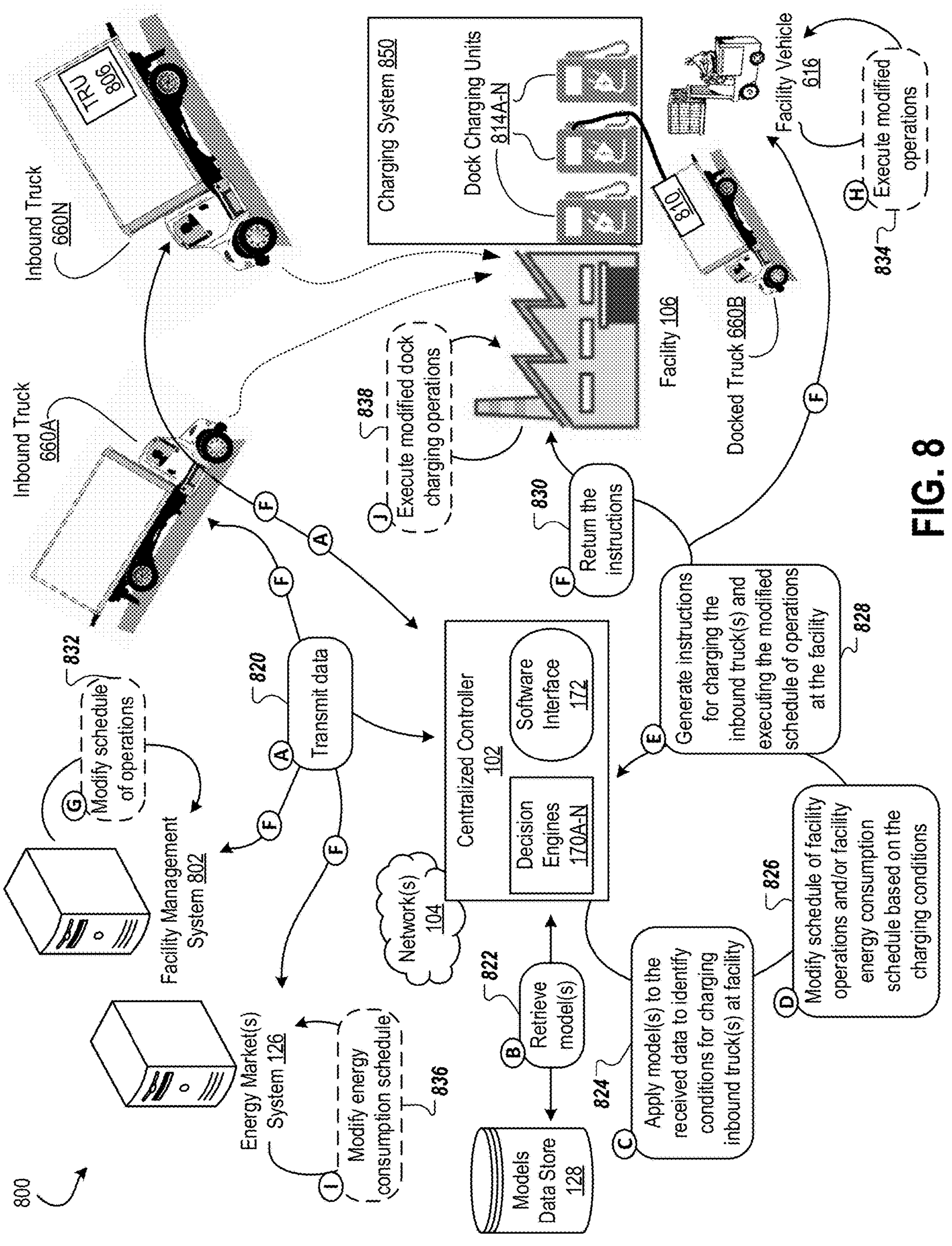
FIG. 8 is a conceptual diagram of a system for scheduling charging of electric vehicles and TRUs in a facility.

The vehicle charging system 850 can sometimes include one or more of the dock charging units 814A-N and/or the charging unit controllers 668A-N, as shown in FIG. 8. The system 850 can be configured to provide vehicle to load operations at the facility 106. For example, the system 850 can pull loads from battery 810A-N of electric freight vehicles 660A-N and/or TRUs 806A-N, then provide those loads back to the facility 106 for consumption by facility components. The centralized controller 102 can receive information from the system 850 about the loads that are pulled from the vehicles 660A-N and/or the TRUs 806A-N, which can then be used as another input by the centralized controller 102 to determine optimal control operations/set points for the various assets/components in the facility.

In some implementations, one or more of the dock charging units 814A-N can have only chargers 664A-N or only charge stations 666A-N. Some dock charging units 814A-N can include a combination of one or more of the chargers 664A-N and one or more of the charge stations 664A-N. The dock charging units 814A-N can be positioned within a dock area of the facility 106. For example, the dock charging units 814A-N can be positioned at dock doors that are configured to receive an inbound vehicle, such as a truck that is delivering items to be unloaded into the facility 106 (or a truck that is receiving items and is being loaded at the facility 106). Each dock door can be configured to include a dock charging unit 814. Sometimes, all the dock doors in the dock area can include a respective dock charging unit 814. In some implementations, only some of the dock doors in the dock area may include a respective dock charging unit 814. The chargers 664A-N and/or the charge stations 666A-N can be configured to plug into or otherwise receive batteries, battery units, charging units, refrigeration units, or other electrically-charged components of the electric freight vehicles 660A-N at the facility 106. The chargers 664A-N and/or the charge stations 666A-N can then provide power to recharge any of these components of the electric freight vehicles 660A-N. In some implementations, the chargers 664A-N can be configured to charge an electric freight vehicle 660. As another example, the charge stations 666A-N can be configured to receive and charge a transport refrigeration unit (TRU) for an electric freight vehicle 660.

In addition to or instead of one or more components described in reference to FIG. 6A, the centralized controller 102 may include an electric vehicle charging module 676. The module 676 can be configured to perform operations described in reference to FIGS. 8, 9, 10A, and 10B. The module 676 can, for example determine schedules for charging the electric freight vehicles 660A-N that arrive at the facility 106. More particularly, the module 676 can include an inbound vehicle charging determiner 678, a schedule modifications determiner 680, and an instructions generator 682.

The inbound vehicle charging determiner 678 can be configured to identify the electric freight vehicles 660A-N that are scheduled to arrive at the facility 106 within one or more given periods of time. The determiner 678 may make this identification based on receiving information directly from the vehicles 660A-N and/or computing systems of the facility 106, such as the facility management system 802, or other warehouse management systems (WMSs). The determiner 678 is further configured to determine whether the arriving (e.g., inbound) vehicles 660A-N require some form of charging and if so, how much charging. The determiner 678 may also determine for how long to charge the arriving vehicles 660A-N, what equipment (e.g., dock charging units 814A-N) in the dock area of the facility 106 may be available at time of arrival, and whether the arriving vehicles 660A-N can be charged while other operations are being performed in the facility 106. The other operations can include unloading and/or loading the arriving vehicles 660A-N, putting away and/or retrieving items throughout the facility 106, running cooling cycles in one or more of the blast cells 606A-N, etc. In some implementations, the determiner 678 can retrieve one or more of the models 636A-N from the models data store 128, and use the models 636A-N to determine how, when, where, and for how long to charge the arriving vehicles 660A-N.

The schedule modifications determiner 680 can receive determinations made by the inbound vehicle charging determine 678 and use the received information to determine whether and how to modify schedules of operations being performed for the facility 106 at a present time and/or during upcoming/future times (such as when the electric freight vehicles 660A-N arrive at the facility 106, while those vehicles 660A-N need to be charged at the facility 106, etc.).

The schedule modifications determiner 680 can request, retrieve, and/or poll other facility components for information about tasks and/or operations being performed in the facility 106. For example, the determiner 680 can receive information from the facility vehicles 616A-N (such as schedules of tasks being performed and/or to be performed by the respective vehicles), the blast cells 606A-N (such as schedules for loading and unloading blast cells and running the blast cells), and/or the facility management system 802 (such as schedules of all tasks or subsets of tasks being performed or to be performed in the facility 106 by human workers and/or vehicles). The determiner 680 may also request, retrieve, and/or poll other various energy components for information about when energy may be consumed and/or collected, among other energy-related activities described throughout this document. For example, the determiner 680 can receive energy consumption, production, storage, and/or collection information from one or more of the batteries 108A-N, solar arrays 112A-N, mainspring generator(s) 118, refrigeration systems 602A-N, compressors 610A-N, sensors 614A-N, other facility components 116A-N, other energy resources 618A-N, the energy market(s) system 126, and/or the energy grids 122A-N.

Using any combination of the information mentioned above, the schedule modifications determiner 680 can determine how to adjust the schedules of operations and/or tasks being performed or to be performed in the facility 106 in light of the charging of the arriving electric freight vehicles 660A-N. The determiner 680 may also retrieve one or more of the models 636A-N from the models data store 128, which can be used to determine modifications to existing schedules or new schedules of operations for the facility 106. Schedule modifications determined by the determiner 680 can include, but are not limited to, changing times at which the arriving vehicles 660A-N are charged, changing times and/or length of loading and/or unloading the vehicles 660A-N in the dock area, changing tasks performed by one or more of the facility vehicles 616A-N to occur before or after the vehicles 660A-N are charged (thereby consuming less overall energy) rather than while the vehicles 660A-N are being charged, causing one or more of the blast cells 606A-N to be charged before or after the vehicles 660A-N are charged rather than while the vehicles 660A-N are being charged, charging the batteries 108A-N before the vehicles 660A-N are being charged then offloading or consuming that battery power for other operations/tasks being performed in the facility 106 while the vehicles 660A-N are being charged, etc. In some implementations, any of the schedule modifications generated by the determiner 680 can be fed back into sub-components of the centralized controller 102 and used to assess and predict short, medium, and/or long term optimizations, and generate instructions for the controllers described herein based on those predictions. Refer to at least FIGS. 1B and 6A for further discussion.

The instructions generator 682 can be configured to receive the schedule modifications generated by the determiner 680 and generate instructions to update the schedules of operations accordingly. The instructions generator 682 can also generate instructions to cause the dock charging units 814A-N to activate and change the vehicles 660A-N upon arrival. The instructions from the generator 682 can be transmitted to the charging unit controllers 668A-N for automatic execution. In some implementations, as mentioned above, the generator 682 can generate instructions to modify one or more of the operations and/or tasks performed in the facility by energy components and/or other facility components. These instructions can be transmitted, by the generator 682, to controllers of the respective components. For example, the instructions can be transmitted to the battery controller 110, the solar controller 114, the controller(s) 604 of the refrigeration systems 602A-N, the mainspring generator controller 120, the controller(s) 608 of the blast cells 606A-N, the controller(s) 612 of the compressors 610A-N, the component controllers 162A-N of the other facility components 116A-N, the facility vehicles 616A-N, the grid(s) controller 124, and/or the facility management system 802.

The facility management system 802 can be a computing system associated with the facility 106 and configured to determine operations and schedules of operations/tasks to be performed in the facility 106. The facility management system 802 can be similar to a WMS, in some implementations. Sometimes, the facility management system 802 and the centralized controller 102 can be part of a same computer system and/or network of computing systems. The facility management system 802 can include a facility operations determiner 670, a facility operations scheduler 672, and a communication interface 674. The communication interface 674 can allow the facility management system 802 to communicate with other components described herein.

The facility operations determiner 670 can be configured to determine a plurality of tasks and operations to be performed in the facility 106 over any given period of time and based on a variety of activities, factors, and conditions associated with the facility 106. As an illustrative example, the determiner 670 can determine unload, load, pick up, and put away tasks for one or more of the facility vehicles 616A-N. Various other tasks and operations can be determined by the determiner 670 that are described throughout this document.

The facility operations scheduler 672 can receive the operations determined by the generator 670 to generate one or more schedules for the facility 106 over any given period of time. The schedule(s) generated by the scheduler 672 can be provided to the electric vehicle charging module 676 of the centralized controller 102. The schedule(s) may also be transmitted to any of the controllers, computer systems, and/or vehicles described in reference to FIG. 6A. In some implementations, the scheduler 672 can receive schedule modifications from the schedule modifications determiner 680 of the electric vehicle charging module 676 and implement those modifications (instead of the determiner 680 and/or the instructions generator 682 implementing those modifications).

The electric freight vehicles 660A-N can include any type of vehicle that may be full electric and/or partially electric (e.g., hybrid). The vehicles 660A-N may include but are not limited to trucks, delivery cars/vans, freight carts, train cars, etc. Any of the electric freight vehicles 660A-N can include batteries 810A-N, TRUs 806A-N, and/or controllers 662A-N.

The batteries 810A-N can be any mobile power source that is part of or otherwise attached to the electric freight vehicles 660A-N. The batteries 810A-N can be configured to store power for the electric freight vehicles 660A-N, which can be consumed by the vehicles 660A-N and used to operate the vehicles 660A-N. In some implementations, the vehicle 660 can be hybrid and have a unit on board that allows for shifting from diesel consumption to electric consumption and vice versa during a journey/trip.

The TRUs 806A-N can be mobile refrigeration units that are configured to provide cooling and/or refrigeration to items placed inside the vehicles 660A-N during transit to and from the facility 106. The TRUs 806A-N can have their respective batteries or other power sources. Sometimes, the TRUs 806A-N can have backup batteries such that the TRUs can run on electricity or diesel of the respective vehicle 660. The TRUs 806A-N can be hybrid. The TRUs 806A-N may also be fully electric. The TRUs 806A-N can plug into the respective vehicle 660 to receive energy and/or an external power source (e.g., a battery). In some implementations, the TRUs 806A-N can be hooked up to existing batteries or other power sources of the vehicles 660A-N. The controllers 662A-N of the vehicles 660A-N may be configured to execute instructions that cause activation, deactivation, or other controls of the components of the vehicles 660A-N, such as the batteries 810A-N and/or the TRUs 806A-N.

In some implementations, one or more freight vehicles can include hydrogen powered vehicles 690A-N. Such vehicles (e.g., trucks) may be powered by hydrogen power. The facility 102 can optionally include hydrogen electrolyzers 692A-N, which can be configured to generate energy that may be used by the hydrogen powered vehicles 690A-N. In some implementations, energy generated by the hydrogen electrolyzers 692A-N can also be provided to power the mainspring generator 118, the facility vehicles 616A-N (forklifts), and other assets/components in the facility 106. In yet some implementations, the hydrogen electrolyzers 692A-N can be configured to build a stock of hydrogen energy which can then be deployed during certain seasons and/or periods of time, especially depending on energy costs and other related factors for the facility 106.

Figure 7:
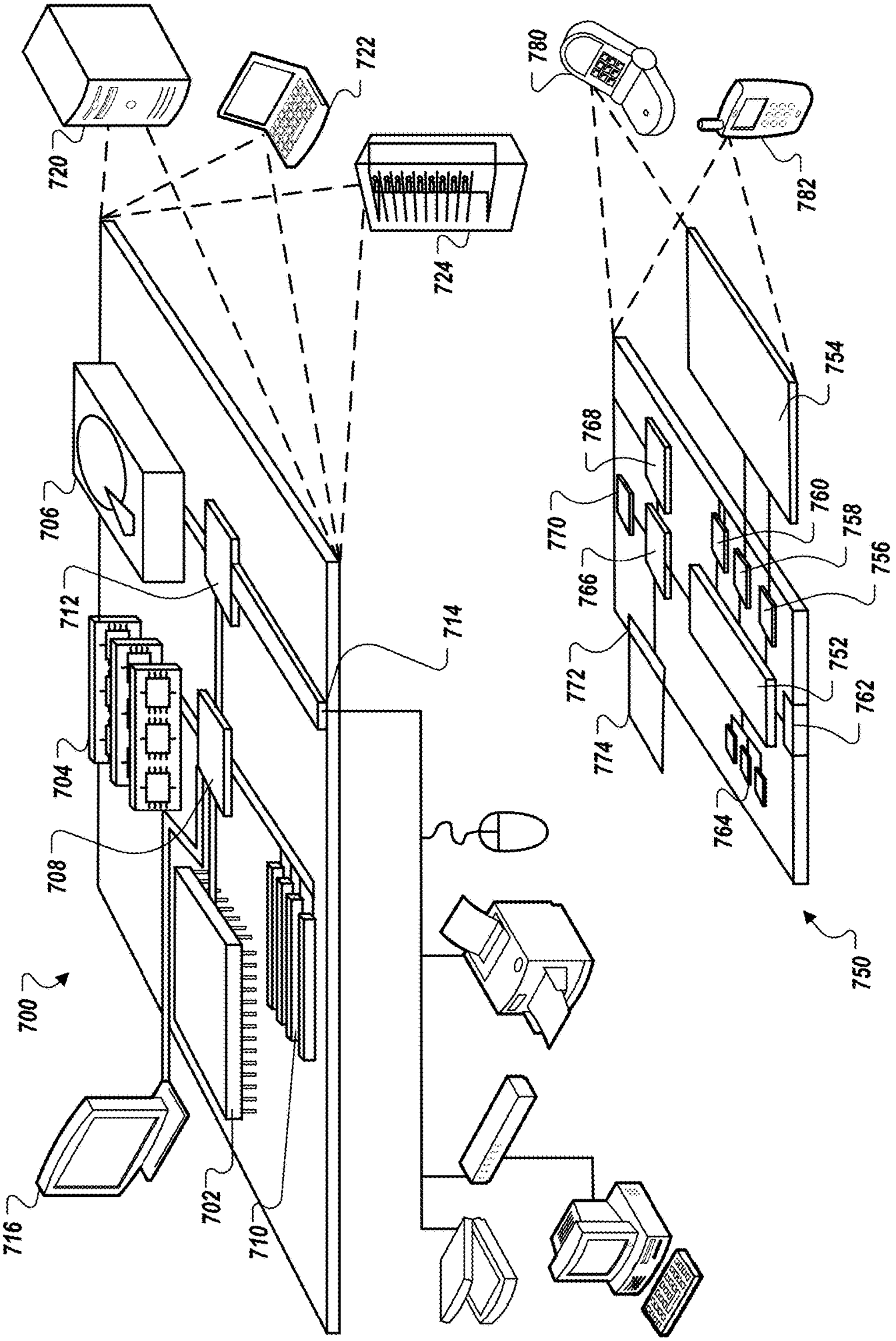
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 8 is a conceptual diagram of a system 800 for scheduling charging of electric vehicles 804A-N and TRUs 806 in a facility 106. The system 800 may include one or more system components described herein, such as in reference to FIGS. 1A, 1B, 6A, and 6B. For example, the system 800 can include the centralized controller 102, the models data store 128, the energy market(s) system 126, the facility management system 802, and components of the facility 106, including but not limited to the dock charging units 814A-N and/or one or more facility vehicles 616 (such as forklifts, human-operated machines, automated machines, robots, autonomous guided vehicles, cranes, drones, etc.). Any of the components described herein may communicate with each other via the network(s) 104. Refer to FIGS. 6A and 6B for further discussion about the components of the system 800.

The system 800 shown in FIG. 8 can provide a control system for scheduling electric vehicle charging amidst operations and tasks being performed at the facility 106. The system 800 may further be used in combination with the techniques described throughout this disclosure to determine when and how to divert energy from various energy sources, facility operations and tasks to be consumed for the charging of electric vehicles, such as the electric freight vehicles 660A-N that are arriving at or docked at the facility 106. Determining how, when, and where to charge the electric vehicles 660A-N (e.g., inbound and/or docked trucks, freight cars, vans, or other delivery vehicles) can be performed in tandem with determining controls for various energy components of the facility 106 as described in reference to at least FIGS. 1A and 1B.

Still referring to the system 800 in FIG. 8, data can be transmitted between various components in block A (820). For example, the centralized controller 102 can receive and/or request truck arrival data from one or more of the inbound electric trucks 660A and 660N. The inbound truck 660A can be an electric freight vehicle. The inbound truck 660N can be a freight vehicle having the TRU 806 (e.g., chargeable refrigeration unit). The data received from the inbound trucks 660A-N can include location data, GPS data, data about items that are loaded in the trucks (including storage temperatures, quantities, customer information, and various storage conditions), estimated arrival time, instructions for unloading the items once the respective truck arrives at the facility 106, expected charge/battery life at time of arrival at the facility 106, whether charging may be required upon arrival, details about batteries, TRUs, or other power sources that are included on the respective trucks, etc.

The centralized controller 102 can also receive or retrieve energy data for the facility 106 from one or more components in the facility (refer to FIGS. 1A, 1B, and 6A), the centralized controller 102 itself, one or more data stores, and/or the facility management system 802. Additionally or alternatively, the centralized controller 102 can receive or retrieve energy data for the energy market from the energy market system 126, as described herein. Additionally or alternatively, the centralized controller 102 can receive or retrieve schedules of operations and/or tasks being performed and/or to be performed in the facility 106 from the facility management system 802 (refer to FIG. 6B).

The centralized controller 102 may retrieve one or more models from the models data store 128 in block B (822). The models can be used by the controller 102 to determine whether, when, and how the inbound trucks 660A and 660N may be charged upon arrival at the facility 106. In some implementations, the models can also be trained and used to determine modifications to the schedule(s) of operations for the facility 106 and balance efficient performance of the schedule(s) with energy consumption, production, and storage, and charging of the trucks 660A-N.

In block C (824), the centralized controller 102 (e.g., at one or more of the decisions engines 170A-N) may apply the retrieved model(s) to the received data to identify conditions for charging the inbound trucks 660A and 660N at the facility 106 upon arrival. For example, the model(s) can be used to determine a lowest cost to charge the trucks 660A-N (e.g., to charge their respective batteries 810 and/or their respective TRUs 806) based on kilowatts (kW). Some electric TRUs 806, for example, can have their own batteries, and the model can be trained to identify that a TRU 806 has a battery and then determine how much to charge the TRU's battery based on determining how far the respective truck will be traveling in a next leg or trip after the facility 106. Therefore, the model may generate output recommending to charge the TRU's battery only to 80% instead of 100% because the 80% charge may be sufficient to continue operating the TRU 806 until the respective truck arrives at the next destination. The 80% charge may also be determined based on weighing the costs of re-allocating energy of the facility 106 to charging of the TRU's battery. If the TRU's battery is only being charged to 80% rather than 100%, for example, certain scheduled tasks and operations (e.g., human and/or automated routing of items to and from storage from the dock area of the facility 106, operating one or more blast cells, human and/or automated packing and/or unpacking of one or more pallets) may still be performed without causing delays in completion of the facility schedule(s) and/or need for consuming, producing, or purchasing additional energy for the facility 106.

Similar techniques can be performed to determine whether, when, and how to charge batteries (such as the battery 810) or other power sources of the electric trucks 660A-N. In some implementations, one or more of the electric trucks 660A-N can have small batteries or power sources because those trucks 660A-N may travel shorter distances or distances within some threshold range. Because the batteries are smaller, the battery capacity and weight are reduced, resulting in the respective trucks having more space to move larger and/or heavier quantities of items (since the total weight of the truck(s) is not being primarily consumed by the battery weight) and requiring less time to charge or recharge the respective battery. Using the model(s), the centralized controller 102 can appropriately model and predict how much time and/or energy would be required to charge or recharge the battery of such a truck while still maintaining optimal control and operations of the facility 106's energy components as well as performance of the facility's schedule(s) of operations.

The centralized controller 102 can modify the schedule(s) of operations and/or facility energy consumption schedule(s) based on the charging conditions in block D (826). In block D (826), the centralized controller 102 can use the one or more models to schedule charging activities and facility operations around each other. A goal of modifying the schedules can include offloading energy to the inbound trucks 660A-N while those trucks are being loaded and/or unloaded. Performing these operations at the same time can minimize need for keeping the trucks 660A-N in the dock area of the facility 106 for longer than needed to complete loading and unloading tasks. Therefore, operations in the facility 106 can still be performed efficiently and on-time, despite adding in additional operations of charging the battery 810 and/or TRU 806 of one or more of the trucks 660A-N.

The centralized controller 102 can generate instructions for charging the inbound trucks 660A-N and executing the modified schedule(s) of operations and/or energy consumption at the facility 106 (block E, 828). The instructions can be returned to one or more system components of the facility 106 described throughout this document (block F, 830). For example, the instructions can be transmitted to controllers of one or more energy components described in reference to at least FIGS. 1A, 1B, 6A, and 6B. The controllers can be configured to execute the instructions to perform the modified schedule(s) of operations and/or energy consumption. Additionally or alternatively, the instructions can be transmitted to the energy market(s) system 126, the facility management system 802, one or more of the inbound trucks 660A-N, and/or the facility vehicle(s) 616.

The receiving components and/or systems can perform additional steps, including executing the instructions to perform the modified schedule(s). As a merely illustrative example, the facility management system 802 may optionally modify a particular schedule of operations for the facility 106 according to the received instructions (block G, 832). The facility management system 802 can then transmit the modified schedule to one or more components that are assigned to operations in the modified schedule. In some implementations, the centralized controller 102 can modify the schedule (see blocks D and E, 826 and 828, respectively), then transmit the modified schedule to the facility management system 802 for any additional modifications and/or use in generating future/subsequent schedules of operations for the facility 106.

Additionally or alternatively, the facility vehicle 616 may receive the instructions from the centralized controller 102 in block F (830) then optionally execute the modified operations in block H (834). Executing the modified operations can include presenting those operations in a graphical user interface (GUI) display at a user device (e.g., computing device, mobile device) associated with the facility vehicle 616 and/or a human worker operating the vehicle 616. The operations may instruct the vehicle 616 and/or the human worker to perform new tasks, to finish currently-performing tasks, to prioritize one or more tasks over other tasks, etc.

Additionally or alternatively, the energy market(s) system 126 may receive the instructions from the centralized controller 102 in block F (830) and optionally modify one or more energy consumption schedules (block I, 836). Modifying the schedules according to the instructions can include changing times at and/or quantities of which energy is produced by components such as the solar arrays 112A-N, the batteries 108A-N, and/or the mainspring generator 118. Modifying the schedules can include changing times at and/or quantities of which energy is purchased from the energy grid(s) 112A-N. Modifying the schedules can include changing times at and/or quantities of which energy is consumed by any of the components of the facility 106 described at least in reference to FIG. 6A. The energy market(s) system 126 can then transmit the modified schedule(s) to controllers of the one or more components that are associated with energy consumption operations and/or tasks in the schedule(s). In some implementations, the centralized controller 102 can modify the energy consumption schedule(s) (see blocks D and E, 826 and 828, respectively), then transmit the modified schedule(s) to the energy market(s) system 126 for any additional modifications and/or use in generating future/subsequent schedules.

Additionally or alternatively, the components in the facility 106 may receive the instructions from the centralized controller 102 in block F (830) and optionally execute modified operations, including executing modified dock charging operations (block J, 838). Executing the dock charging operations can include causing one or more of the dock charging units 814A-N to begin outputting electricity or other power to one or more vehicle batteries 810 and/or TRUs 806 that are attached to the charging units 814A-N.

In the illustrative example of FIG. 8, the electric vehicle 660B is an electric truck docked at the dock area of the facility 106 and its battery 810 is being charged by one of the dock charging units 814A-N. At the same or similar time (e.g., while the battery 810 is being charged), at least the facility vehicle 616 may be unloading items from the docked truck 660B. A controller of the respective dock charging unit being used to charge the battery 810 can execute the modified dock charging operations by reducing an amount of time that power will be supplied to the battery 810. The amount of time of charging can be reduced to accommodate for one of the inbound trucks 660A and 660N that may require charging upon arrival (while still ensuring that the battery 810 is charged sufficiently so that the truck 660B can complete its next leg of a trip using the charged battery 810). One or more other dock charging operations and/or modified dock charging operations are possible.

Still referring to the illustrative example of FIG. 8, one or more of the inbound trucks 660A and 660N may also receive the instructions from the centralized controller 102 (block F, 830), which can instruct the trucks 660A and 660N to dock at particular bays/doors in the dock area upon arrival at the facility 106. The trucks 660A and 660N can dock at the bays/doors having available dock charging units 814A-N and, optionally, any other equipment/components necessary to efficiently complete facility operations related to unloading and/or loading the respective trucks 660A and 660N.

Figure 9A:
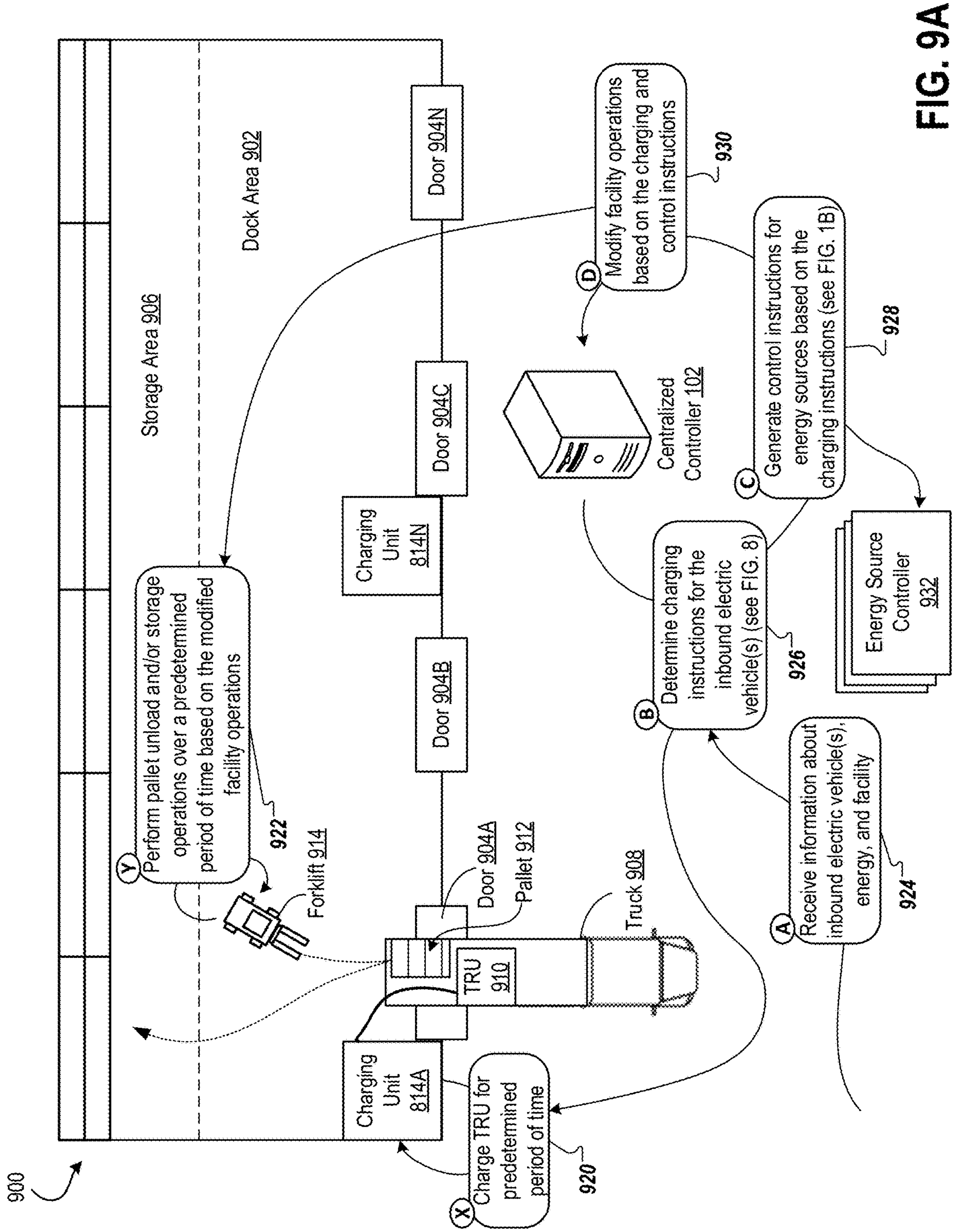
FIGS. 9A and 9B are conceptual diagrams of scheduling and charging electric vehicles at a facility.
Figure 9B:
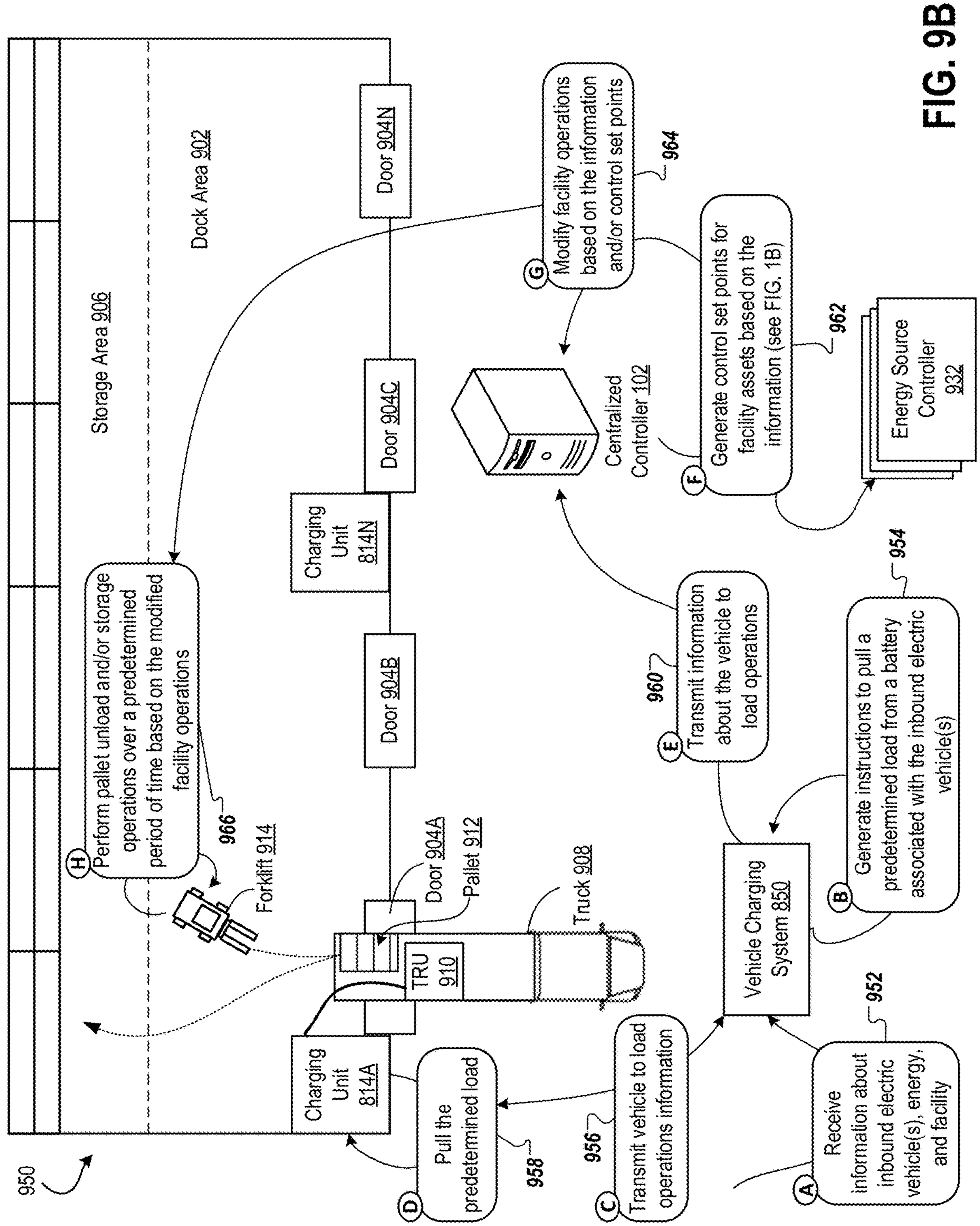

The inbound truck 660A may have a battery (such as the battery 810), and the modified dock charging operations may instruct the truck 660A to dock at a door having a charging unit 814A-N intended to charge truck batteries. The inbound truck 660N may have TRU 806, and the modified dock charging operations may instruct the truck 660N to dock at a door having a charging unit 814A-N intended to charge TRUs and similar mobile refrigeration units. The TRU 806 can be an electric unit mounted to the truck 660N that is configured to refrigerate a space inside the truck 660N to maintain items placed within the space at desired/predetermined temperatures. The TRU 806 can run on its power source (e.g., battery) until the power source is drained/out of charge. Once the power source is drained, the TRU 806 can switch to run on the battery 810 of the truck 660N or another power source of the truck 660N. When the truck 660N is docked at the bay/door at the facility 106, a cable can extend from the respective dock charging unit 814A-N to the TRU 806 on the truck 660N for charging. Therefore, the TRU 806 (and the battery 810 in similar charging scenarios) can be charged while the truck 660N is being unloaded (or loaded). Refer to FIGS. 9A and 9B for further discussion about charging the trucks 660A-N at the facility 106.

Sometimes, all of the dock charging units 814A-N, or a subset/portion of the dock charging units 814A-N may be equipped to charge both batteries and TRUs. Sometimes, one or more of the electric vehicles 660A-N can have a combination of batteries and TRUs, any of which may require charging upon arrival at the facility 106.

FIGS. 9A and 9B are conceptual diagrams for scheduling and charging electric vehicles at a facility, such as facility 900 and facility 950, respectively. The facilities 900 and 950 can be similar to or the same as the facility 106 described herein. In the illustrative example of FIGS. 9A and 9B, each of the facilities 900 and 950 includes a dock area 902 and a storage area 906. The dock area 902 can be separated from the storage area 906 by one or more walls, structures, and/or doors. In some implementations, the dock area 902 and the storage area 906 may not be separated by any walls, structures, and/or doors.

The dock area 902 may include one or more doors 904A-N and one or more charging units 814A-N. The doors 904A-N can be arranged to receive one or more freight vehicles, such as an electric truck 908. The electric truck 908 can be similar to or the same as electric freight vehicles 660A-N described herein. The dock area 902 includes the charging unit 814A near/proximate/at the door 904A and the charging unit 814N near/proximate/at the door 904C. The dock area 902 can include additional or fewer dock charging units. For example, each of the doors 904A-N can have a respective dock charging unit. Groups of doors can have a respective dock charging unit (e.g., every set of 2 doors next to each other can have a respective dock charging unit). One or more other configurations are also possible, and may depend on the facility layout. For example, a facility that receives many electric freight vehicles (e.g., more than some threshold level) can have more dock charging units than a facility that receives fewer electric freight vehicles (e.g., less than some threshold level).

As shown in FIG. 9A, the centralized controller 102 can receive information about inbound electric vehicles, energy (e.g., consumption, production, purchase/sale), and the facility 900 (e.g., schedules of operations and tasks, inbound orders, outbound orders, human workers, facility vehicles) (block A, 924). The information can be received from a variety of sources, systems, controllers, and components described throughout this disclosure. Refer at least to FIGS. 1B, 6A, 6B, and 8.

Using the received information, the centralized controller 102 can determine charging instructions for the inbound electric vehicle(s) in block B (926). Refer to at least FIGS. 8, 10A, and 10B for further discussion.

The centralized controller 102 can also generate control instructions for one or more energy sources based at least in part on the charging instructions in block C (928). In some implementations, the centralized controller 102 can modify existing control instructions for one or more of the energy sources based at least in part on the charging instructions. For example, the controller 102 can determine when power from one or more facility batteries can be offloaded and used to power one or more of the charging units 814A-N. As another example, the controller 102 can determine when to actuate and/or deactivate freezing cycles in one or more blast cells based on how much power and/or time may be required to charge the inbound electric vehicle(s) in the dock area 902. The charging instructions can be used in combination with one or more other criteria, optimizations, schedules, etc. to determine the control instructions for the energy sources in the facility 900. Refer to FIG. 1B for further discussion about determining the control instructions. Once generated, the control instructions can be transmitted to respective energy source controllers 932 for automatic execution. Refer to FIGS. 1A, 1B, and 6A for further discussion about the different energy sources and their respective controllers.

The centralized controller 102 can also modify facility operations based on the charging and/or control instructions in block D (930). Sometimes, the controller 102 can generate new schedules of facility operations and tasks to be performed in the facility 900 at and/or around times that the electric vehicle(s) will be charged in the dock area 902. For example, the controller 102 can rearrange when more energy-intensive tasks are to be performed so that such energy-intensive tasks are performed during times when the electric vehicle(s) is not being charged at the facility 900. As another example, the controller 102 can rearrange tasks such that manual, human tasks are performed while the electric vehicle(s) is being charged at the facility 900 and automated tasks are performed when the electric vehicle(s) is not being charged. Facility operations that are generated and/or modified in block D (930) can then be transmitted by the controller 102 to relevant systems, components, and/or controllers in the facility 900.

For example, the modified facility operations can be transmitted to a forklift 914. The forklift 914 can perform pallet unload and/or storage operations over a predetermined period of time based on the modified facility operations (block Y, 922). The forklift 914 can be similar to or the same as the facility vehicles 616 described throughout this disclosure. The forklift 914 can be operated by a human worker. In some implementations, the forklift 914 can be an autonomous vehicle. The forklift 914 may be performing one or more tasks (e.g., operations) at a time that it receives the modified facility operations. The forklift 914 may complete the currently-performed task(s) before performing the modified facility operations. As described in reference to FIGS. 6B and 8, the modified facility operations can be presented in a GUI display at the forklift 914 and/or a user device of a human worker operating the forklift 914. The presented operations can include instructions directing the forklift 914 to perform tasks that were determined or otherwise modified by the centralized controller 102 in block D (930).

In the example of FIG. 9A, the forklift 914 can perform the modified operations of unloading pallets, such as a pallet 912, from a docked electric truck 908. The forklift 914 can retrieve the pallet 912 and other pallets from the truck 908 at the dock door 904A and move the pallet 912 and other pallets from the dock area 902 into one or more storage locations in the storage area 906. In some implementations, the operations performed by the forklift 914 may only include unloading the pallet 912 and other pallets from the truck 908 and placing the unloaded pallets in the dock area 902. Another forklift or facility vehicle may then retrieve the unloaded pallets and route them to designated storage locations in the storage area 906. Sometimes, the forklift 914 may move the pallets from the truck 908 to conveyor belts in the dock area 902, which can automatically route the pallets to one or more storage locations and/or stations (e.g., pallet build, pallet un-build, pallet identification) in the storage area 906 or other area(s) of the facility 900. The forklift 914 can perform the modified operations during the period of time at which a TRU 910 of the truck 908 is being charged. Once the period of time of charging the TRU 910 is complete, the forklift 914 may return to performing an original set of operations/tasks that were assigned to the forklift 914 before receiving the modified operations from the centralized controller 102. In some implementations, once the period of time of charging the TRU 910 is complete, the forklift 914 may continue performing the modified operations. The modified operations can, for example, replace the original set of operations/tasks that were assigned to the forklift 914.

The charging unit 814A can charge the TRU 910 for the predetermined period of time in block X (920). Block X (920) can be performed as soon as the truck 908 docks at the door 904A (e.g., before or while the pallet 912 and other pallets are being unloaded from the truck 908 by at least the forklift 914). Sometimes, block X (920) can be performed once the centralized controller 102 determines the charging instructions for the truck 908 in block B (926). For example, the controller 102 can determine the charging instructions in block B (926) then transmit the instructions to the charging unit 814A. Once the truck 908 docks at the door 904A, a sensor or other computing device proximate the door 904A can send a notification to the charging unit 814A indicating that the truck 908 is docked and charging of the TRU 910 can begin.

In some implementations, once the truck 908 docks at the door 904A and a relevant worker in the dock area 902 plugs the TRU 910 into the charging unit 814A, the charging unit 814A can automatically execute the charging instructions to charge the TRU 910 for the predetermined period of time (block X, 920). The predetermined period of time can be determined as part of determining the charging instructions in block B (926). The predetermined period of time can vary based on one or more factors, including but not limited to availability of energy, other operations/tasks being performed in the facility, a distance to be traveled by the truck 908 after charging is complete and unload tasks are complete, a current charge of the TRU 910 of the truck, etc.

As other examples, the charging unit 814A can execute the charging instructions to charge the TRU 910 for the predetermined period of time (block X, 920) before, during, or after the centralized controller 102 generates the control instructions for the energy sources (block C, 928) and/or modifies the facility operations (block D, 930). Sometimes, the charging unit 814A can be charging the TRU 910 when the centralized controller 102 determines updates to the charging instructions (in response to generating the control instructions in block C, 928, and/or modifying the facility operations in block D, 930), then transmits the updated charging instructions to the charging unit 814A. The charging unit 814A can then automatically executed the updated charging instructions.

In some implementations, the centralized controller 102 can transmit the charging instructions and/or the control instructions to the facility management system 802, the system 802 then being configured to generate and/or modify the facility operations (block D, 930). Sometimes, blocks B (926), C (928), and/or D (930) can be performed at a same or similar time. For example, the charging instructions can be determined based on generating the control instructions and/or modifying the facility operations. The control instructions can be generated based on determining the charging instructions and/or the facility operations. The facility operations can be modified based on determining the charging instructions and/or determining the control instructions. Any other combination is possible. Sometimes, blocks B (926), C (928), and/or D (930) can be performed in different orders. For example, the charging instructions can be determined, then the controller 102 can modify the facility operations and generate the control instructions. One or more other orders of the blocks B, C, and D are also possible.

FIG. 9B illustrates example vehicle to load operations that can be performed at the facility 950 using the vehicle charging system 850. Vehicle to load operations can be performed to pull loads from batteries of the truck(s) 908 and/or batteries of the TRU(s) 910. In some implementations, the vehicle to load operations can be performed using other mobile EV units, including but not limited to EV drive assist units that can be coupled to gas-powered trucks. The pulled loads can then be provided back to the facility 950 and used by the facility to fulfill other energy-consuming activities (thereby reducing waste and reducing dependency on energy grids, energy markets, and/or other energy sources). Information about such vehicle to load operations can also be provided to the centralized controller 102 and used by the controller 102 as one of the many inputs for determining optimal control operations/set points for assets/components in the facility 950. In some implementations, the vehicle charging system 850 can include any one or more of the charging units 814A-N. The charging units 814A-N can be configured to perform both charge and pull operations.

As shown in FIG. 9B, the vehicle charging system 850 (e.g., controller, computer system, cloud-based system) can receive information about inbound electric vehicle(s), energy, and/or the facility 950 as a whole (block A, 952).

Based on the received information, the system 850 can generate instructions to pull a predetermined load from a battery associated with the inbound electric vehicle(s) (block B, 954). The battery can be part of the truck 908, for example. As another example, the battery can be part of the TRU 910. The instructions can be generated using one or more modeling and/or machine learning techniques described herein.

The system 850 can transmit vehicle to load operations information to the charging unit 814A in block C (956). The information can include instructions for execution by the charging unit 914A, those instructions indicating the total amount of load to pull and for how long.

The charging unit 814A can pull the predetermined load in block D (958) and according to the information transmitted from the vehicle charging system 850. Power stations (including substations and/or meters) associated with the facility 950 can be updated and configured to hold the loads pulled from electric vehicles, TRUs, and/or their respective batteries. Switch gear can also be added to the facility 950 in order to move loads around and store such loads.

The vehicle charging system 850 can also transmit information about the vehicle to load operations to the centralized controller 102 (block E, 960). Such information can include the instructions executed by the charging unit 814A. Such information can include sensor data or other data collected by the charging unit 814A and/or sensing devices/systems in the facility 950 as the load is being pulled in block D (958). The information can include, for example, levels or amounts of load that is being pulled and/or has been pulled over some predetermined period of time.

The centralized controller 102 can then generate control operations/set points for facility assets based on the received information (block F, 962). Refer to at least FIG. 1B for further discussion.

The centralized controller 102 can also modify one of more facility operations based on the information and/or the control operations/set points determined in block F (962) (block G, 964). Accordingly, instructions for executing those modified facility operations can be transmitted to facility vehicles, such as the forklift 914. The forklift 914 can then perform pallet unload and/or storage operations over a predetermined period of time based on the modified facility operations (block H, 966).

Figure 10A:
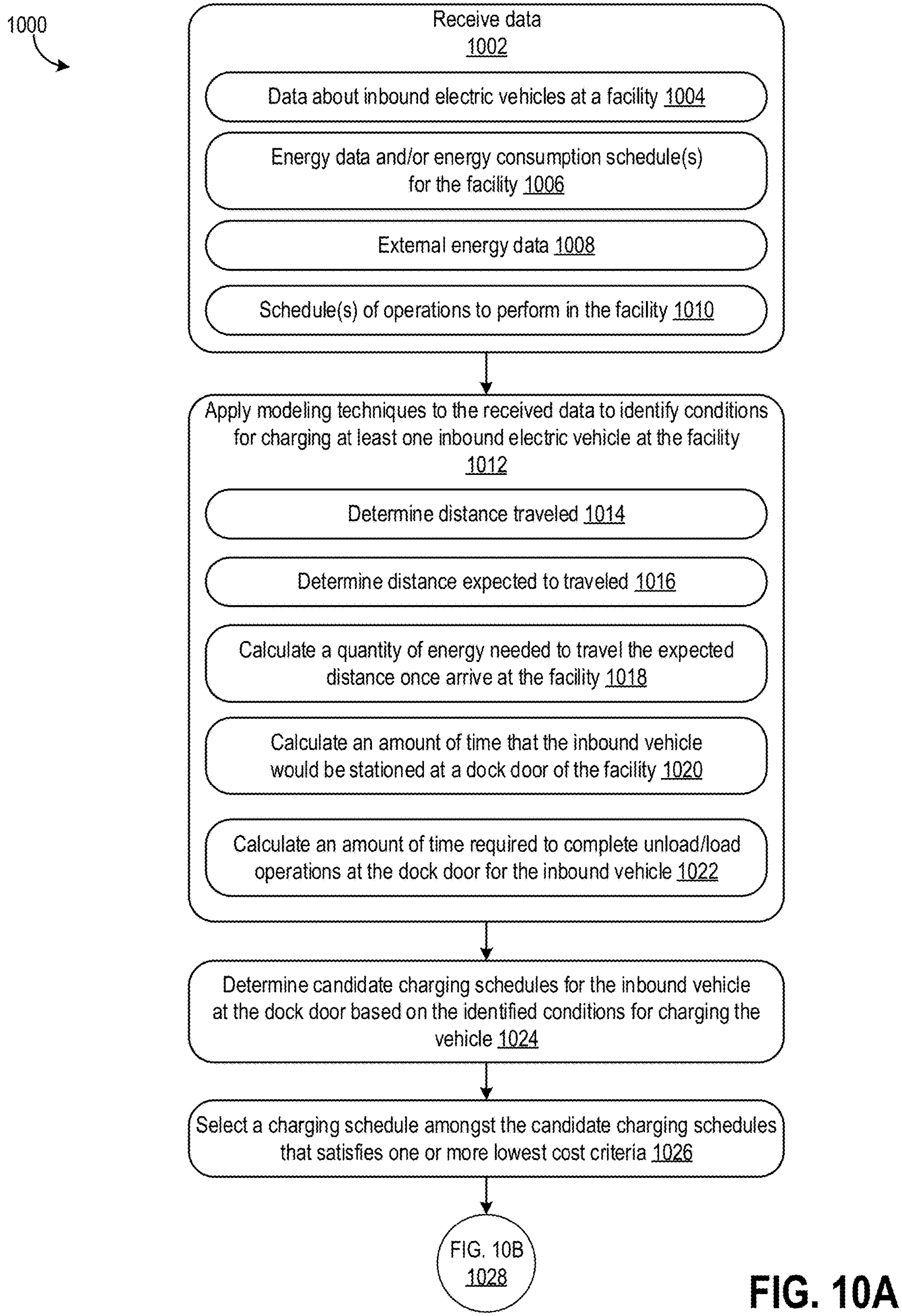
FIGS. 10A and 10B are a flowchart of a process for scheduling charging of electric vehicles and battery units in a facility.
Figure 10B:
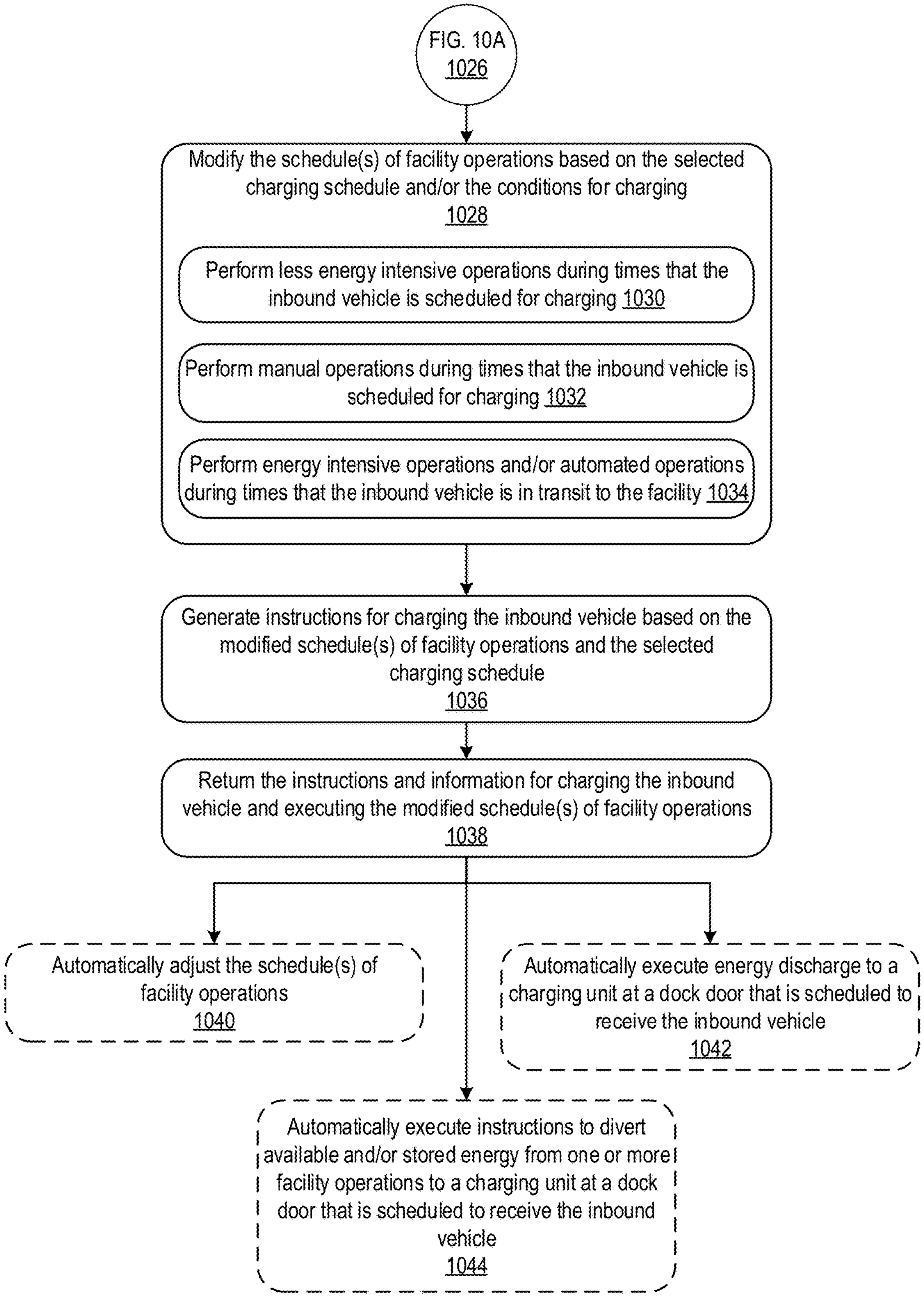

FIGS. 10A and 10B are a flowchart of a process 1000 for scheduling charging of electric vehicles and battery units in a facility. The process 1000 can be performed by the centralized controller 102 described herein. Sometimes, the process 1000 can be performed in response to receiving indication from one or more systems that an electric vehicle is expected to arrived at the facility. Sometimes, the process 1000 can be performed in response to receiving indication from the systems that the electric vehicle has arrived at the facility. One or more operations in the process 1000 are further described in reference to at least FIGS. 6B, 8, and 9. In some implementations, one or more blocks in the process 1000 can be performed by other computer systems, controllers, and/or components described throughout this disclosure. For illustrative purposes, the process 1000 is described from the perspective of a controller.

Referring to the process 1000 in both FIGS. 10A and 10B, the controller can receive data in block 1002. The data can include data about one or more inbound electric vehicles at a facility (block 1004). The data about the electric vehicles can include GPS, location, and/or estimated time of arrival information that is generated and transmitted by a computing system/device and/or sensors of the electric vehicles. Sometimes, the data about the electric vehicles can include information about a charge level or remaining charge of electric components of the vehicles, such as batteries and/or TRUs. In some implementations, the process 1000 may not begin until the controller receives data from at least one inbound electric vehicle. An indication from an electric vehicle that the vehicle will be arriving at the facility or has arrived at the facility can therefore trigger the process 1000 to determine when to charge the vehicle and perform other facility operations.

The received data can additionally or alternatively include energy data and/or energy consumption schedule(s) for the facility (block 1006). This data can be received from a variety of sources, such as sensors or controllers of energy sources that are associated with the facility (e.g., batteries, solar arrays, mainspring generators, refrigeration systems, blast cells). The energy data can indicate how much energy is being consumed by respective components in the facility, when the energy is being consumed, for how long the energy is being consumed, etc. The energy data may indicate how much energy is being produced, when the energy is being produced, and/or for how long the energy is being produced. The energy consumption schedule(s) can be generated for and/or by respective components in the facility that consume energy available to the facility. Such schedule(s) can include any of the energy data described at least in this paragraph.

The data can additionally or alternatively include external energy data (block 1008). The energy data can be received from one or more energy market systems and/or energy grid systems described herein. This data can indicate supply and demand of energy available on the grid and/or in the markets. The data can indicate current, future, and/or expected prices of available energy on the grid and/or in the markets.

The data can additionally or alternatively include schedules of operations (e.g., tasks) to perform in the facility (block 1010). The schedule(s) of operations can be received from a facility management system described herein. The schedule(s) may also be received from a data store, other computing systems associated with the facility, and/or local memory/storage of the controller. The schedule(s) may indicate current and/or future tasks/operations to be performed in the facility, including but not limited to manual and/or automated tasks. The schedule(s) can include instructions for one or more different facility vehicles, human workers, and/or components in the facility to complete tasks such as unloading and loading items off of and onto freight vehicles, routing items to various storage locations, storage areas, blast cells, refrigeration units, and/or other stations in the facility, palletizing items, depalletizing items, and other tasks that may be performed in manual and/or automated facilities (e.g., warehouses).

The controller can apply one or more modeling techniques to the received data to identify conditions for charging at least one inbound electric vehicle at the facility (block 1012). The controller can apply one or more models to the received data or a portion of the received data. The models can be trained with historic data associated with the facility, facility operations, energy usage/production of the facility and/or other facilities, energy market information, charging electric vehicles and their components, etc. to determine whether, how, and when to charge the inbound electric vehicle.

For example, the controller can determine a distance traveled of the vehicle (block 1014). In some implementations, the applied model(s) can generate output including the distance traveled of the vehicle. Sometimes, the distance traveled can be determined based on processing data about the inbound electric vehicle from block 1004. The data can indicate a starting location of the vehicle and an endpoint, the endpoint being the facility. The controller can apply algorithms and/or mathematical techniques to calculate the distance traveled between the stating location and the endpoint.

Additionally or alternatively, the controller can determine a distance expected to be traveled (block 1016). The applied model(s) can generate output including the expected distance of the vehicle. Sometimes, the expected distance can be determined based on processing the data about the inbound electric vehicle from block 10004 and/or the schedule(s) of operations to perform in the facility in 1010. For example, the data from the vehicle can include a next stop or destination of the vehicle after leaving the facility. The controller can apply algorithms and/or mathematical techniques to calculate the expected distance to travel between the facility and the next stop of the vehicle. In some implementations, the schedule of operations can include order data for an order to be fulfilled by the vehicle. The order data may include information about the next stop of the vehicle, such as a route to be taken, a total distance to travel, a location of the next stop, etc. The controller may then process the order data to determine the distance expected to be traveled by the vehicle after leaving the facility.

The controller can calculate a quantity of energy needed to travel the expected distance once the vehicle arrives at the facility (block 1018). The applied model(s) can generate output indicating the quantity of energy needed to travel the expected distance. The model(s) and/or the controller can utilize mathematical techniques to correlate the expected distance with a projected quantity of energy needed to travel that distance. The quantity of energy needed may also be determined based on data about the vehicle in block 1004. For example, the data about the vehicle can indicate a capacity of a battery or other power source of the vehicle, which may be used to power the vehicle over the expected distance. The capacity of the battery can be provided as input to the model(s), which can predict, based on the capacity and the expected distance, how much energy is needed to travel that expected distance without requiring recharging along the route. In some implementations, calculating the quantity of energy needed to travel the expected distance can include calculating how much more energy is needed from a current charge of the battery of the vehicle (or an expected charge of the battery once the vehicle arrives at the facility) to travel the expected distance.

The controller can calculate an amount of time that the inbound vehicle would be stationed at a dock door of the facility (block 1020). This amount of time can be based on an amount of time needed to charge the electric vehicle or components thereof. This amount of time can additionally or alternatively be based on an amount of time needed to perform unload and/or load tasks for the vehicle. The applied model(s) can be trained to generate output indicating a prediction of the amount of time needed to complete the tasks associated with the vehicle. In some implementations, the calculation in block 1020 can be based on how much time exists between completing tasks associated with the vehicle at the facility and the vehicle leaving the facility to complete other trips.

The controller can calculate an amount of time required to complete unload and/or load operations at the dock door for the inbound vehicle (block 1022). In some implementations, this calculation can be the same as the calculation in block 1020. The calculation can be generated as output from the applied model(s).

The controller can determine one or more candidate charging schedules for the inbound vehicle at the dock door based on the identified conditions for charging the vehicle in block 1024). For example, the candidate charging schedules can be determined based on the calculated amounts of time. As another example, the candidate charging schedules can be determined that satisfy the quantity of energy needed for the inbound electric vehicle to complete its next job (see blocks 1016 and 1018).

The controller can select a charging schedule amongst the candidate charging schedules that satisfies one or more lowest cost criteria in block 1026. In other words, the controller can select the charging schedule that provide optimal satisfaction of the one or more criteria. For example, the controller can select the charging schedule that allows for the vehicle to be charged to near full capacity for an entire duration that the vehicle is being unloaded at the facility, while still allowing other components in the facility to efficiently complete their respective operations using the energy that is available at the facility. As another example, the controller can select the charging schedule that allows for the vehicle to be charged to the full capacity for longer than the amount of time needed to unload/load the vehicle, but while also allowing other energy intensive components, such as blast cells, to continue operating and/or start operations at full capacity (especially if another vehicle is not expected to arrive during the time that the vehicle is being charged and/or the vehicle being charged remains on schedule to perform the next job(s)).

In some illustrative examples of the process 1000, the controller may only determine one charging schedule in block 1024. Then the controller may not perform block 1026, and instead can proceed to block 1028.

In block 1028, the controller can modify the schedule(s) of facility operations based on the selected charging schedule and/or the conditions for charging. Sometimes, the schedule(s) may first be modified before the controller selects the charging schedule. In some implementations, the controller can modify the schedule(s) to perform less energy intensive operations during times that the inbound vehicle is scheduled for charging (block 1030). This decision may further depend on how long the vehicle needs to be charged and how much energy is required to charge the vehicle. If, for example, a battery level of the vehicle is near empty or below a threshold level, the controller may determine that the battery of the vehicle requires significant charging to reach a suitable battery level for completing a next leg in the trip and/or until the vehicle reaches a next charging station along the trip. To ensure that the vehicle's battery can be appropriately charged to at least the suitable battery level, the controller can shift energy intensive operations (e.g., operating blast cells) to be performed before or after charging the vehicle and shift less energy intensive operations (such as manual tasks in loading/unloading items from trucks, manual tasks in palletizing or depalletizing items, manual tasks in picking items, manual tasks in identifying pallets, conveyor belt operations in routing items to different locations in the facility) to be performed during the charging period of time.

As another example, the controller can modify the schedule(s) to perform manual operations during times that the inbound vehicle is scheduled for charging (block 1032). As yet another example, the controller can modify the schedule(s) to perform energy intensive operations and/or automated operations during times that the inbound vehicle is in transit to the facility (block 1034). Refer to the description of block 1030 for further discussion about shifting when various operations are performed in the schedule(s).

The controller can generate instructions for charging the inbound vehicle based on the modified schedule(s) of facility operations and the selected charging schedule in block 1036. In some implementations, block 1036 can be performed at the same time as performing one or more of the blocks 1028-1034. In some implementations, block 1036 can be performed before performing one or more of the blocks 1028-1034.

The controller may then return the instructions and other information for charging the inbound vehicle and executing the modified schedule(s) of facility operations in block 1038. The instructions can be transmitted to a controller of a charging unit that is configured to charge the vehicle. The instructions can be transmitted to controllers of energy sources and other components in the facility configured to perform the facility operations. The instructions can be transmitted to a facility management system or other computer system associated with the facility. The instructions can be transmitted to computing devices of relevant users, such as human workers that are operating equipment or other facility vehicles and performing tasks/operations in the facility.

As an illustrative example, the controller may optionally automatically adjust the schedule(s) of facility operations in block 1040. Refer to at least FIGS. 6B and 8 for further discussion.

Additionally or alternatively, as an illustrative example, the controller may optionally automatically execute energy discharge to a charging unit at a dock door that is scheduled to receive the inbound vehicle (block 1042). In other words, the controller may communicate with controllers of energy sources in the facility, instructing those energy sources to provide energy to the charging unit.

Additionally or alternatively, as an illustrative example, the controller may optionally automatically execute instructions to divert available and/or stored energy from one or more facility operations to a charging unit at a dock door that is scheduled to receive the inbound vehicle (block 1044). The controller can transmit instructions to controllers of one or more energy sources and/or components in the facility that, when automatically executed, cause the energy sources and/or components to stop consuming the available/stored energy. At the same or similar time, the controller may execute instructions to cause the charging unit at the dock door to begin charging the vehicle. Various other operations are also possible in response to returning the instructions and information in block 1038.

Although the process 1000 is described from the perspective of charging one inbound electric vehicle, the same or similar process 1000 can be performed to determine schedules and operations for charging multiple inbound electric vehicles. The same or similar process 1000 may also be performed to determine schedules and operations for charging vehicles that are already docked or located at the facility and/or updating/modifying existing schedules and operations for vehicles that are en route to the facility, already at the facility, and/or already being charged at the facility.

The process 1000 may stop in response to returning the instructions in block 1038. In some implementations, the process 1000 can be performed whenever the controller receives indication of an electric vehicle approaching the facility or at the facility that requires charging. Such an indication can originate from a controller or computing system of the electric vehicle itself. Such an indication can originate as user input from a computing device of a relevant user, such as a driver of the electric vehicle and/or a worker in the facility. Sometimes, the indication can originate from a customer computing system, a facility management system, a warehouse management system (WMS), or another computing system associated with the facility and/or the electric vehicle.

FIG. 11 is a conceptual diagram of a Proximal Policy Optimization (PPO) model 1100 for reinforcement learning, which can be used to determine automated control and assessment of operations in a facility. The PPO model 1100 can be deployed by the centralized controller 102 described herein at any facility, such as the facility 106. The PPO model 1100 can also be cloud-hosted, and accessed by controllers and/or computing systems associated with the facility. An environment can be defined, along with variables that may change in that environment. The PPO model 1100 can then be allowed to observe the environment with its changing variables. Parameters of the PPO model 1100 can be toggled to adjust how quickly the model learns. In some implementations, for example, it may desired to have slower training.

As shown in FIG. 11, an environment associated with the facility can be measured in block 1106. Measuring or assessing the environment can include taking in information about various states of the environment. The information about the environment can be received from any of the sensor devices, servers, computing systems, controllers, and/or systems described above in this disclosure. The information can be related to energy usage at the facility and/or energy market data. The environment can include many variables, including one or more components depicted in the system of FIG. 1B. For example, the PPO model 1100 can generate control decisions (e.g., control set point decisions) based on thermal battery controls, flywheeling controls, energy trading information, facility operational tasks and decisions, and other facility information (e.g., the facility itself can be configured an asset, such as a large thermal battery).

Although the PPO model 1100 can receive any of these aforementioned controls and/or information as inputs, the PPO model 1100 can also generate and determine operations/set points and other controls for the related assets (e.g. thermal battery, flywheeling system, energy trading system, the facility). Sometimes, set points determined by the PPO model 1100 can be fed back to assets and used by those assets to determine appropriate controls/actions to be performed (e.g., the flywheeling system can receive the set points from the PPO model 1100 and, based on the model set points, determine optimal flywheeling controls for the facility as a whole).

As illustrative examples, the PPO model 1100 can receive, as inputs, facility operations, flywheeling operations, solar load information, and battery information and generate output indicating control set points for related assets/components and/or other assets in the facility. The output can include, as an illustrative example, instructions to pull a predetermined amount of power from batteries so that the facility does not have to use power from an energy grid when those energy prices exceed some price threshold. As another illustrative example, the PPO model 1100 can generate output including instructions to pull energy from a solar array when it is sunny and then perform flywheeling operations when it is no longer sunny, such as during nighttime. In some geographic locations, enough solar energy can be collected and stored at the facility to allow the facility to fully run on solar energy without having to take energy from an energy grid.

The PPO model 1100 can include 2 separate neural networks: a critic 1102 and an actor 1104. The environment information (measured in block 1106) can be processed in block 1108, then provided to both the critic 1102 and the actor 1104. The critic 1102 can be configured to determine what actions/controls may be best according to some predetermined reward function (e.g., minimizing costs to the facility). The determinations of the critic 1102 can be provided to the actor 1104 to act upon those. The critic 1102 can be a model that is also configured to continuously reevaluate decisions of the actor 1104 and update an objective function and/or policy gradients (block 1110) to influence the decisions of the actor 1104. The critic 1102 can begin its evaluations with a cost function, and can sometimes maneuver towards a minimization function so that the actor 1104 can make improved decisions over time.

The policy gradient (block 1110) can be the minimization function mentioned above and therefore a function of the environment. The policy gradient may not concern everything or every state in the environment. In some implementations, the policy gradient may include everything in the environment. What aspects of the environment that are included in the policy gradient can be customized for the particular facility. Moreover, the policy gradient can represent or include many, continuous states of the environment, including different states/scenarios and further dimensionality of the environment. The policy gradient can be defined in a variety of ways—the policy gradient can include variables associated with costs in the environment (e.g., price of electricity, time(s) of electricity being used, etc.). The policy gradient can start as an objective function that manipulates or otherwise is changed over time by the critic 1102, as described below.

The critic 1102 can have a goal to minimize cost in the environment associated with the facility and according to the policy gradient, which can become more robust and influential on the actor 1104's decisions as the critic 1102 continuously learns. The critic 1102 may not know a best action to take or that could have been taken. That said, the critic 1102 can be configured to generate a reward-based function based on such action(s). A total objective of the critic 1102 can be to minimize cost, so when reinforcement learning begins on the PPO model 1100 (e.g., periodically, continuously), the PPO model 1100 may have random or outside of perfection walks. When beginning the reinforcement learning, the PPO model 1100 can be set to try many things/decisions. Random walk variables can also be added to the reinforcement to adjust how much the model experiments, so that the experimentation diminishes over time. As a result, randomization in learning may only occur at predetermined time intervals and/or randomly and sporadically.

As mentioned above, the critic 1102 can start by minimizing cost, the actor 1104 then acts to do that, but the critic 1102 may receive environment information indicating that, in response to the actor 1104 acting, a battery was overcharged. The critic 1102 may still desire to minimize cost for the facility, but now wants to also ensure the battery is not overcharged in such a scenario. The critic 1102 can therefore adjust the policy gradient (block 1110) to account for the scenario of overcharging the battery) and provide that policy gradient back to the actor 1104 to make improved decisions.

The actor 1104 can take the policy gradient (block 1110) as another signal/input when making decisions to act (e.g., generate controls for components in the facility or the environment more generally). The actor 1104 can be a neural network. The actor 1104 can be one or more other types of machine learning models and/or networks. The actor 1104 can be trained to take inputs (including the policy gradient) and find correlations between the inputs to generate output (the output being control operations for the facility/environment). For example, if the actor 1104 is given (i) the environment information, including states in the environment and how those states change over time, and (ii) the policy gradient, the actor 1104 is trained to perform many operations to determine best actions to perform to achieve a cost minimization for the facility/environment. Operations performed by the actor 1104 can include determining which input(s) is more influential or should be weighted more compared to others, a subtraction of input combinations, a product of input combinations, etc.

The actor 1104 can generate decisions for different use cases based on the received inputs/signals. The critic 1102 can then evaluate costs of those use cases and determine how the actor 1104 performs compared to other use cases/outcomes. Accordingly, the random walks parameter can be tuned to improve decision-making of the actor 1104. As indicated above, the random walks can become less frequent as time goes on and the actor 1104 is more fine-tuned. In some implementations, the random walks can be turned off for some predetermined period of time. During that period of time, however, the critic 1102 may still be attentive.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for dynamically controlling energy performance operations in a facility, the system comprising:

- a plurality of energy sources configured to provide energy to components in the facility to perform facility operations;
- a plurality of controllers, each of the plurality of controllers configured to control an energy source of the plurality of energy sources, wherein each of the plurality of controllers comprises:
  - a component controller configured to execute instructions to control operations of the energy source and generate signals indicating performance of the energy source in real-time, and
  - a software interface configured to provide communication amongst the plurality of controllers and a centralized controller for the facility; and
- a centralized controller for the facility configured to interface with at least the plurality of controllers, wherein the centralized controller comprises:
  - a software interface configured to provide communication amongst the plurality of controllers and the centralized controller, wherein the software interface is configured to receive, from the plurality of controllers, the generated signals, and
  - at least one decision engine configured to:
    - receive, via the software interface of the centralized controller, the generated signals;
    - retrieve, from a data store, at least one model, wherein the model was iteratively trained using reinforcement learning techniques and training data that includes (i) at least a portion of the received signals and (ii) decisions made by the at least one decision engine, wherein the model was trained, based on the training data, to generate control operations for one or more of the plurality of energy sources that achieves an optimized cost function for the facility;
    - provide at least a portion of the received signals as input to the model;
    - receive, as output from the model, control operations for one or more of the plurality of energy sources in the facility for a predetermined period of time, wherein the control operations comprise shifting energy-intensive operations to be performed before or after less-energy-intensive operations during the predetermined period of time, wherein the energy-intensive operations comprise at least activating freeze cycles and the less-energy-intensive operations comprise tasks for routing items in the facility; and return the control operations to respective controllers amongst the plurality of controllers for the one or more of the plurality of energy sources for execution during the predetermined period of time, wherein executing the control operations comprises (i) deactivating a freeze cycle of a component amongst the components in the facility during the predetermined period of time and (ii) executing the tasks for routing the items in the facility during the predetermined period of time.

2. The system of claim 1, wherein the plurality of energy sources comprises a vehicle charging system, the vehicle charging system being configured to charge batteries of electric vehicles that arrive at the facility.

3. The system of claim 2, wherein the electric vehicles comprise truck refrigeration units (TRUs).

4. The system of claim 2, wherein the vehicle charging system comprises at least one charging unit that is positioned at a dock door in the facility, the at least one charging unit being configured to receive an inbound electric vehicle and charge a power source of the inbound electric vehicle.

5. The system of claim 4, wherein the at least one charging unit is further configured to perform vehicle to load operations, wherein performing the vehicle to load operations comprises executing instructions, generated by the vehicle charging system, to draw a predetermined load from the inbound electric vehicle and store the drawn load for use by one or more of the plurality of energy sources of the facility.

6. The system of claim 1, wherein the plurality of energy sources comprises at least one of: a plurality of batteries, solar arrays, at least one mainspring generator, or a refrigeration system, and the components in the facility comprise a plurality of blast cells.

7. The system of claim 1, wherein the generated signals include at least one of battery signals, solar array signals, mainspring generator signals, energy grid signals, energy market information, or facility operations information.

8. The system of claim 7, wherein the battery signals comprise at least one of a current state of battery charge, a current state of battery rate of charge, a current state of battery rate of discharge, or a reserved battery capacity.

9. The system of claim 7, wherein the solar array signals comprise at least one of current solar production levels, cloud tracking information, image sensor-based cloud tracking and estimation information, macro-level facility information, solar market information, or weather condition information.

10. The system of claim 7, wherein the mainspring generator signals comprise current energy production levels.

11. The system of claim 1, wherein the predetermined period of time is a next 15 minutes.

12. The system of claim 1, wherein the predetermined period of time is a next 3 hours.

13. The system of claim 1, wherein the model was trained to generate the control operations for a solar array of the facility based on the generated signals satisfying one or more solar optimization criteria that corresponds to the predetermined period of time.

14. The system of claim 13, wherein generating the control operations for the solar array comprises generating instructions to use a predetermined quantity of solar power that is generated over the predetermined period of time instead of power that is generated by other energy sources amongst the plurality of energy sources.

15. The system of claim 13, wherein generating the control operations for the solar array comprises generating instructions to divert energy storage operations from the solar array to one or more of the plurality of energy sources over the predetermined period of time based on determining that the generated signals satisfy one or more energy diversion criteria.

16. The system of claim 1, wherein the model was trained to generate the control operations for batteries of the facility based on the generated signals satisfying one or more battery optimization criteria that corresponds to the predetermined period of time.

17. The system of claim 16, wherein generating the control operations for the batteries comprises generating instructions to charge a subset of the batteries over the predetermined period of time based on determining that the generated signals satisfy one or more battery charge criteria.

18. The system of claim 16, wherein generating the control operations for the batteries comprises generating instructions to charge a subset of the batteries during a short-term timeframe based on predicting that other energy production levels during the short-term timeframe satisfy threshold energy levels required to perform the facility operations during the short-term timeframe.

19. The system of claim 16, wherein generating the control operations for the batteries comprises generating instructions to discharge power from a subset of the batteries over the predetermined period of time based on determining that the generated signals satisfy one or more discharge criteria over the predetermined period of time.

20. The system of claim 1, wherein deactivating the freeze cycle and executing the tasks for routing the items in the facility during the predetermined period of time are based on determining that a threshold quantity of power from the plurality of energy sources in the facility is required during the predetermined period of time to charge one or more inbound electric vehicles at the facility.

* * * * *